United States Patent
Wankewycz

(10) Patent No.: US 11,168,487 B2
(45) Date of Patent: Nov. 9, 2021

(54) STORAGE UNIT FOR AN UNMANNED AERIAL VEHICLE

(71) Applicant: H3 Dynamics Holdings Pte. Ltd., Singapore (SG)

(72) Inventor: Taras Wankewycz, Singapore (SG)

(73) Assignee: H3 Dynamics Holdings Pte. Ltd., Singapore (SG)

( * ) Notice: Subject to any disclaimer, the term of this patent is extended or adjusted under 35 U.S.C. 154(b) by 750 days.

(21) Appl. No.: 15/752,901

(22) PCT Filed: Aug. 17, 2016

(86) PCT No.: PCT/IB2016/054916
§ 371 (c)(1),
(2) Date: Feb. 15, 2018

(87) PCT Pub. No.: WO2017/029611
PCT Pub. Date: Feb. 23, 2017

(65) Prior Publication Data
US 2018/0245365 A1 Aug. 30, 2018

(30) Foreign Application Priority Data

Aug. 17, 2015 (SG) .......................... 10201506475R

(51) Int. Cl.
*B64C 25/00* (2006.01)
*E04H 6/44* (2006.01)
(Continued)

(52) U.S. Cl.
CPC ............ *E04H 6/44* (2013.01); *B64C 39/024* (2013.01); *H02J 7/00* (2013.01); *H02J 7/0042* (2013.01);
(Continued)

(58) Field of Classification Search
CPC .......... B64C 2201/20; B64C 2201/201; B64C 2201/12; B64C 2201/18; B64C 2201/108;
(Continued)

(56) References Cited

U.S. PATENT DOCUMENTS 9,384,668 B2 * 7/2016 Raptopoulos ........ G06Q 10/083
9,448,562 B1 * 9/2016 Sirang ................... B64C 39/024
(Continued)

FOREIGN PATENT DOCUMENTS

CN 102419598 4/2012
CN 203845022 9/2014
(Continued)

OTHER PUBLICATIONS

Wankewycz, Taras; Office Action for Japanese patent application No. 2018-528105, dated Sep. 14, 2020, 18 pgs.
(Continued)

*Primary Examiner* — Richard R. Green
*Assistant Examiner* — Michael A. Fabula
(74) *Attorney, Agent, or Firm* — Taylor English Duma LLP

(57) ABSTRACT

A storage unit for an Unmanned Aerial Vehicle (UAV) includes a container, a UAV landing platform, and a receptacle. The container is provided for enclosing the UAV. The receptacle is positioned above the UAV landing platform and it includes at least one inclined surface for guiding a landing UAV to a predetermined UAV landing position on the UAV landing platform.

3 Claims, 43 Drawing Sheets

(51) Int. Cl.
  *B64C 39/02* (2006.01)
  *H02J 7/00* (2006.01)
  *E04H 6/04* (2006.01)
  *B64F 1/00* (2006.01)
  *B64F 1/22* (2006.01)
  *H02J 7/02* (2016.01)

(52) U.S. Cl.
  CPC .. *B64C 2201/027* (2013.01); *B64C 2201/042* (2013.01); *B64C 2201/108* (2013.01); *B64C 2201/148* (2013.01); *B64C 2201/201* (2013.01); *B64F 1/007* (2013.01); *B64F 1/222* (2013.01); *E04H 6/04* (2013.01); *H02J 7/025* (2013.01)

(58) Field of Classification Search
  CPC ....... B64C 25/00; B64C 25/001; B64C 25/32; B64C 25/34; B64C 25/52; B64C 2025/325; B64C 29/0091; B64C 39/024; B64F 1/12; B64F 1/36; B64F 1/005; B64F 3/00; B64F 2700/6203
  See application file for complete search history.

(56) References Cited

U.S. PATENT DOCUMENTS

| | | | | |
|---|---|---|---|---|
| 9,499,265 | B2* | 11/2016 | Sanz | B64F 1/02 |
| 9,650,133 | B2* | 5/2017 | Fisher | B64C 29/02 |
| 9,718,564 | B1* | 8/2017 | Beckman | B64C 39/024 |
| 10,287,034 | B2* | 5/2019 | Mozer | B64F 1/362 |
| 10,534,372 | B2* | 1/2020 | Fisher | B64D 47/08 |
| 10,577,126 | B2* | 3/2020 | Mozer | B64F 1/24 |
| 2004/0167682 | A1* | 8/2004 | Beck | B60T 1/062 701/3 |
| 2010/0005688 | A1 | 1/2010 | Lins | |
| 2011/0068224 | A1* | 3/2011 | Kang | B64C 39/024 244/116 |
| 2012/0080556 | A1* | 4/2012 | Root, Jr. | G01W 1/08 244/63 |
| 2014/0010619 | A1* | 1/2014 | Dor-El | E04H 6/44 414/240 |
| 2014/0168420 | A1 | 6/2014 | Naderhirn et al. | |
| 2014/0217237 | A1 | 8/2014 | Ying | |
| 2014/0236390 | A1* | 8/2014 | Mohamadi | B64C 29/00 701/2 |
| 2014/0263852 | A1 | 9/2014 | Walker et al. | |
| 2015/0069968 | A1* | 3/2015 | Pounds | B60L 53/35 320/109 |
| 2015/0266575 | A1* | 9/2015 | Borko | B64F 1/12 701/3 |
| 2016/0001883 | A1* | 1/2016 | Sanz | H02J 7/0042 244/17.23 |
| 2016/0011592 | A1* | 1/2016 | Zhang | B64F 1/02 701/2 |
| 2016/0039300 | A1* | 2/2016 | Wang | B60L 53/80 244/39 |
| 2016/0039541 | A1* | 2/2016 | Beardsley | B64C 39/024 701/2 |
| 2016/0364989 | A1* | 12/2016 | Speasl | G08G 5/0069 |
| 2017/0021942 | A1* | 1/2017 | Fisher | B64F 1/005 |
| 2017/0023949 | A1* | 1/2017 | Fisher | B64C 29/02 |
| 2017/0050749 | A1* | 2/2017 | Pilskalns | B64F 1/007 |
| 2017/0129464 | A1* | 5/2017 | Wang | B60L 53/80 |
| 2017/0206414 | A1 | 7/2017 | Schultz et al. | |
| 2017/0225801 | A1* | 8/2017 | Bennett | B64F 1/005 |
| 2017/0225802 | A1* | 8/2017 | Lussier | E04H 12/003 |
| 2017/0283090 | A1* | 10/2017 | Miller | B60L 53/80 |
| 2017/0329047 | A1* | 11/2017 | Shimizu | B64C 39/024 |
| 2018/0009549 | A1* | 1/2018 | Sullivan | B64F 1/22 |
| 2018/0029723 | A1* | 2/2018 | Krauss | B64F 1/00 |
| 2018/0148170 | A1* | 5/2018 | Stamatovski | B64F 1/007 |
| 2018/0170540 | A1 | 6/2018 | Claybrough | |
| 2018/0327091 | A1* | 11/2018 | Burks | B64C 29/0025 |
| 2019/0002127 | A1* | 1/2019 | Straus | B64F 1/007 |
| 2019/0002128 | A1* | 1/2019 | Raz | B64F 1/125 |
| 2019/0023416 | A1* | 1/2019 | Borko | B64F 1/007 |
| 2019/0100330 | A1* | 4/2019 | Cheng | E04H 6/44 |
| 2019/0308724 | A1* | 10/2019 | Cooper | B64F 1/222 |
| 2019/0315463 | A1* | 10/2019 | Chen | G05D 23/20 |
| 2020/0262583 | A1* | 8/2020 | Ducharme | B64C 25/06 |
| 2021/0148131 | A1 | 5/2021 | Wankewycz | |
| 2021/0254360 | A1 | 8/2021 | Wankewycz | |
| 2021/0266461 | A1 | 8/2021 | Koo et al. | |

FOREIGN PATENT DOCUMENTS

| | | |
|---|---|---|
| DE | 102013004881 | 9/2014 |
| EP | 3045393 | 7/2016 |
| JP | U11991082299 | 8/1991 |
| JP | 2015042539 | 3/2015 |
| KR | 1020130075829 | 7/2013 |
| KR | 1020130122715 | 11/2013 |
| KR | 101373852 | 3/2014 |
| KR | 1020140115024 | 9/2014 |
| KR | 101495654 | 2/2015 |
| WO | 2015026018 | 2/2015 |
| WO | 2020008344 | 1/2020 |

OTHER PUBLICATIONS

Wankewycz, Tares; International Search Report and Written Opinion for PCT/IB2016/054916, filed Aug. 17, 2016, dated Dec. 23, 2016, 25 pgs.

Koo, Tao Wei Shaun; International Search Report and Written Opinion for PCT/IB2019/055617, filed Feb. 7, 2019, dated Oct. 27, 2019, 14 pgs.

* cited by examiner

STORAGE UNIT FOR AN UNMANNED AERIAL VEHICLE

FIELD OF THE INVENTION

The application relates to an enclosure apparatus for an Unmanned Aerial Vehicle (UAV).

BACKGROUND

The Unmanned Aerial Vehicle (UAV) refers to an aircraft without a human pilot aboard. The UAV is also called a drone. The UAV can have an onboard computer for controlling its flight. Alternatively, a pilot, who is placed on the ground or in another vehicle, can remotely control the flight of the UAV. The UAV is often used in situations where manned flight is considered too risky or difficult.

BRIEF SUMMARY OF THE INVENTION

It is an object of this application to provide an improved enclosure apparatus for an Umanned Aerial Vehicle (UAV). The Umanned Aerial Vehicle is also called in an Unmanned Air Vehicle.

The application provides an improved protection storage device to contain a stationary UAV. The storage device is also designed to charge electrically a battery of the UAV, to gather data about environment of the UAV using sensors, and to serve as a data communications hub.

The device can be powered by an electric power supply grid, or by batteries, which are electrically charged using solar cells, wind generators, stand-alone petrol, diesel, natural gas, bio-mass fueled gen-sets, and/or fuel cells. The electric power supply grid acts a channel to transmit electricity from an electric power plant.

The application also provides an improved air vehicle module with an electrical utility cable.

This air vehicle module includes an Unmanned Air Vehicle (UAV), a UAV storage unit, a UAV tethering assembly, and a controller.

The UAV tethering assembly is attached to the UAV and to the storage unit for transferring electrical energy from the storage unit to the UAV.

When the UAV is not in use, it is placed in the UAV storage unit for protecting the UAV against the surrounding weather and against animals or unauthorized persons from accessing the UAV.

The UAV acts as an aircraft without a human pilot being located aboard the UAV. The UAV can be guided or be directed remotely by a user. Alternatively, the UAV can be guided by a computer, which is provided onboard the UAV.

The controller acts to manage or direct parts of the air vehicle module.

In detail, the storage unit includes a container and a storage unit electrical power source. The container is used for receiving and storing the UAV in order to protect the UAV. The storage unit electrical power source can then electrically charge the electrical power source of the UAV. In other words, the storage unit electrical power source provides electrical energy to the electrical power source of the UAV.

Referring to the tethering assembly, it includes a spool with a spool rotational sensor, a spool motor, and an electrical utility cable with a cable force sensor.

The electrical utility cable includes a power supply electrical wire being electrically connected to the storage unit electrical power source and to the air vehicle electrical power source in order to transfer electrical energy from the storage unit electrical power source to the air vehicle electrical power source.

The spool motor can selectively rotate the spool in one direction in order to unwind a part of the electrical utility cable around the spool. In other words, the rotation causes a part of the electrical utility cable to be released from the spool.

The spool rotational sensor measures the number of rotation of the spool and it sends out the rotational data of the spool to the controller.

The UAV includes one or more propellers and an air vehicle electrical power source. The air vehicle electrical power source provides electrical energy to the propellers. The energized propellers then move the UAV vertically and/or horizontally.

The UAV is often provided with one or more rotary wings, although it can also be provided with one or more fixed wings or with one or more hybrid wings. The hybrid wings comprise both rotary and fixed wings.

The released cable allows the UAV to be placed within a predetermined distance from the storage unit in which the predetermined distance is not more than the length of the released cable.

The cable force sensor is attached to the UAV and it is adapted for bearing and supporting the weight of the released part of the electrical utility cable. The cable force sensor also measures a force or strain being exerted by the released part onto the cable force sensor. This force includes the weight of the released part as well as any wind and air resistance force, which are exerted onto the released part.

The spool motor can also selectively rotate the spool in another direction in order to wind a part of the electrical utility cable around the spool. In other words, this rotation causes a part of the electrical utility cable to be wrapped around the spool. This rotation is used for taking up a part of the electrical utility cable such that the released part of the electrical utility cable is not too loose.

Referring to the controller, it is adapted for receiving the force measurement from the cable force sensor and for receiving the spool rotational data from the spool rotational sensor.

The controller then energizes the spool motor for rotating the spool according to the received force measurement and to the received spool rotational data such that the released part of the electrical utility cable is essentially straight. In effect, the released part of the electrical utility cable is only a bit loose.

The air vehicle module provided benefits.

The electrical utility cable advantageously allows the air vehicle electrical power source to receive electrical energy from the storage unit electrical power source. Since the storage unit electrical power source can store more electrical energy than the air vehicle electrical power source, this means enables the UAV to carry a heavier load and/or to fly longer.

The tethering assembly also advantageously enables the released part of the electrical utility cable is essentially straight, just a bit loose. In other words, the released part is not too loose, thereby causing the UAV to bear excessive heavy weight of the released part. The released part is just taut, without restricting the UAV for travelling its desired flight path.

The UAV storage unit can also include communication and coordination unit for communicating with storage units of other air vehicle modules and with other Unmanned Air Vehicles.

The container can include a movable cover, which can be opened for allowing the UAV to ingress into the container and to egress from the container and be closed for protecting the UAV. The movable cover is often provided in the form of a sliding door for easy implementation.

The movable cover can be adapted for rotating about a hinge. Snow, sand, rain, or dust can collect over the cover. The movable cover allows these contaminations to be removed when the cover opens.

The electrical utility cable can include a sensor electrical wire for transferring the force measurement from the cable force sensor to the controller.

The electrical utility cable can include a layer of metal for enclosing and protecting the power supply electrical wire. The metal can include steel or aluminum material.

The sensor electrical wire and the power supply electrical wire are often enclosed in shielding tube for protecting these wires.

Alternatively, the UAV can include a wireless transmitter for sending the force measurement wirelessly from the cable force sensor to the controller.

The storage unit electrical power source can include a power inlet for receiving electrical energy from a land vehicle power supply. A land vehicle is often used to transport the UAV storage unit according to a missile requirement of the UAV storage unit. The power supply of the land vehicle, which is readily available and which often provide a large amount of electrical energy, can then provide electrical energy to the power supply of the UAV storage unit.

The tethering assembly can include a bracket for supporting the spool and any part of the electrical utility cable that is wound around the spool. One or more bracket force sensors can be provided for connecting the bracket to a support area of the UAV storage unit. The bracket force sensors are adapted for providing a measurement of a force or strain being exerted by the bracket onto the support area.

The controller is then further adapted for energizing the spool motor to rotate the spool according to the measurement from the bracket force sensor of the tethering assembly.

The application also provides a further improved air vehicle module with an improved UAV guidance unit.

The air vehicle module includes an Unmanned Air Vehicle and a storage unit for protecting the UAV.

Referring to the storage unit, it includes a UAV container with a moveable landing platform and a landing beacon unit. The beacon unit generates visible and/or invisible light rays that allows the UAV to land accurately.

The UAV container is provided for receiving and storing the UAV.

The moveable landing platform can be placed in a landing position and in a storing position. The landing position is often provided above the storing position.

In the landing position, the landing platform is placed at a position that allows the UAV to land and to take-off easily.

The UAV usually lands and takes off in the vertical direction. In the storing position, the landing platform with the UAV is positioned inside the container to allow enclosure of the UAV.

The landing beacon unit includes a visible light ray source and an infrared light ray source. The visible light ray source provides at least one visible light ray for indicating the location of the landing platform. Similarly, the infrared light ray source provides at least one infrared light ray for indicating the location of the landing platform.

Referring to the UAV, it includes a visible light ray camera and an infrared light ray camera.

The visible light ray camera is intended for receiving the visible light ray. The received visible light ray is used for guiding the UAV to the landing platform. Similarly, the infrared light ray camera is intended for receiving the infrared light ray. The received infrared light ray is used for guiding the UAV to the landing platform.

The different types of light rays are used advantageously in different situations. In the event of rain, which can block the infrared light rays and cause difficulty in detection of the infrared light rays, the visible light rays are used for guiding the UAV to the landing platform. In the event of strong sunshine, which causes difficulty in detection of the visible lights, the infrared light rays are used for guiding the UAV to the landing platform.

The landing beacon unit often includes a visible light cover plate, which comprises opaque areas and transparent areas, for selectively blocking the visible light rays from the visible light ray source. This is done such that the visible light rays, which travel through the visible light cover plate, form a first predetermined guidance pattern. The predetermined guidance pattern allows the visible light camera to detect easily the visible light rays.

Similarly, the landing beacon unit can also include an infrared cover plate, which comprises opaque areas and transparent areas, for selectively blocking the infrared light rays from the infrared light ray source. This is done such that the infrared light rays, which travel through the infrared light cover plate, form a second predetermined guidance pattern. The predetermined guidance pattern allows the infrared light camera to detect easily the infrared light rays.

The visible light ray source can be adapted to generate one or more laser light rays with a visible light wavelength. The laser light rays have essentially one wavelength. The laser visible light rays are also coherent in that they have essentially no phase shift with respect to each other.

Likewise, the infrared light ray source is adapted to generate one or more laser light rays with an infrared light wavelength.

The laser lights have an advantage in that they can be focused or be concentrated easily on one area for easier penetration of haze.

The air vehicle module can also include communication and coordination unit for communicating with storage units of other air vehicle modules and with other Unmanned Air Vehicles.

The application also provides an improved air vehicle module with a UAV alignment unit.

The application also provides an improved air vehicle module that includes an Unmanned Air Vehicle, and a storage unit.

The storage unit includes a container for storing the UAV and a moveable landing platform, and a UAV alignment unit.

The moveable landing platform provides a landing position and a storing position.

In the landing position, the landing platform is positioned for the UAV to land and take-off.

In the storing position, the UAV and the landing platform are positioned inside the container.

The UAV alignment unit is adapted for pushing the UAV, which has landed on the landing platform, to a landing area of the moveable landing platform.

In practice, the UAV may not land on the landing area because of wind or other factors. When this happens, it may affect other operations of the storage unit, especially closing of its cover. The UAV alignment unit advantageously acts to place the UAV on the landing area.

The UAV alignment unit can include a positional detector for determining the position of the UAV, which has landed on the landing platform, using a weight sensor. The determined position of the UAV can be used advantageously to activate the UAV alignment unit.

The UAV alignment unit can include at least one of a group consisting of a plurality of plates for pushing the UAV to the landing area, at least two fixed inclined walls for guiding the UAV to the landing area, and at least two movable inclined walls for guiding the UAV to the landing area. These provide different means of aligning the UAV.

The application also provides an improved air vehicle module with a set of surveillance contamination cameras.

The improved air vehicle module includes an Unmanned Air Vehicle and a storage unit that comprises a container for storing the UAV.

The air vehicle module also includes an external contamination camera being directed for taking external images of the storage unit with an internal contamination camera being directed for taking internal images of the storage unit.

The external images and the internal images are intended for sending to a user for monitoring contaminations of the storage unit.

In practice, contaminations, such as snow, rain, dust, and sand can affect the operation of the storage unit. These images serve to inform a user of the contaminations and to respond accordingly.

The application also provides an improved air vehicle module with a set of weed killer sprayers.

The air vehicle module includes an Unmanned Air Vehicle, a storage unit that comprises a container for storing the UAV, and a set of weed killer sprayers for preventing of bushes around the storage unit.

Bushes and small trees may grow around the storage unit and affect the operation of the UAV. Prevention of the growth of bushes and small trees is thus important, especially when the air vehicle module is located in a remote area.

The application also provides an improved an air vehicle module with an animal electric fence.

The air vehicle module includes an Unmanned Air Vehicle, a storage unit that comprises a container for storing the UAV, and an electric fence being provided around the storage unit and being adapted for preventing animals from accessing the storage unit. The electric fence provides an electric shock to any animal trying to access the storage unit, thereby deterring the animal for accessing the storage unit. This important, especially the air vehicle module is unmanned and is located in remote area.

The application also provides the Internet of things using at least one of the above air vehicle modules.

Each object includes a sensor and a communication device for receiving data from other objects, receiving data for the sensor, and sending the data to the other objects for forwarding the data to a server computer. One of the above air vehicle module acts as one of the object.

The application also provides an Internet of Drones using a drone box. The drone box is provided by a UAV assembly, which is described in this application.

The drone box provides a smart drone nesting solution that automates professional drone operations in numerous industrial applications.

The drone box also provides a grid-independent drone battery charging system to remove need for travelling to remote areas.

Furthermore, the drone box provides networked and movable surveillance and inspection sensor systems to broaden applications of the Internet of Things.

The Internet of Things refers to a network of physical objects, such as devices, vehicles, buildings, and other items, which are embedded with electronics, software, sensors, and network connectivity for enabling these objects to collect and exchange data. The Internet of Things allows the objects to be sensed and controlled remotely across existing network infrastructure, creating opportunities for more direct integration of the physical world into computer-based systems, and resulting in improved efficiency, accuracy, and economic benefit.

When the Internet of Things is augmented with sensors and actuators, the technology becomes an instance of the more general class of cyber-physical systems, which also encompasses technologies, such as smart grids, smart homes, intelligent transportation, and smart cities. Each thing is uniquely identifiable through its embedded computing system but is able to interoperate within the existing Internet infrastructure.

The drone box acts a system for converging professional drone-enabled service activities with the Industrial Internet of Things.

The drone box is an all-inclusive, self-powered system that can be deployed anywhere, including in remote areas where industrial assets, borders, or sensitive installations require constant monitoring. Designed as an evolution over unattended sensors and closed circuit television (CCTV) cameras, which are installed in cities, borders, or large industrial estates, the drone box provides sensors freedom of movement using drones as their vehicles for moving the sensors. End-users can deploy flying sensor systems at different locations, and measure just about anything, anywhere, and anytime. They offer 24/7 reactivity or response, providing critical information to operators—even to those located thousands of miles away.

The drone box provides scalability for drone service operators. Such service providers use professional drones to provide their customers with detailed aerial land surveys in mining or agriculture, perform infrastructure inspections, or monitor the progress of construction sites. However, some remote locations need regular or prolonged visits, which increase travel costs and risks to drone service providers. From an end-user perspective, despite providing powerful new insights within an industrial context, the mass-adoption of professional UAVs is slowed by the special skills required to operate them. Conversely, by pre-deploying the drone box systems at the right locations, travel to remote areas is no longer required, charging or handling drone batteries is eliminated, and sensor data is simply sent through a network for easy access and processing.

The drone boxes can be installed anywhere so that its drones can perform pre-programmed scheduled routines, deploy on demand, or be woken up by other drones or sensors as part of a much wider network of "things". As a network, the drone box can increase their effectiveness and mission times using collaborative technologies. Such deployments could offer first responder support in crisis events before sending humans into dangerous environments, such as nuclear power plant meltdowns, chemical spills, or natural disasters.

The drone box can charge drone batteries automatically within its shelter system. Off-grid electric power is provided primarily by a solar-battery installation. For more advanced requirements, system capabilities can be extended using a box with an accessory that provides more advanced communications and hosts a small back-up fuel cell system for year-long availability in mission critical locations.

The use of mobile sensors hosted in networked the drone boxes could revolutionize precision agriculture, border and perimeter security, wildlife protection, critical infrastructure maintenance, telecom tower and wind turbine maintenance, oil & gas asset inspection, building and facilities management, just to name a few.

The application also provides an Unmanned Air Vehicle (UAV) storage unit.

The UAV storage unit comprises a plurality of UAV storage modules. The UAV storage modules are adapted for receiving UAVs and for storing the received UAVs. The UAV storage modules that are stacked vertically for providing the UAV storage unit with a small footprint, thereby allowing the UAV storage unit to be deployed at a site with a small space.

Each UAV storage module includes a container, a movable UAV landing platform, and an extension and retraction mechanism.

In detail, the container is adapted for receiving and storing a vertical take-off and landing UAV with propellers or rotors. The rotors can be energized for providing a downward thrust in order to move the UAV.

The extension and retraction mechanism is adapted for moving the UAV landing platform between a landing position and a storing position.

In the landing position, the UAV landing platform is positioned outside the container.

The UAV landing platform is adapted for essentially not blocking the downward thrust of the UAV. The landing platform has openings for allowing an airflow of a downward thrust of a landing UAV to pass through the landing platform, wherein the landing platform does not interfere with the downward thrust. Similarly, the landing platform does not interfere with the downward thrust when the UAV is taking off from the landing platform.

The landing platform is also placed higher than a predetermined in-ground-effect height. A UAV, which is landing and is moving downward towards the UAV landing platform, is thus placed above the predetermined in-ground-effect height. At this height, the airflow of the downward thrust of the UAV is directed towards the ground, wherein the ground does not interfere with the downward thrust. If the landing UAV is placed below the predetermined in-ground-effect height, the ground can affect the airflow of the downward thrust, in that the ground causes a density of air, which is placed between the rotors of the UAV and the ground, to increase. This then causes a reduction of the downward thrust airflow, which, in turn, affects the landing of the UAV. This effect is also called a cushioning effect.

In the storing position, the UAV and the landing platform are positioned inside the container. This allows the UAV to be sheltered from the surrounding weather. It also protects the UAV from animals or unauthorized persons from accessing the UAV.

In short, the landing platform allows the UAV to land, wherein the airflow of the downward thrust of the landing UAV passes through the landing platform, such that the landing platform does not affect or interfere with the airflow.

The height of the landing platform prevents the ground from affecting the airflow of the downward thrust. In other words, the height of the landing platform eliminates or reduces in ground effect.

The landing platform advantageously improves the landing stability of the UAV.

The UAV storage module can be added to and can be removed from the UAV storage unit according to operational requirement. As an example, the UAV storage module can be removed away from the UAV storage unit to another site for repair or maintenance without affecting operation of the rest of the UAV storage unit. In other words, the number of UAV storage module can be changed according to operating needs.

The landing platform can comprise at least a pair of landing surfaces.

The landing surfaces can include inclined landing portions for contacting the landing UAV and for guiding the landing UAV to a predetermined landing position. This then allows the UAV to land on the predetermined landing position quickly and easily.

The landing surfaces can comprise a UAV charging element. The UAV charging element is adapted for charging a battery of the UAV when the UAV is positioned inside the container. This allows for replenishment of electrical energy of the UAV while the UAV is being stored in the container.

The UAV storage unit can also include a communication module. The communication module is adapted for enabling the UAV storage unit to communicate with other UAV storage units or with a central control station.

The communication module can be placed above the UAV storage modules. This higher position allows for better reception of signals.

The UAV storage unit can also include an electrical energy storage module. The electrical energy storage module is adapted for providing electrical energy to power the UAV storage unit.

The electrical energy storage module can be placed below the UAV storage modules. This allows the above UAV storage modules to be placed at higher levels for reducing in ground effect.

The application provides an improved protection storage unit for an Unmanned Aerial Vehicle (UAV).

The storage unit includes a UAV container, a moveable UAV landing platform, and a UAV receptacle. In use, the UAV receptacle is positioned above the UAV landing platform. The UAV receptacle includes one or more inclined surfaces for guiding a landing UAV to a predetermined UAV landing position on the UAV landing platform. Furthermore, the UAV container encloses the UAV.

This UAV receptacle allows for an accurate landing of the UAV, even when ground effect is present.

The UAV receptacle can have a shape of inverted pyramid frustum, although other shapes are possible.

The UAV landing platform often include a pair of UAV electrical power connector for connecting with a battery of the landing UAV. In other words, the electrical power connector allows for transfer of electrical energy to the UAV.

The UAV receptacle can include an extendable surface for adapting a dimension of the UAV receptacle according to a corresponding dimension of the landing UAV. In the words, the size of the receptacle can change for working different UAVs.

The application provides a further improved protection storage unit for enclosing an Unmanned Air Vehicle (UAV).

The storage unit includes comprising a UAV container and a moveable UAV landing platform.

In use, the UAV container encloses the UAV.

The moveable UAV landing platform provides a landing position and a storing position. In the landing position, the UAV landing platform is positioned for the UAV to land and to take-off. The UAV landing platform is often placed outside the container.

The UAV landing platform is adapted such that it essentially does not block an airflow of a downward thrust of a propeller of the UAV. The UAV landing platform is also positioned such that it prevents the ground from affecting the airflow of the downward thrust of the UAV.

In other words, the UAV does not essentially experience any ground effect or cushioning effect.

The UAV landing platform can include a pair of landing surfaces for contacting with the landing UAV.

The landing surfaces include portions for contacting the landing UAV and for guiding the landing UAV to a predetermined landing position.

The landing surfaces often include an electrical charging element for charging a battery of the UAV, when the UAV is positioned on the landing platform.

The storage unit can also include an extension and retraction mechanism for moving the UAV landing platform.

The storage unit often include a further container that stores a communication module.

This container, which stores the communication module is placed above the container that stores the UAV.

The storage unit can also include another container that stores an electrical energy storage module.

The container that stores the electrical energy storage module is often placed below the container that stores the UAV.

The application also provides another improved protection storage unit for enclosing an Unmanned Aerial Vehicle (UAV).

The storage unit includes a UAV container, a moveable UAV landing platform, and a UAV alignment unit.

In use, the container encloses the UAV. The UAV landing platform provides an area for the UAV to land and to take off. The UAV alignment unit is adapted for pushing the UAV, which is positioned on the UAV landing platform, to a predetermined landing area of the moveable UAV landing platform.

In practice, the UAV may not land accurately on a predetermined area of the landing platform. The UAV may bounce upon landing and thus be shifted away from the predetermined area. The inaccurate placement can hinder the moving of the landing platform to the inside of the container. The UAV alignment unit provides a benefit of correcting this inaccuracy by moving the UAV to the predetermined area.

The UAV alignment unit can include a positional detector for determining a position of the UAV, which has landed on the UAV landing platform.

The positional detector can include a weight sensor for determining a position of the UAV.

The UAV alignment unit can include comprises a plate for pushing the UAV, a fixed inclined walls for guiding the UAV, and/or two moveable inclined walls for guiding the UAV to the predetermined landing area.

The UAV landing platform often provides a landing position and a storing position. In the landing position, the UAV landing platform is positioned for the UAV to land and to take-off. In the storing position, the UAV landing platform is positioned inside the container.

The application also provides a further protection storage unit for an Unmanned Aerial Vehicle (UAV).

The storage unit includes a UAV container, a moveable UAV landing platform, and a UAV guidance beacon unit.

The container is used for enclosing the UAV. The UAV guidance beacon unit is provided for guiding the UAV to the UAV landing platform. The UAV guidance beacon includes a visible light ray source and an infrared light ray source.

The light ray source and infrared light ray source provide respective light rays for guiding the UAV to the UAV landing platform.

The UAV is equipped with corresponding cameras for detecting these light rays. The UAV then uses the detected light rays for guiding the UAV to the landing platform.

The different light rays allow for easier detection of the light rays. For example, in the event of bright sun lights, the visible light rays may be difficult to detect while the infrared light rays are easier to detect.

The beacon unit can include a visible light cover plate, which comprises at least one opaque areas for blocking the visible light rays of the visible light ray source and at least one transparent area, such that the visible light rays travel through the visible light cover plate to form a first predetermined guidance pattern.

The beacon unit can also include an infrared cover plate, which comprises at least one opaque area and at least one transparent area for blocking parts of the infrared light rays of the infrared light ray source, such that the infrared light rays travel through the infrared light cover plate to form a second predetermined guidance pattern.

The visible light ray source can also be adapted to generate at least one laser light ray with a visible light wavelength.

Similarly, the infrared light ray source can also is adapted to generate at least one laser light ray with an infrared light wavelength.

The UAV landing platform often provides a landing position and a storing position. In the landing position, the UAV landing platform is extended and is positioned for the UAV to land and to take-off. In the storing position, the UAV landing platform with any UAV, which has landed on the landing platform, is positioned inside the container.

The application provides a further improved protection storage unit for an Unmanned Aerial Vehicle (UAV).

The storage unit includes a UAV container, a UAV guidance camera, a moveable UAV landing platform, and a UAV guidance controller.

In use, the UAV guidance camera receives a beacon unit light signal from the UAV, the UAV being lequipped with a beacon unit for generating the beacon unit light signal.

The UAV guidance controller then generates one or more UAV flight instructions according to light signal data from the UAV guidance camera. The instructions provide steps for landing the UAV on the UAV landing platform. The UAV guidance controller then sends out the UAV flight instructions to the UAV.

The UAV later lands on the UAV landing platform according to the received instructions.

The container afterward encloses the UAV.

This arrangement of the storage unit allows the camera to be placed on the storage unit and not be placed on the UAV. In other words, this UAV has to bear the camera load, which can affect the performance of the UAV. This is unlike other arrangements, wherein the camera is placed in the UAV.

The storage unit can include a wind speed detector. The controller is then adapted for generating the UAV flight instruction according to wind speed data from the wind speed detector. In other words, the generation of the flight instruction takes into consideration the effect of wind speed.

The storage unit can also include a wind direction detector while the controller is further adapted for generating the UAV flight instruction according to wind direction data from the wind direction detector.

The storage unit often includes a wireless transmitter for sending out the UAV flight instruction (to the UAV).

The application provides another improved protection storage unit for an Unmanned Aerial Vehicle (UAV).

The storage unit includes a UAV container, a storage unit electrical power source, a tethering assembly, and a controller. The electrical power source is often placed inside the container. The tethering assembly connects the UAV to the container. The controller acts to manage or control the tethering assembly.

In detail, the container encloses and protects the UAV.

The tethering assembly includes a spool with a spool rotational sensor, a spool motor, an electrical utility cable, and a cable force sensor.

In use, the spool motor selectively rotates the spool.

The spool rotational sensor detects number of rotation of the spool and provides a rotational data of the spool.

The electrical utility cable winds and unwinds around the spool. The electrical utility cable includes a power supply electrical wire, which transfers electrical energy from the storage unit electrical power source to an electrical power source, such a battery, of the UAV.

The cable force sensor is attached to the UAV, wherein the cable force sensor provides a measurement of a force being exerted by the electrical utility cable onto the UAV.

The controller is adapted for receiving the force measurement from the cable force sensor and for receiving the spool rotational data from the spool rotational sensor. The controller then energizes the spool motor for rotating the spool according to the force measurement and to the spool rotational data. The controller can also be further configured for energizing the spool motor according to a flight plan of the UAV.

The container often includes a moveable cover for allowing the UAV to ingress into the container and to egress from the container.

The moveable cover can be adapted for rotating about a hinge, although other means of attaching the cover to the container are possible.

The electrical utility cable can include a sensor electrical wire for transferring the force measurement from the cable force sensor to the controller.

The electrical utility cable can also include a protection metal shield for surrounding and enclosing the power supply electrical wire.

The cable force sensor can also include a wireless transmitter for sending the force measurement wirelessly to the controller.

The storage unit electrical power source can also include a power inlet for receiving electrical energy from a land vehicle electrical power supply.

The tethering assembly often includes a bracket for supporting the spool and supporting a part of the electrical utility cable that is wound around the spool. The tethering assembly can also include at least one bracket force sensor. The bracket force sensor is intended for connecting the bracket to a support area, wherein the bracket force sensor provides a measurement of a force being exerted by the bracket onto the support area. The controller is then adapted for energizing the spool motor for rotating the spool according to said measurement from the bracket force sensor.

The application provides another improved protection storage unit for enclosing an Unmanned Aerial Vehicle (UAV).

The storage unit includes a UAV container for enclosing the UAV, and an external monitoring camera with an internal monitoring camera. The external camera is directed for taking external images of the storage unit while the internal camera is directed for taking internal images of the storage unit. The external images can show conditions of the storage unit, such amount of snow, which is placed on the storage unit. The internal images can show internal contamination of the storage unit, such as amount of dirt, snow, or sand in the storage unit.

These images allow a user to determine schedule for servicing the storage unit, which is important, especially when the storage unit is located in remote areas.

The application provides a further improved protection storage unit for enclosing an Unmanned Aerial Vehicle (UAV). The storage unit includes a UAV container for enclosing the UAV, and a set of weed killer sprayers. The weed killer sprayers are positioned in the vicinity of the container. The sprayers dispense weed killer at predetermined intervals for preventing growth of bushes around the container. This enables the container to be placed in remote areas where growth of bushes can hinder operation of the container.

The application also provides a further improved protection storage unit for enclosing an Unmanned Aerial Vehicle (UAV). The storage unit includes a UAV container and an electric fence. The container acts to enclose and to protect the UAV. The electric fence is placed around the container. The electric fence prevents or deters animals from accessing or reaching the storage unit. This important, especially when the storage unit is placed in a remote area where animals roam.

The application provides another improved protection storage unit for an Unmanned Aerial Vehicle (UAV).

The storage unit includes a UAV container with a first sliding cover and with a second sliding cover. These covers allow the UAV to ingress into the container. The covers are then actuated to enclose and to protect the UAV. The covers also allow the UAV to egress from the container.

The storage unit can include a rain sensor. Data from the rain sensor can be used to determine automatically the operation of the UAV.

The storage unit often includes a lift assembly with a moveable UAV platform for carrying the UAV. The lift assembly acts to position the UAV platform either inside or outside the container. The UAV platform provides an area of the UAV to land and to take off.

The storage unit can include a beacon unit, which is positioned on or near the UAV platform. The beacon unit provides light rays for guiding the UAV to the UAV platform. This allows for easy determination of location of the UAV platform, which is important, especially in bad weather conditions.

According to one aspect of the application, the storage unit includes a wireless charging unit, which is provided on the UAV platform. After the UAV is positioned on the UAV platform, the wireless charging allows for transfer of electrical energy from the container to a battery of the UAV.

For security reasons, the storage unit can include a tempering vibration sensor. Vibrations of the container often indicates attempt of unauthorized access of the container. Data from the vibration sensor can then be used for detecting this access and responding to it.

The storage unit can also include a Global Positioning Unit (GPS) unit for determining positional data of the storage unit. The storage unit can be placed in different places. The data allows for easy locating of the storage unit.

The storage unit often include a controller or a central control unit for managing or controlling parts of the storage unit.

The storage unit can also include an electrical energy storage for storing and providing electrical energy to parts of the storage unit and/or to the UAV.

The storage unit can also include a communication unit for exchanging data with the UAV or with an external unit.

The application provides an improved Unmanned Aerial Vehicle (UAV) module. The UAV module include one or more UAVs and one of the above-mentioned storage unit for enclosing and protecting said UAV.

The application provides an improved network of objects. Each object includes a sensor and a communication device. The communication device acts to receive data from at least one other object and/or from its sensor. The communication device then sends the data to another object. One or more objects are each provided by an Unmanned Aerial Vehicle (UAV). The network allows quick collection of data and quick response to the data while the UAV enable accesses to areas can be difficult to reach.

BRIEF DESCRIPTION OF THE SEVERAL VIEWS OF THE DRAWINGS

The subject matter of the application is described in greater detail in the accompanying Figures, in which.

DETAILED DESCRIPTION OF THE INVENTION

In the following description, details are provided to describe embodiments of the application. It shall be apparent to one skilled in the art, however, that the embodiments may be practiced without such details.

The embodiments have similar parts. The similar parts may have same names or similar part numbers. The description of one part applies by reference to another similar part, where appropriate, thereby reducing repetition of text without limiting the disclosure.

Figure 1:
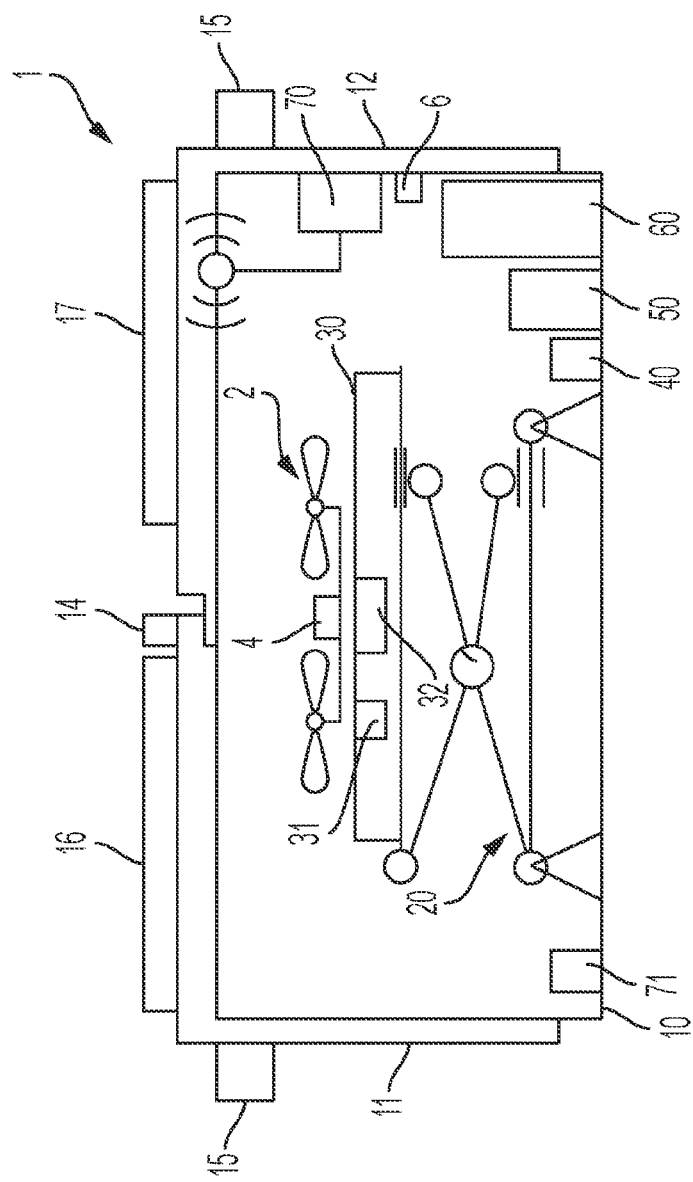
FIG. 1 illustrates a schematic view of a UAV assembly that comprises a first UAV protection storage device with a UAV, wherein sliding covers of the first UAV protection storage device are placed in a closed position.

FIG. 1 shows a UAV assembly that includes a UAV protection storage device 1 with an Unmanned Aerial Vehicle (UAV) 2 in which the UAV 2 carries an onboard UAV battery 4. The UAV protection storage device 1 comprises an enclosure box 10 with a first sliding cover 11 and a second sliding cover 12, which are shown in a closed position in FIG. 1. The first sliding cover 11 and the second sliding cover 12 are movable along a sliding path and they are actuated by an electric cover drive unit, which is not shown here.

The UAV protection storage device 1 further comprises a weather sensor 14, two external movement sensors 15, a fuel cell 6, a first solar cell unit 16, which is mounted to the first sliding cover 11 and a second solar cell unit 17, which is mounted to the second sliding cover 12.

A scissor lift assembly 20 is provided in the enclosure box 10, the scissor lift assembly 20 comprising a UAV platform 30, which carries the UAV 2. The UAV platform 30 is also called a UAV landing platform. A beacon unit 31 is provided on the UAV platform 30, as well as a wireless charging unit 32. The beacon unit 31 interacts with the UAV 2 in such a way that it provides a wireless alignment of the UAV 2 during a landing operation of the UAV 2 on the UAV platform 30. The beacon unit 31 therefore emits an optical or electro-magnetic signal, which can be detected by a corresponding receiver at the UAV 2.

The scissor lift assembly 20 can be moved by an electric or hydraulic actuator.

For detecting a movement of the UAV protection storage device 1, e.g. by an external tampering action, a vibration sensor and mercury switch assembly 40 is provided within the enclosure box 10. A Global Positioning System (GPS) tracker unit 71 provides the current position and current local time of the UAV protection storage device 1.

The aforementioned components of the UAV protection storage device 1 are managed by a central control unit 50, which is connected with an electrical energy storage 60. A communication unit 70 provides a transfer of information between the UAV protection storage device 1 and other devices, such as the UAV 2, a remote UAV management data center that is not shown here, or other UAV protection storage devices.

Figure 2:
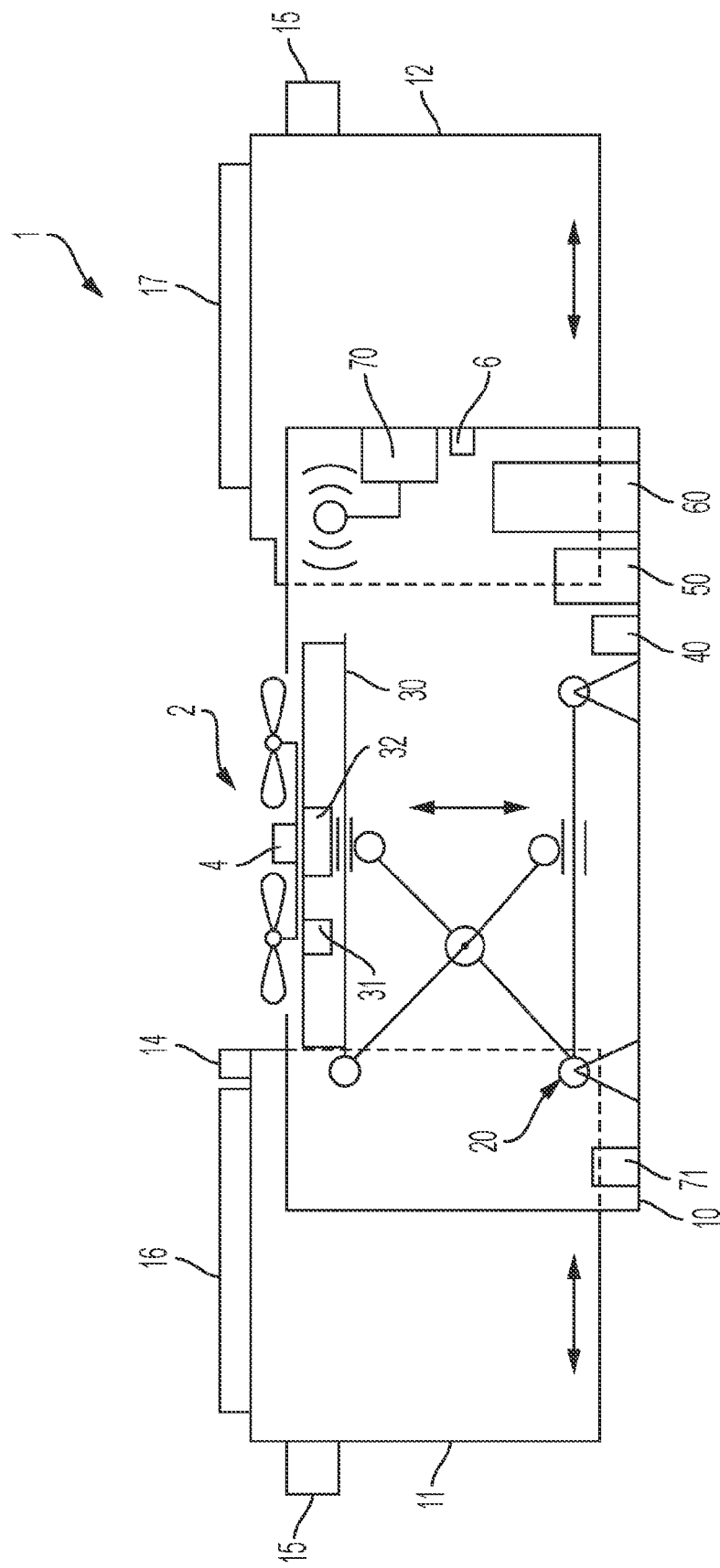
FIG. 2 illustrates the UAV protection storage device of FIG. 1, wherein its sliding covers are placed in an open position.

FIG. 2 shows the UAV protection storage device 1 of FIG. 1 with the first sliding cover 11 and the second sliding cover 12 in an open position. The first sliding cover 11 and the second sliding cover 12 have been moved by the electric cover drive unit, which in turn has been actuated by the central control unit 50. The electrical energy for the electric cover drive unit has been supplied by the electrical energy storage 60.

The scissor lift assembly 20 is now in an elevated position, as compared with FIG. 1, such that the upper level of the UAV platform 30 is essentially flush with the upper edge of the enclosure box 10. The UAV 2 is in ready-to-take-off position.

In the absence of unauthorized human activity, or any functional anomaly recorded by any sensor in the vicinity of the UAV protection storage device 1, the UAV 2 is allowed to take off. The take-off permission may be granted by a human operator or by a computer system based on a combination of state of charge of the UAV battery 4 as well as the state of charge of the electrical energy storage 60, favorable environmental or weather conditions, routine autonomous flight schedule, or manual flight control, or anomaly type, determined by a sensor in the vicinity of the UAV protection storage device 1. The environmental conditions include temperature, humidity, wind, and precipitation.

Before take-off, the weather sensor 14 makes a decision whether to open or close the sliding covers 11 and 12 based on environmental conditions. If environmental conditions are not acceptable, the sliding covers 11 and 12 do not open and a message is sent to the operator. If environmental conditions are acceptable, the sliding covers 11 and 12 slide open and the scissor lift assembly 20 rises while the UAV prepares for flight while still attached to the UAV platform 30. Same for the state of charge of the UAV battery 4 as well as the state of charge of the electrical energy storage 60. If the UAV battery 4 as well as the electrical energy storage 60 is fully charged, the doors will open. If the UAV battery 4 as well as the electrical energy storage 60 is not fully charged, the doors will not open.

After all checks are complete, while the UAV 2 is still on its platform and prior to take-off, a pre-programmed flight route is selected by the UAV's operating system, or a new flight route is selected by a remote operator. This flight path is directly associated with a routine activity, or associated to the location of an anomaly, which is determined by a sensor in the vicinity of the UAV 2 and the data processing software that is connected to that sensor. After take-off, the sliding covers 11 and 12 close. After completing its mission, the UAV 2 finds its way back to the UAV protection storage device 1 using an autonomous navigation system. The sliding covers 11 and 12 open to allow the UAV platform 30 to be raised by the scissor lift assembly 20.

The UAV 2 lands onto the UAV platform 30 using a GPS guided precision navigation system where the GPS signal is available and usable. In other words, this GPS signal has a low level of noise and a sufficiently high level of signal strength. Similarly, the UAV 2 lands onto the UAV platform 30 using a GPS-independent precision navigation system where the GPS signal is not available or unusable. An example of the GPS-independent precision navigation system includes an infrared signal paired between the beacon unit 31 with a sensor onboard the UAV 2.

After landing, sensors on the UAV protection storage device 1 determine the accuracy of position of the UAV 2. The UAV platform 30 will be shifted slightly downwards, while the sliding covers 11 and 12 slide towards the UAV 2 to push it into a central position on the UAV platform 30. The sliding covers 11 and 12 open again, the UAV platform 30 descends fully until it reaches its lower limit. Once the lower limit is reached, the sliding covers 11 and 12 close. The UAV battery 4 charging sequence begins, using the electrical energy storage 60, which is charged using the solar cell units 16 and 17 and/or fuel cell 6.

The sliding covers 11 and 12 have the shape of boxes with two open surfaces, of which one is an open lower surface, facing towards the enclosure box 10, and of the other one faces towards the other sliding cover. The shape of the sliding covers provides an easy opening in a horizontal sliding direction. In a closed state of the UAV protection storage device 1, edges of the sliding covers 11 and 12 abut against each, thereby complementing each other in order to form a closed cover that prevents the elements from entering the inside of the enclosure box 10. In an open state, the sliding covers 11 and 12 open wide in order to allow the UAV 2 to leave the enclosure box 10 through its upper side, which is open.

In a general sense, the UAV protection storage device 1 as described in FIG. 1 and FIG. 2 serves as the device for retrieving and storing the UAV 2 within a protective enclosure at the end of its flight operation. With the closure of the sliding covers 11 and 12, the retrieved UAV 2 is further protected from the effects of weather, such as rain, snow, dust, and water, and from insects and animals.

The weather sensor 14 detects the presence of rain or snow falling on the sensor itself by measuring the ambient precipitation and surface temperature of the upper surface of the sliding covers 11 and 12. Once the weather sensor 14 has detected rainfall or snowfall conditions, it may transmit the necessary command signal to actuate the electric cover drive unit to close the sliding covers 11 and 12. The use of the weather sensor 14 to detect the presence of rainfall or snowfall conditions may also facilitate the central control unit 50 to autonomously manage the decision-making process in regards to determining whether the UAV 2 may be permitted to take-off or land under varying degrees of severity of rainy or snowy environmental conditions. This decision-making process may be initiated by the weather sensor 14 with the transmission of a feedback signal to the central control unit 50 to manage the actuation of the electric cover drive unit to open or to close the sliding covers 11 and 12.

As the take-off and landing phases of the UAV 2 are the most safety critical aspects of its flight operation, it is imperative that considerations are given to mitigate the potential safety hazard posed by unauthorized human activity that may be happening near and around the UAV protection storage device 1. By mounting the two external movement sensors 15 on the sliding covers 11 and 12, it is possible to detect the presence of people moving in the vicinity of the UAV protection storage device 1.

When unauthorized human activity is detected, the external movement sensors 15 may transmit an alarm signal to the central control unit 50 in order to autonomously manage the decision-making process in regards to determining whether the UAV 2 may be permitted to take-off or land in the presence of unauthorized human activity under three pre-defined case scenarios. Two case scenarios are applicable for determining whether the UAV 2 is allowed to take-off and one case scenario is applicable for determining whether the UAV 2 is allowed to land.

For the first case scenario that relates to deciding whether the UAV 2 is allowed to take-off, the UAV 2 is positioned on the UAV platform 30, with the scissor lift assembly 20 in its closed position and the sliding covers 11 and 12 in their closed positions. Under this case scenario, when the central control unit 50 receives the feedback signal from the external movement sensors 15, informing the presence of unauthorized human activity in the vicinity of the UAV protection storage device 1, the central control unit 50 may register an internal 'Cover Not Ready' logic state. This logic state prevents the central control unit 50 from transmitting the command signal to the electric cover drive unit to open the sliding covers 11 and 12. This in turn prevents the scissor-lift assembly 20 from elevating the UAV 2 to its ready to take-off position.

Thus the UAV 2 is prevented from taking-off under this case scenario.

For the second case scenario that relates to deciding whether the UAV 2 is allowed to take-off, the UAV 2 is positioned on the UAV platform 30, with the scissor lift assembly 20 in its opened position and the sliding covers 11 and 12 in their opened positions. Under this case scenario, when the central control unit 50 receives the feedback signal from the external movement sensors 15, informing the presence of unauthorized human activity in the vicinity of the UAV protection storage device 1, the central control unit 50 may register an internal 'Take-off Not Ready' logic state. This logic state triggers the central control unit 50 to relay the transmission of a 'No Go' status signal to the UAV 2 via the communication unit 70.

The propulsion unit of the UAV 2 is prevented from starting up. This in turn prevents the UAV 2 from taking-off under this case scenario.

For the case scenario that relates to deciding whether the UAV 2 is allowed to land, the UAV 2 is positioned at a pre-determined final approach altitude before performing its landing procedure on the UAV platform 30. Under this case scenario, when the central control unit 50 receives the feedback signal from the external movement sensors 15, informing the presence of unauthorized human activity in the vicinity of the UAV protection storage device 1, the central control unit 50 may register an internal 'Landing Not Ready' logic state. This logic state triggers the central control unit 50 to relay the transmission of a 'No Go' status signal to the UAV 2 via the communication unit 70. The UAV 2 remains hovering on station at its pre-determined final approach altitude. This in turn prevents the UAV 2 from landing under this case scenario.

If the UAV 2 has a low-battery situation, the UAV 2 can emit distress signals to other UAV protection storage devices, which are located within its flying distance. These nearby UAV protection storage devices then check signals from its sensors.

If the signals indicate that it is safe for its UAV to fly and to vacate its UAV protection storage device, the UAV then initiates a take-off sequence to land at a nearby safe location, thereby allowing the UAV 2 with the low battery situation to land at this nearby UAV protection storage device for charging its battery. The safe location is also called a rally point. However, should no such UAV protection storage devices be available, the UAV 2 with the low battery situation can elect to land at a nearby safe location for resting.

In either case, an alarm is triggered at a remote UAV management center to alert operators of the low-battery situation for addressing it.

The solar cell units 16 and 17 allow the UAV protection storage device 1 to receive energy from a naturally sustainable resource—the Sun. By converting the received solar energy into electrical energy, the electrical energy storage 60 may be used to collect some of the converted electrical energy at pre-determined time intervals on a daily basis under daylight conditions. The remaining converted electrical energy that is not collected by the electrical energy storage 60 during daylight conditions is used to operate the UAV protection storage device 1 during daytime.

During twilight conditions in the absence of the Sun, the electrical energy that is stored in the electrical energy storage during daylight conditions may be used to operate the UAV protection storage device 1 at night. Since this energy usage and storage cycle is repeated on a daily basis, the UAV protection storage device 1 is not dependent on human intervention to replenish its energy supply. This allows the UAV protection storage device 1 enables to be used in support of UAV operations in remote geographical regions where the logistical requirements for maintaining a constantly available energy supply chain may be very demanding.

An external fuel cell system supplements solar power in case the usage frequency of the storage system and UAV needs to accelerate or become constant. This may be in the form of the fuel cell 6 placed inside the enclosure box 10 for protection.

The scissor lift assembly 20 enables the UAV platform 30 to be elevated to the required height such that the upper level of the UAV platform 30 is essentially flush with the upper edge of the enclosure box 10 in order to cater for maximum safety clearance for the UAV 2 during take-off and landing operations.

The UAV platform 30 serves as a dedicated take-off and landing surface from which the beacon unit 31 and the wireless charging unit 32 serve as the immediate points of interaction between the UAV 2 and the UAV protection storage device 1.

The vibration sensor and mercury switch assembly 40 may provide a means for detecting possible theft of the UAV protection storage device 1. The vibration sensor detects slight shaking movement, which can serve as an indication of tampering. The mercury switch detects tilting, which can also serve as an indication of tampering.

In the event that theft has taken place, the GPS tracker unit 71 provides a means to locate the stolen UAV protection storage device 1.

If mission critical data is stored on the stolen UAV protection and storage unit 1, all such data can be securely wiped in the event of an attempted theft. In other words, the mission critical data is erased such that an unauthorized essentially cannot access the data.

The navigation system used by the UAV also serves as a tracker of the device. This tracker device can be on the UAV, as well as inside the protection storage device.

The central control unit 50 provides the means for controlling the automated functions of the UAV protection storage device 1 without the presence of human intervention during operation.

The electrical energy storage 60 provides the means for storing electrical energy received from the solar cell units 16 and 17, and or an external fuel cell 6 designed to supplement solar power in case of lack of sun, or increased frequency of activity. The stored electrical energy can be used to operate the electrical systems of the UAV protection storage device 1 as well as to provide a means to replenish the electrical energy storage onboard the UAV 2. The electrical energy storage is in the form of a battery bank located inside the UAV protection storage device 1. This battery bank accumulates solar energy until fully charged. Once fully charged, the charging system is deactivated. If a discharge of the battery-bank is sensed, the charging system is reactivated until charge is full. The battery bank transfers its stored energy to the UAV battery 4 using a contact or the wireless charging unit 31. Once the UAV battery 4 is fully charged, the charging mechanism is deactivated. If the UAV battery 4 becomes slightly discharged during non-operation, the charging mechanism is reactivated until it is fully charged. In one implementation, the charging mechanism is reactivated when the UAV battery 4 has less than an acceptable limit, a full charge being nominally 95%.

The communication unit 70 serves as the transmitter and receiver of internal wired and wireless signal data between the components of the UAV protection storage device 1. It also serves as the transmitter and receiver of wireless signal data between the UAV protection storage device 1 and other devices, such as the UAV 2, the remote UAV management data center, the remote UAV pilot, or other UAV protection storage devices. It also serves as a data transfer hub for other sensors in its vicinity.

When closed, the UAV storage device is sealed and shielded from dust, rain, water, insects and other animals, and isolated from extreme temperature conditions. In other words, the doors are locked to prevent theft of the UAV 2 and unauthorized access to internal components of the UAV storage device.

In a general sense, the beacon unit 31 can emit infrared, acoustic, or another suitable signal for detecting by a corresponding receiver at the UAV 2.

The pre-programmed flight route of the UAV 2 can be selected by an operating system of the UAV 2 or by an operating system of the protection storage device 1.

The sliding covers 11 and 12 can be replaced other types of doors, such as a pivoting cover or dome.

The autonomous navigation system of the UAV 2 can be provided as a Global Positioning System (GPS), an inertial guidance system, as well as other types of guidance system. The inertial guidance system refers to a computer with motion sensors and rotation sensors to calculate via dead reckoning the position, orientation, and velocity of a moving object without the need for external references. The velocity refers to direction and speed of movement. Examples of the motion sensors include accelerometers while examples of the rotation sensors include gyroscopes.

The weather sensor 14 detects other environmental hazards, such sand, and frost, besides detecting the presence of rain or snow. The frost can impair or disable battery operation.

In a general sense, the scissor lift assembly 20 can be replaced by a linear lift assembly.

Figure 3:
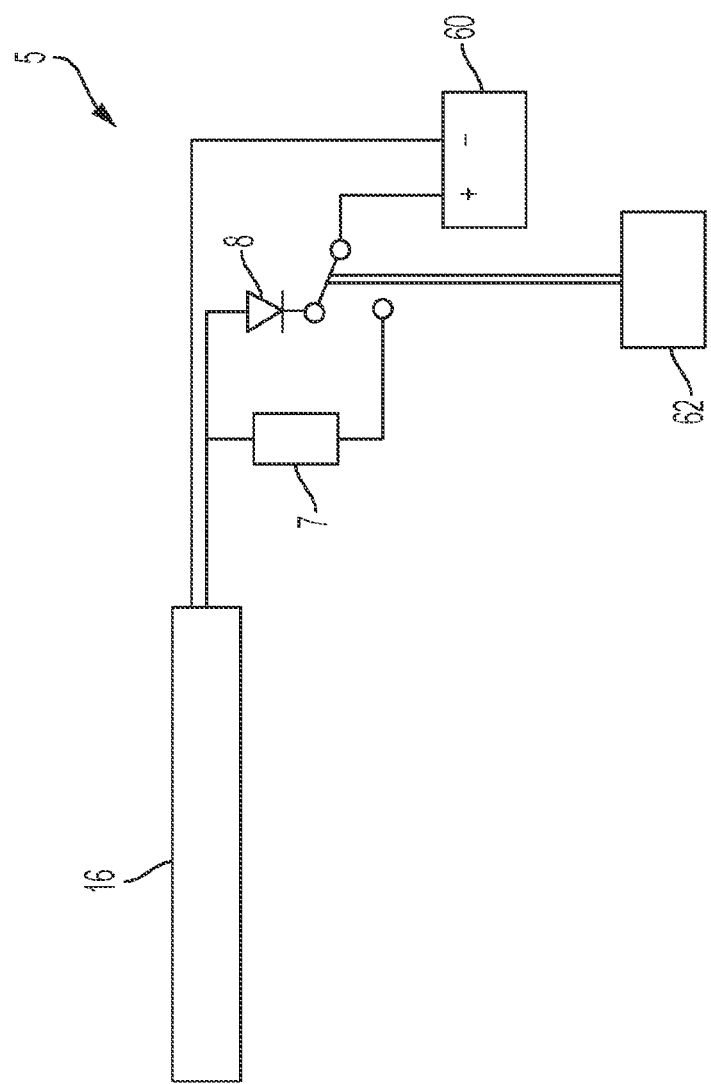
FIG. 3 illustrates a solar cell circuit for the UAV protection storage device of FIG. 1.

FIG. 3 shows a first solar cell circuit 5 of the first solar cell unit 16 of FIG. 1, in which an electrical resistor 7 and a diode 8 are used in conjunction with a single-pole, single-throw switch 62 for switching between a heating mode and a charging mode of the electrical energy storage 60.

The state of the first solar cell circuit 5 in FIG. 3 demonstrates the charging mode of the electrical energy storage 60. The diode 8 prevents a reverse current flow from the electrical energy storage 60 through the first solar cell unit 16.

Upon the switch 62 being moved to its other state—not shown here—the first solar cell unit 16 is operated in reverse direction and the resistor 7 prevents the first solar cell unit 16 from being destroyed by the electrical current. The resistor 7 is arranged adjacent to the first solar cell unit 16 and they together provide a heating power to the upper surface of the first solar cell unit 16. This can be used for melting ice and snow, which may have developed on the upper surface of the first solar cell unit 16.

In use, the central control unit 50, through a control line, can activate the switch 62. The control line is not shown here. Alternatively, the switch 62 can activate the heating of the upper surface of the first solar cell unit 16 by an internal control device.

The second solar cell unit 17 may or may not be integrated into a circuit, which is similar to the first solar cell circuit 5 as described above.

Figure 4:
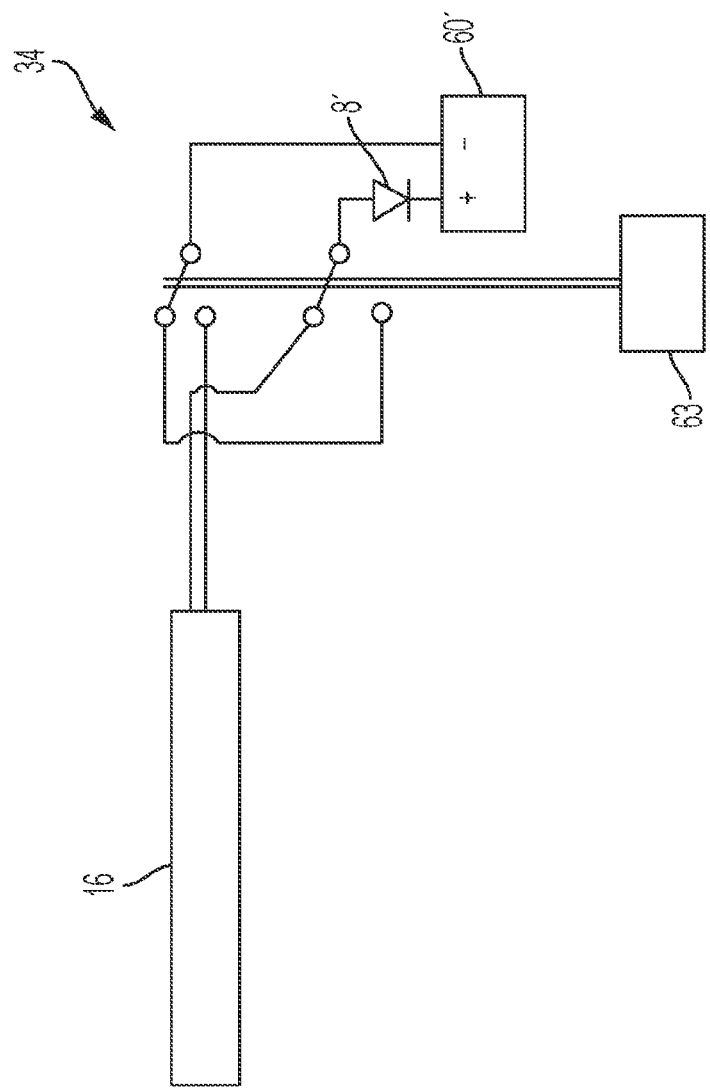
FIG. 4 illustrates an alternative solar cell circuit for the UAV protection storage device of FIG. 1.

FIG. 4 shows a second solar cell circuit 34, which can be used—instead of the first solar cell circuit 5 in FIG. 3—for the first solar cell unit 16 of FIG. 1. In the second solar cell circuit 34, a diode 8' is used in conjunction with a double-pole, single-throw switch 63 for switching between a heating mode and a charging mode of the electrical energy storage 60.

The state of the second solar cell circuit 34 in FIG. 4 demonstrates the charging mode of the electrical energy storage 60. The diode 8' prevents a reverse current flow from the electrical energy storage 60 through the first solar cell unit 16.

Upon the switch 63 being moved to its other state—not shown here—the first solar cell unit 16 provides a heating power on its upper surface. This can be used for melting ice and snow, which may have developed on the upper surface of the first solar cell unit 16.

In use, the central control unit 50, through a control line, can activate the switch 63. The control line is not shown here. Alternatively, the switch 63 can activate the heating of the upper surface of the first solar cell unit 16 by an internal control device.

The second solar cell unit 17 may or may not be integrated into a circuit, which is similar to the first solar cell circuit 34 as described above.

Figure 5:
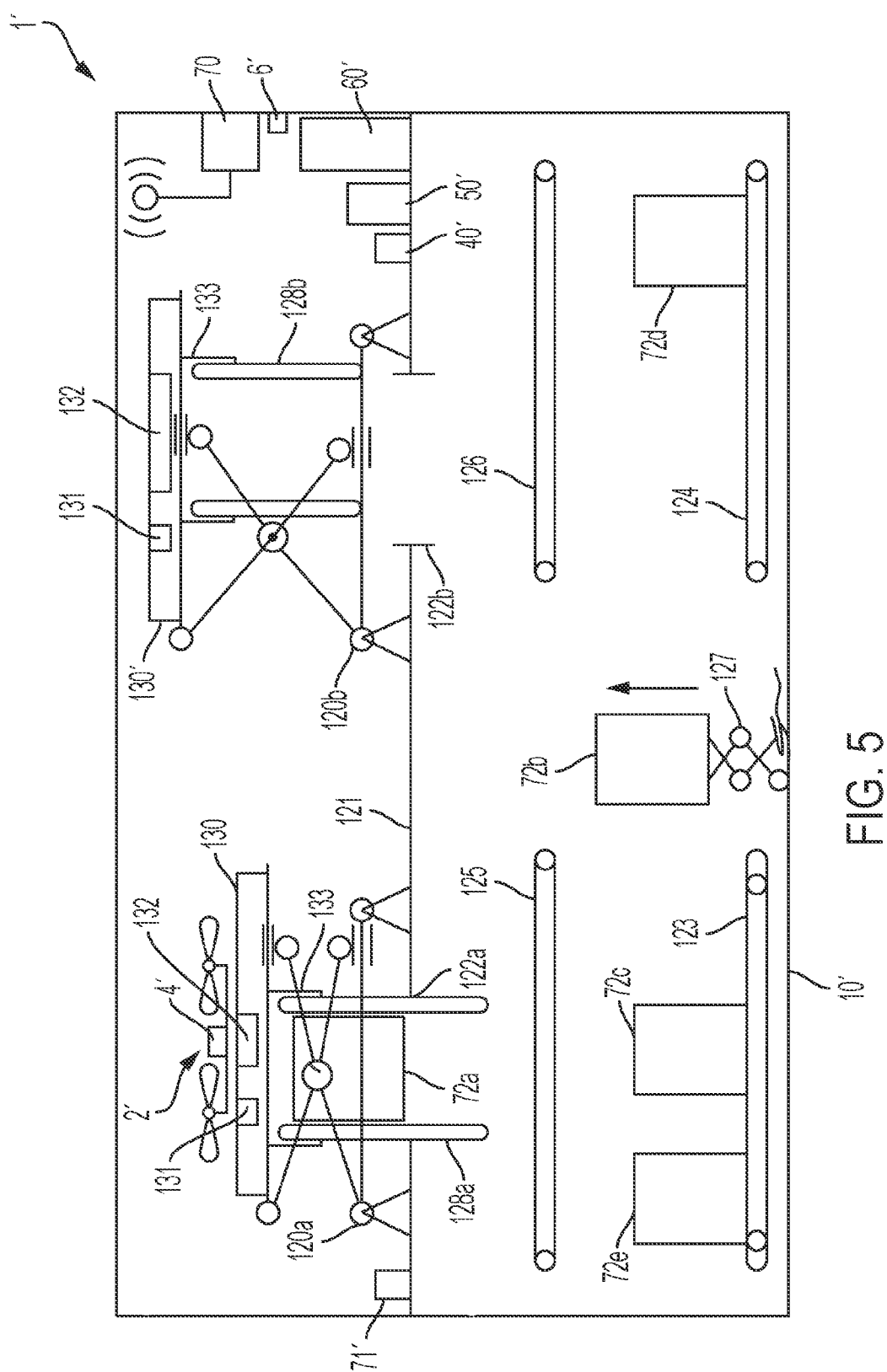
FIG. 5 illustrates a schematic view of a further UAV assembly that includes a second UAV protection storage device with two UAVs.

FIG. 5 shows a detailed view of a further UAV assembly that includes a second UAV protection storage device 1' with two UAVs 2'. Parts of the second UAV protection storage device 1' that are identical or similar with parts of the first UAV protection storage device 1 have the same reference numeral as those in FIG. 1, with a prime symbol added.

In FIG. 5, the second UAV protection storage device 1' comprises an enclosure box 10' with an enclosure compartment divider 121 that separates an enclosure lower compartment 118 from an enclosure upper compartment 119. The enclosure compartment divider 121 further comprises a first opening 122a and a second opening 122b.

The lower compartment 118 comprises a lower first conveyor 123, a lower second conveyor 124, an upper first conveyor 125, and an upper second conveyor 126. The conveyors 123, 124, 125 and 126 serve to transport parcels 72a, 72b, 72c, 72d, and 72e to and from an inter-conveyor parcel manipulator 127. The inter-conveyor parcel manipulator 127 provides the primary means of transferring the parcels 72a between the conveyors 123 and 124 and the conveyors 125 and 126.

A first scissor lift assembly 120a and a second scissor lift assembly 120b are provided in the upper compartment 119, the scissor lift assemblies 120a and 120b each comprise a UAV platform 130, which carries the UAV 2'.

The UAV platform 130 comprises an aperture 133, which passes from its bottom surface to its top surface. A conveyor-to-UAV parcel manipulator 128 is mounted on the bottom surface of the UAV platform 130 to facilitate the transfer of parcels 72a from the conveyors 125 and 126 to the UAV 2' via the aperture 133 of the UAV platform 130.

A beacon unit 131 is further provided on the UAV platform 130, as well as a wireless charging unit 132. The beacon unit 131 and the wireless charging unit 132 interact with the UAV 2' in same way as the way the beacon unit 31 and the wireless charging unit 32 interact with the UAV 2 described in FIG. 1.

The components in FIG. 5 that are similar in form and function to those described in FIG. 1 are the vibration sensor and mercury switch assembly 40', the central control unit 50', the electrical energy storage 60', the communication unit 70' and the GPS unit 71'. These components are shown to be located in the upper compartment 119 but they may also be located in the lower compartment 118.

The UAVs 2' comprise a carrier unit—not shown here—for attaching objects, such as the parcel 72a or further devices, that can be remotely released.

In a general sense, the second UAV protection storage device 1' as described in FIG. 5 provides the expanded capability for retrieving and storing up to two UAVs 2' within a protective enclosure at the end of their flight operations, or at the beginning of flight operations for one UAV 2', and the end of one flight operation for the other UAV 2'. The protective, safety and electrical energy storage features of the second UAV protection storage device 1' in FIG. 5 are similar to the features described for the first UAV protection storage device 1 in FIG. 1.

The scissor lift assemblies 120a and 120b shown in FIG. 5 provide the similar function to the scissor lift assembly 20 of FIG. 1, by elevating the UAV platform 130 in order to cater for maximum safety clearance for the UAVs 2' during take-off and landing operations. While the UAV platform 130 in FIG. 5 serves the basic function as a dedicated take-off and landing surface similarly to the UAV platform 30 as described in FIG. 1, the UAV platform 130 further provides the means to transfer parcels 72a from the conveyors 125 and 126 to the UAV 2'.

A UAV carrying a parcel from a departure point to an arrival point can select a path with UAV relay points, these relay points being composed of UAV protection storage devices with available storage space, so that the UAV with consumed power supply can bring the parcel to other fully charged UAVs, and for the parcel to reach the arrival point in the shortest amount of time. Once the path is determined, the UAV carrying a parcel will travel towards the first UAV protection storage device. Once it is flying above or nearby the first UAV protection storage device, the first UAV protection storage device opens its sliding covers to reveal its available storage space. The UAV 2' with parcel lands on its UAV platform 130 and is lowered into the UAV protection storage device, in order to replenish its batteries. The sliding covers of the UAV protection storage device close to seal the UAV and its contents inside the UAV protection storage device during charge or parcel transfer. The parcel can either stay on the same UAV until the UAV battery is fully charged and for the journey to continue if travel time is not a constraint, or the parcel can be transferred to another fully charged UAV 2' located in an adjacent UAV protection storage device to minimize overall travel time of the parcel. For the parcel transfer to take place, the first UAV 2' releases the parcel onto a conveyor belt system located below its UAV platform 130. Once released, the parcel moves inside a space with a length composed of the length of both boxes above it, towards and below the fully charged UAV. The fully charged UAV's conveyor-to-UAV parcel manipulator 128*b* reaches for the parcel and secures it, in the same way as the first incoming UAV's conveyor-to-UAV parcel manipulator 128*a*. Meanwhile the first UAV transfers the flight path to the second UAV. Once the parcel is secured on the fully charged UAV, weather, human or animal proximity and other conditions are checked so that it is safe for the UAV to take off. With all external conditions checked and deemed acceptable, the sliding covers open, the UAV platform rises, and the UAV takes off applies the original route determined by the first UAV, whose destination is either the final arrival point or the next UAV protection storage device as a relay point for the parcel to be transferred to another fully charged UAV.

Figure 6:
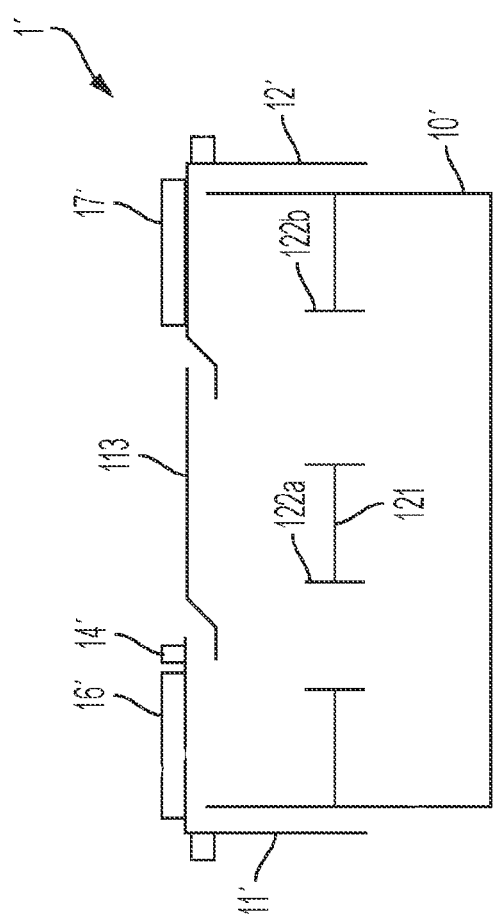
FIG. 6 illustrates a schematic view of the second UAV protection storage device of FIG. 5, wherein sliding covers of the second UAV protection storage device are placed in a closed position.

FIG. 6 shows a schematic view of the second UAV protection storage device of FIG. 5, in which its first sliding cover 11' and its second sliding cover 12' are in their first positions, and a movable middle cover 113 is in its first position.

Figure 7:
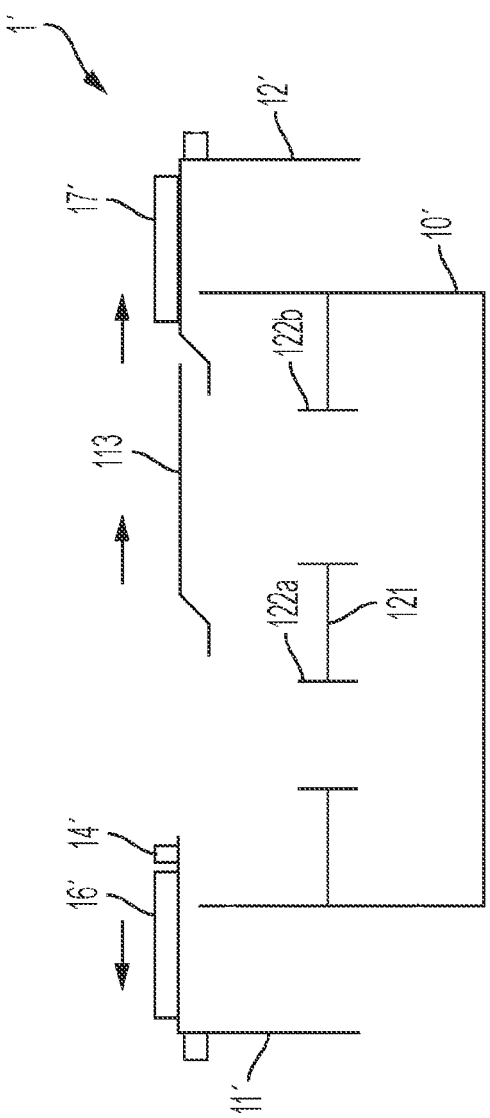
FIG. 7 illustrates a schematic view of the second UAV protection storage device of FIG. 5, wherein its sliding covers are placed in a partly open position.
Figure 8:
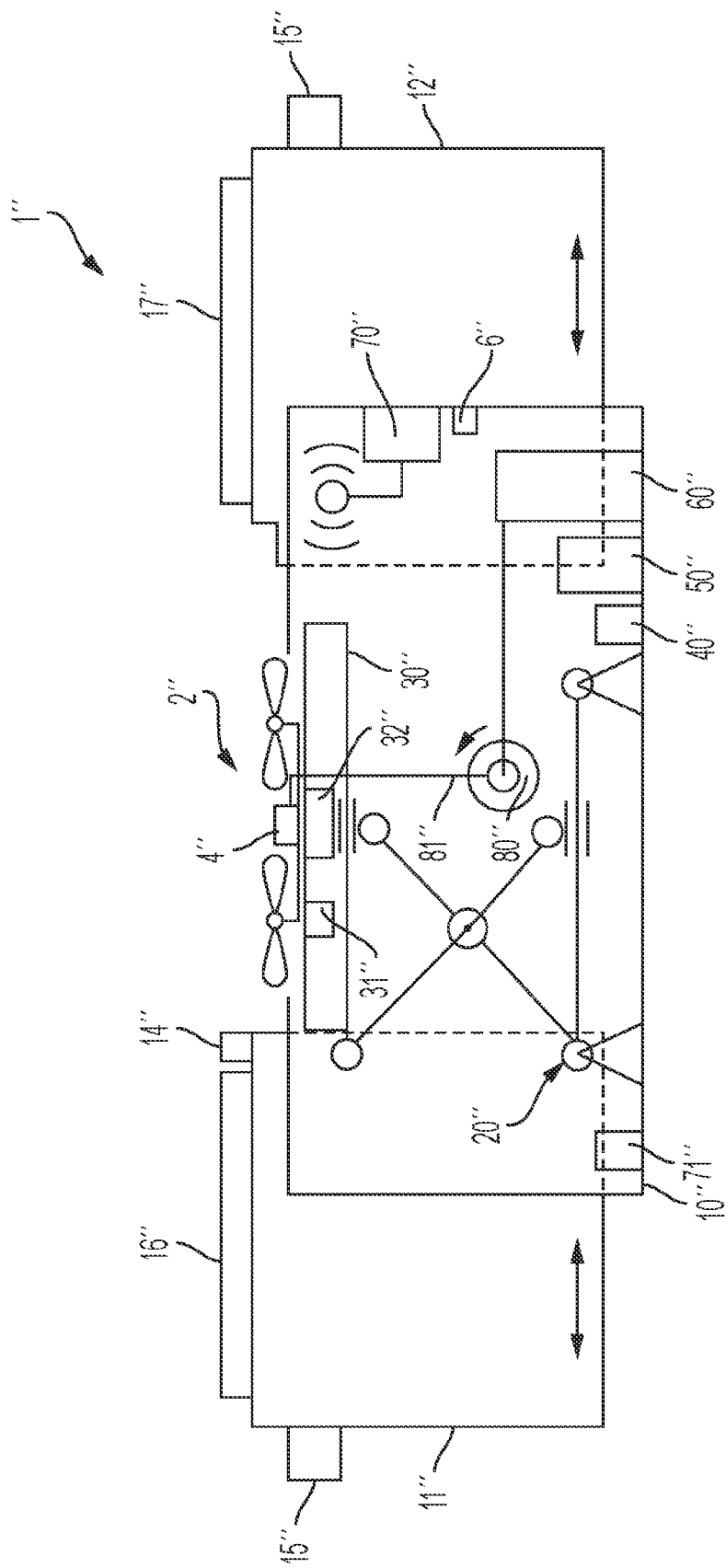
FIG. 8 illustrates a schematic view of another UAV assembly that includes a mobile UAV protection storage device and a tethered UAV.

FIG. 7 shows a schematic view of the second UAV protection storage device of FIG. 5, in which its first sliding cover 11' and its second sliding cover 12' are in their second positions, and the movable middle cover 113 is in its second position FIG. 8 shows another UAV module. The UAV module includes a UAV protection storage device 1" and a tethered UAV 2". The UAV 2" is connected to the UAV protection storage device 1" by a cable.

The tethered UAV 2" also includes an onboard battery 4", a plurality of UAV sensors, a wireless data transceiver, and a UAV controller. The UAV sensors, the wireless data transceiver, and the controller are not shown in FIG. 1. The UAV sensors comprise sensors deemed necessary for a particular mission, such as a surveillance camera, a LIDAR sensor, or infrared sensor. The LIDAR sensor allows a surveying technology to measure distance by illuminating a target with a laser light. The controller is electrically connected to the battery 4", the UAV sensors, and the wireless data transceiver.

The UAV 2" also comprises a parcel carrier unit—not shown here—for attaching, carrying, and releasing objects. The parcel carrier unit is also called a claw.

Referring to the UAV protection storage device 1", it includes an enclosure box 10", an electrical cable assembly, a scissor lift assembly 20", and an electrical module. The scissor lift assembly 20" is placed inside the enclosure box 10".

The enclosure box 10" comprises a pair of sliding covers, namely a first sliding cover 11" and a second sliding cover 12", and an electric cover drive unit. The electric cover drive unit is not shown in FIG. 1. The electric cover drive unit is adapted for moving the first sliding cover 11" and the second sliding cover 12" along a sliding path.

The scissor lift assembly 20" comprises a movable UAV platform 30" with a lifting mechanism, a UAV guidance beacon unit 31", and a wireless power-charging transmitter 32". The guidance beacon unit 31" and the wireless power-charging transmitter 32" are positioned in the vicinity of the platform 30".

The electrical module includes a plurality of ground sensors, a communication unit 70", a central control unit 50", and an electrical power supply module. The electrical power supply module is electrically connected to the ground sensors, to the communication unit 70", and to the central control unit 50".

In detail, the box sensors comprise a weather sensor 14", two external movement sensors 15", a tamper vibration sensor and mercury switch assembly 40", and a Global Positioning System (GPS) tracker unit 71". The GPS tracker unit 71" is also called a positional tracking unit.

The power module includes a fuel cell 6", a first solar cell unit 16" with a second solar cell unit 17", and an electrical energy storage 60". The first solar cell unit 16" is mounted to an external surface of the first sliding cover 11", while the second solar cell unit 17" is mounted to an external surface of the second sliding cover 12" for receiving sunlight. The fuel cell 6" is placed inside the enclosure box 10". The electrical energy storage 60" is electrically connected to the fuel cell 6", the first solar cell unit 16", and the second solar cell unit 17".

The electrical cable assembly comprises a cable spool 80" with a shielded electrical supply line 81".

The shielded electrical supply line 81" has an elongated shape. One end of the shielded electrical supply line 81" is electrically connected to the electrical energy storage 60" while another end of the shielded electrical supply line 81" is electrically connected to a power supply of the UAV 2". A part of the shield electrical supply line 81" is wrapped about the cable spool 80".

In a further embodiment, the electrical energy storage 60" is electrically connected with an energy source of a vehicle that transports the mobile UAV protection storage device 1".

In another embodiment, the electrical energy storage 60" is replaced by an energy source of a vehicle that transports the mobile UAV protection storage device 1".

In a further embodiment, the electrical energy storage 60" is electrically connected with or be replaced by an energy source of a vehicle—not shown here—that transports the mobile UAV protection storage device 1".

In another embodiment, the electrical energy storage 60" is electrically connected with or be replaced by an alternative energy source, for example, a hydrogen fuel cell system.

In a further embodiment, the solar cell units 16 and 17 are mounted on the ground for receiving sunlight.

In use, the UAV 2" acts as an aircraft without a human pilot aboard the UAV 2".

The UAV 2" is intended for taking-off and landing essentially in the vertical direction. In detail, the UAV 2" moves upward, essentially in the vertical direction, for leaving the UAV protection storage device 1". The UAV 2" also moves downwards, essentially in the vertical direction, for returning to the UAV protection storage device 1".

The wireless data transceiver of the UAV 2" is used for communicating with the communication unit 70" of the UAV protection storage device 1". In a general sense, the wireless data transceiver can also communicate with a remote UAV management module or a remote UAV pilot.

In one embodiment, for security, the communication unit 70" encrypts and decrypts data using strong encryption methods, such as Advanced Encryption Standard (AES), Triple Data Encryption Algorithm (TDEA or Triple DEA), or any such equivalent cryptographically strong methods.

The UAV sensors are used for taking measurements, especially when the UAV 2" is flying or is in the air. As an example, the UAV sensors can include a surveillance camera that is used for taking aerial pictures of the ground. The UAV sensors can also include a temperature and humidity sensor for measuring temperature and humidity of the atmosphere.

The wireless data transceiver is also used for sending the sensor measurements to the communication unit 70".

Referring to the UAV protection storage device 1", it serves as a protective enclosure for receiving and storing the UAV 2".

The electric cover drive unit receives electrical energy from the electrical energy storage 60" for moving the first sliding cover 11" and the second sliding cover 12", when the central control unit 50" activates or energizes the electric cover drive unit.

The first sliding cover 11" together with and the second sliding cover 12" provides two positions, namely an open position and a closed position.

The open position allows the UAV 2" to enter or leave the enclosure box 10". The closed position acts to protect the UAV 2", which is placed inside the enclosure box 10", from external effects of weather, such as rain, snow, dust, and water, and from insects and animals.

Referring to the scissor lift assembly 20", the platform 30" serves to support or bear the weight of the UAV 2".

The beacon unit 31" is intended for guiding the UAV 2" to land accurately on the UAV platform 30". In detail, the beacon unit 31" emits an optical electro-magnetic guidance signal, which can be received by a receiver of a nearby UAV. The nearby UAV then uses the guidance signal to locate and to align with the UAV platform 30" in order to land accurately on the UAV platform 30".

The lifting mechanism is used for placing the platform 30" at an elevated position and at a storing position.

In the elevated position, an upper level of the UAV platform 30" is placed essentially flush with the upper surface of the enclosure box 10". This elevated position allows the UAV 2" to take-off easily from the enclosure box 10". Put differently, the UAV 2" can leave the enclosure box 10" easily and safely without the flying UAV 2" damaging any part of the UAV protection storage device 1". This elevated position also allows the UAV 2" to land easily and safely on the UAV platform 30".

The storing position allows the UAV 2", which is resting on the platform 30", to be placed inside the enclosure box 10", wherein the sliding covers 11" and 12" can be placed in the closed position.

Referring to the ground sensors, the weather sensor 14" measures ambient precipitations and surrounding temperature of the enclosure box 10" as well as wind speed and direction, and dust levels. The weather sensor 14" then sends the measurement information to the central control unit 50".

The two external movement sensors 15" detect the presence of people or animals, which are in the vicinity of the UAV protection storage device 1". The two external movement sensors 15" later transmit the detection information to the central control unit 50".

Any unauthorized attempt to lift or move the UAV protection storage device 1" would trigger the vibration sensor and mercury switch assembly 40", which sends an alert data to the central control unit 50". Any mission critical information that is stored is then immediately and securely erased.

The vibration sensor and mercury switch assembly 40" provides a means for detecting tampering of the UAV protection storage device 1". An unauthorized person, forcing the sliding covers 11" and 12" to open, often also causes the sliding covers 11" and 12" to vibrate. This vibration can then serve as an indication of tampering. The vibration sensor and mercury switch assembly 40" afterward sends the vibration information to the central control unit 50".

The GPS tracker unit 71" provides location information of the UAV protection storage device 1". The GPS tracker unit 71' transmits the location information to the central control unit 50".

The communication unit 70" serves as a transmitter and a receiver of data between the central control unit 50" and an external device, such as the UAV 2", a remote UAV management module, a remote UAV pilot, or another UAV protection storage device.

In detail, the communication unit 70" receives sensor measurement data, such aerial pictures data, from the UAV sensors of the UAV 2". The communication unit 70" then sends the received sensor measurement data or instructions to the central control unit 50".

The communication unit 70" sends instructions, which includes flight data, to the UAV 2" for the UAV 2" to perform.

The central control unit 50" is equipped a software program for processing or treating information, namely weather sensor measurement information, external movement sensor detection information, sensor vibration information, and the tracker unit location information. The central control unit 50" can also treat information from the UAV 2".

The central control unit 50" later generates instructions for the protection storage device 1" according to the received information. The central control unit 50" also generates instructions, such as flight commands, according to the received information and sends the generated instructions to the UAV 2".

As an example, the central control unit 50" can activate the electric cover drive unit to move the sliding covers 11" and 12" of the protection storage device 1" to the closed position, when information from the weather sensor 14" indicates the absence of snow, rain, frost, sand, or other harmful particles in the vicinity of the UAV protection storage device 1".

The central control unit 50" later provides instructions for elevating the platform 30" to allow the UAV 2" to leave the UAV protection storage device 1".

The central control unit 50" also generates instructions for alerting a user, when information from the external movement sensors 15" indicates the presence of people or animal in the vicinity of the UAV protection storage device 1".

The central control unit 50" also generates instructions for alerting security when information from the vibration sensor and mercury switch assembly 40" and/or the GPS tracker unit 71" indicates theft or unauthorized movement of the UAV protection storage device 1".

Referring to the power module, the fuel cell 6" converts the chemical energy from a fuel into electricity, which is later transmitted to the electrical energy storage 60" for storing.

The solar cell units 16" and 17" receive sunlight, wherein the solar cell units 16" and 17" convert energy from the received sunlight into electrical energy, which is then sent to the electrical energy storage 60" for storing.

The electrical energy storage 60" provides energy to electrical parts of the UAV protection storage device 1", especially to the wireless power charging transmitter for charging the battery 4" of the UAV 2".

The power module has an advantage of receiving from dual sources. Moreover, the solar cell units 16" and 17" allow the UAV protection storage device 1" to receive energy from a naturally sustainable resource, the sun. On the hand, the fuel cell 6" provides a different means for supplying energy that is not dependent on the sun. This is especially important when the UAV protection storage device 1" is operating in remote geographical regions where logistical support for providing electrical power supply is restricted.

Referring to the electrical cable assembly, the cable spool 80" is used for winding and unwinding the shielded electrical supply line 81". In other words, one part of the shielded electrical supply line 81" can be wounded or wrapped around the cable spool 80" while another part of the shielded electrical supply line 81" can be unwounded or be released from the cable spool 80".

The central control unit 50" actuates or rotates the cable spool 80" for adjusting the released length of the shielded electrical supply line 81". The central control unit 50" often adjusts the released length in order to allow the operating UAV 2" to reach a predetermined flight altitude.

In a special embodiment, the electrical supply line 81" is enclosed in an armored cable. The armored cable has an outer layer of metal. The metal can include steel or aluminum material. The metal layer can be provided in the form of strands.

The metal layer mechanically protects the electrical supply line 81" from being easily cut and from rainwater. The steel layer can also act be connected to electrical earth point for electrically shielding the electrical supply line 81".

The UAV protection storage device 1" receives telemetry or sensor data from the UAV 2", and adjusts the released length of the shielded electrical supply line 81" accordingly to ensure that the supply line 81" is always kept substantially taut, without being tight. The UAV protection storage device 1" also uses information from force sensors as explained below.

A further feature of the central control unit 50" is that it makes use of the amount of supply line 81", which has been laid out or released to help maintain checkpoints of commands given to the UAV 2".

As an example, the UAV 2" is commanded to turn left when 20 meters of the supply line 81" has been laid out, and then again commanded to turn right when 25 meters of the supply line 81" is laid out.

Such information can also aid to calculate the position of the UAV 2" in the event of no or poor GPS reception.

Alternatively, a mechanical spring or an internal cable length control device can adjust the released length of the shielded electrical supply line 81".

The electrical supply line 81" allows electrical energy to be transferred from the electrical energy storage 60" to a power supply of the UAV 2".

This often provides a large electrical energy to propulsion units of the UAV 2", thereby allowing the UAV 2" to carry heavier objects. The large energy can also serve to lengthen the flight duration of the UAV 2'.

In summary, this embodiment provides a UAV module with a UAV storage device and a UAV. The UAV has an unattended sensor, wherein the UAV can be operated without human intervention. In other words, the sensor can take measurement without being attended to. The UAV module does not require users to travel to the UAV module for operating it. The UAV module can operate automatically. The UAV can also be triggered by an event, by a schedule, or by demand. The UAV storage device can also be operate all the time, being powered primarily by the sun and secondarily by a fuel cell. The UAV module can also decide locally regarding the UAV flight safety. The battery of the UAV can be charged wirelessly while its sensor data can be transferred wirelessly. The UAV module can be networked with other UAV module to serve as the Internet of Things.

Figure 9:
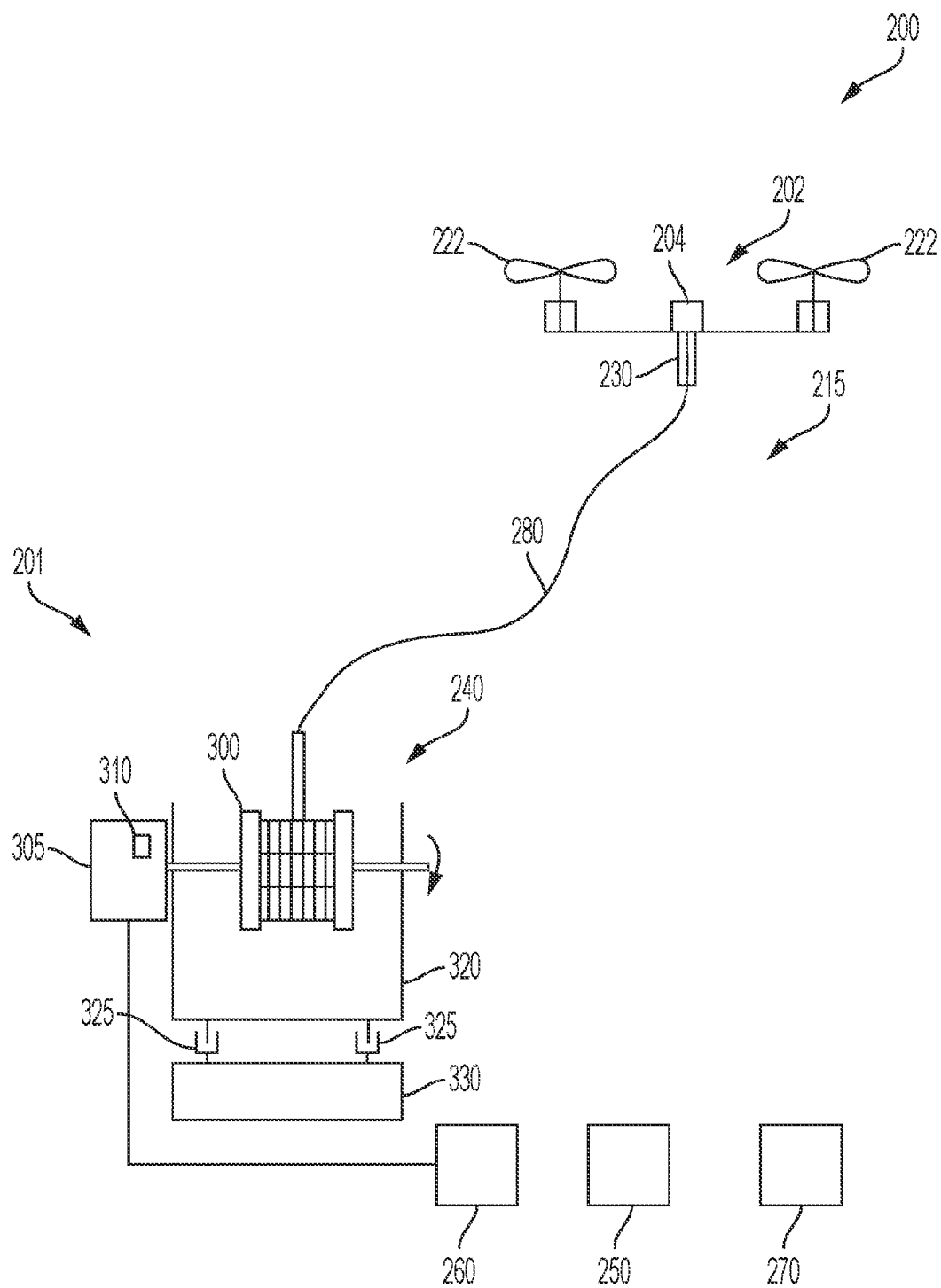
FIG. 9 illustrates an improved tethering assembly for the UAV assembly of FIGS. 1 to 8.

FIG. 9 depicts an improved UAV assembly with a tethering assembly.

FIG. 9 shows a tethering assembly 215 for the UAV assembly of FIGS. 1 to 8.

The UAV assembly 200 includes a UAV 202 and a UAV protection storage device 201.

In particular, the UAV 202 comprises a plurality of rotor motors 222 and a battery 204 for selectively energizing the rotor motors 222.

The UAV protection storage device 201 includes an electrical energy storage 260, a central control unit 250, and a wind sensor 270. The electrical energy storage 260 and the wind sensor 270 are electrically connected to the central control unit 250.

In a general sense, an environmental sensor can replace the wind sensor 270.

In detail, the tethering assembly 215 includes a UAV force sensor 230, a storage device cable spool assembly 240, and a cable 280. The cable 280 extends from the UAV force sensor 230 to the storage device cable spool assembly 240.

The UAV force sensor 230 is attached to the UAV 202 and to the cable 280.

Referring to the cable spool assembly 240, it is placed inside the UAV protection storage device 201. The cable spool assembly 240 includes a cable spool 300, a spool motor 305 with a spool rotational sensor 310, a spool bracket 320 with a plurality of spool force sensors 325, and a mounting plate 330.

The cable spool 300 is adapted for winding and unwinding the cable 280.

The spool motor 305 is mechanically engaged with the cable spool 300 for rotating the cable spool 300. The spool motor 305 is electrically connected to the central control unit 250.

The spool rotational sensor 310 is adapted for measuring the number of rotations of the cable spool 300. The spool rotational sensor 310 is also electrically connected to the central control unit 250.

The spool bracket 320 is configured for holding and supporting the cable spool 300 together with the spool motor 305 and the spool rotational sensor 310.

The force sensors 325 are connected to the spool bracket 320 and to the mounting bracket 330, which is attached to a part of the storage device 201. The force sensors 325 are electrically connected to the central control unit 250.

Referring to the cable 280, a part of the cable 280 is wrapped around the cable spool. The cable 280 includes a power supply electrical wire, a sensor signal wire, and a shielding tube. The shielding tube encloses the power supply electrical wire and the sensor signal wire.

One end of the power supply electrical wire is electrically connected to the electrical energy storage 260 of the UAV protection storage device 201 while another end of the power supply electrical wire is electrically connected to the battery 204 of the UAV 202. One end of the sensor signal wire is electrically connected to the central control unit 250 of the UAV protection storage device 201 while another end of the sensor signal wire is electrically connected to the UAV force sensor 230 of the UAV 202.

In use, the power supply electrical wire transfers electrical energy from the electrical energy storage 260 of the UAV protection storage device 201 to the battery 204 of the UAV 202, wherein the battery 204 stores this energy.

The battery 204 provides electrical energy to the rotor motors 222 and to the UAV force sensor 230.

The energized rotor motor 222 exerts a thrust or force for lifting the UAV 202 together with any load or measurement sensors upward and forward, in order for the UAV 202 to fly along a desired flight route.

The spool bracket 320 holds and supports the weight of the cable spool 300 and any cable 280 that is wound around the cable spool 300, the weight of the spool motor 305, and the weight of the spool rotational sensor 310.

The spool motor 305 rotates or turns the cable spool 300 according to an activation signal from the central control unit 250. In other words, the central control unit 250 activates or energies the spool motor 305 in order for rotating the cable spool 300. The activation can be done according to telemetry or sensor information collected by the UAV 202 and to information from the force sensors 325, as indicated below.

The rotation of the cable spool 300 acts to wind or unwind the cable 280. Put differently, the rotation of the cable spool 300, in one specific direction, serves to release a specific length of the cable 280, thereby lengthening the released cable 280 for allowing the UAV 202 to be separated further from the UAV protection storage device 201. Similarly, the rotation of the cable spool 300, in the reverse direction, serves to shorten the length of the released cable 280.

The spool rotational sensor 310 measures the number of rotation of the cable spool 300 and sends the spool rotational information to the central control unit 250. The central control unit 250 can then use the spool rotational information to determine the length as well as weight of the released cable 280.

The wind sensor 270 measures the speed of wind that is in the vicinity of the cable 280 and sends the wind speed measurement to the central control unit 250.

The force sensors 325 of the cable spool assembly 240 measure a strain or force that is exerted by the spool bracket 320 onto the mounting bracket 330. This force includes the weight of the spool bracket 320, the cable spool 300 together with any cable 280 that is wound around the cable spool 300, the spool motor 305, and the spool rotational sensor 310. This force also includes any force that a wind exerts on the released cable 280. The force sensor 325 then transmits this force measurement to the central control unit 250.

The force sensor 230 of the UAV 202 measures a strain or a force that is exerted by the cable 280 onto the UAV 202. This force includes the weight of the released cable 280, which is not wound around the spool 300. This force also includes any force that a wind exerts on the released cable 280. The force sensor 230 then transmits the force measurement to the central control unit 250 via the sensor signal wire.

In another implementation, the spool rotational sensor 310 is replaced by a distance measurement device that includes a transmitter for sending a signal to the UAV 202 and a receiver for receiving a reflection of the signal from the UAV 202 in order to determine the distance of the UVA 202 from the measuring device.

One method of operating the UAV assembly 200 is provided below. The method allows the UAV 202 to be tethered to the UAV protection storage device 201, wherein the released cable between the UAV 202 is only a bit loose.

The method includes a step of the cable 280 being fully wrapped around the cable spool 300.

The central control unit 250 then activates the spool motor 305 to rotate the cable spool 300 for a predetermined period in order to release the cable 280.

The central control unit 250 then checks to verify that the UAV 202 has flown further and that the UAV 202 has taken up the weight of the released cable 280.

This check is performed by the central control unit 250, which receives the spool rotational information from the spool rotational sensor 310.

The central control unit 250 later computes the weight of the released cable 280 according to the received spool rotational information.

The central control unit 250 also receives the force measurement from the force sensor 230 of the UAV 202. The force measurement provides an indication of the weight of the released cable 280 being carried by the UAV 202.

Following this, the central control unit 250 compares the computed weight of the released cable 280 with the measurement from the UAV force sensor 230.

The UAV force sensor measurement does not differ from the computed weight by a pre-determined amount, the central control unit 250 considers that the UAV 202 has flown further and has taken up fully the weight of the released cable 280.

If the UAV force sensor measurement is less than the computed weight, the central control unit 250 considers that the UAV 202 has not taken up fully the weight of the released cable 280. In order words, the released cable is too loose. The central control unit 250 then activates the spool motor 305 to rotate the cable spool 300 in order to wrap or wind the cable 280 around the cable spool 300.

After this, the central control unit 250 checks whether more cable should be released.

The central control unit 250 receives a force measurement from the force sensor 325 of the cable spool assembly 240.

The central control unit 250 then compares the force measurement with a predetermined limit, which includes or account for the weight of the released cable 280.

If the force measurement exceeds the predetermined limit, the central control unit 250 considers that the released cable length is too short and that the UAV 202 is pulling or stretching the cable 280. The central control unit 250 then activates the spool motor 305 to rotate the cable spool 300 in order to release the cable 280.

The desired final released cable length is determined according to a mission requirement of the UAV 202.

This method aims to allow the released cable length for tethering of the UAV 202 to be just a bit loose. In other words, the released cable length is slightly more than a separation distance between the UAV 202 and the cable spool 300. This then allows the UAV 202 to operate properly without any hindrance by the cable 280. The UAV 202 can have a stable landing on a landing platform of the UAV protection storage device 201 and can have a stable take-off from the UAV protection storage device 201. Furthermore, the released cable is not so loose such that its weight is too heavy, thereby exerting an unnecessary burden on the rotor motors 222 of the UAV 202.

In short, the tethering of the UAV 202 extends flying duration of the UAV 202. The tethering provides a safety flying limit for the UAV 202.

In another embodiment, the method includes a step of obtaining wind speed from the wind sensor 270.

The central control unit 250 then takes into account the effect of the wind speed for the above-mentioned steps.

Figure 10:
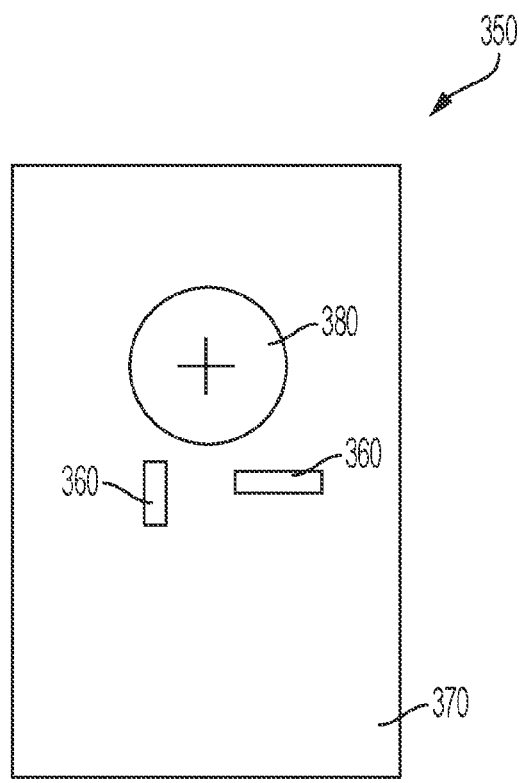
FIG. 10 illustrates a force sensor of the tethering assembly of FIG. 9.

FIG. 10 shows a force sensor 350 for the tethering assembly of FIG. 9.

The force sensor 350 includes a plurality of strain gauges 360 and a metal plate 370, which includes an external force reception area 380.

The force reception area 380 is used for received an external force, which acts to deform the metal plate 370 elastically by a small amount such that the deformed metal returns to its original shape when the external force is removed.

The strain gauges 360 are attached to metal plate 370 for measuring this deformation that is used to determine the strain exerted by the external force on the metal plate 370.

In another embodiment, this deformation or strain is measured by measuring a change of an electrical resistance of the deformed area.

Figure 11:
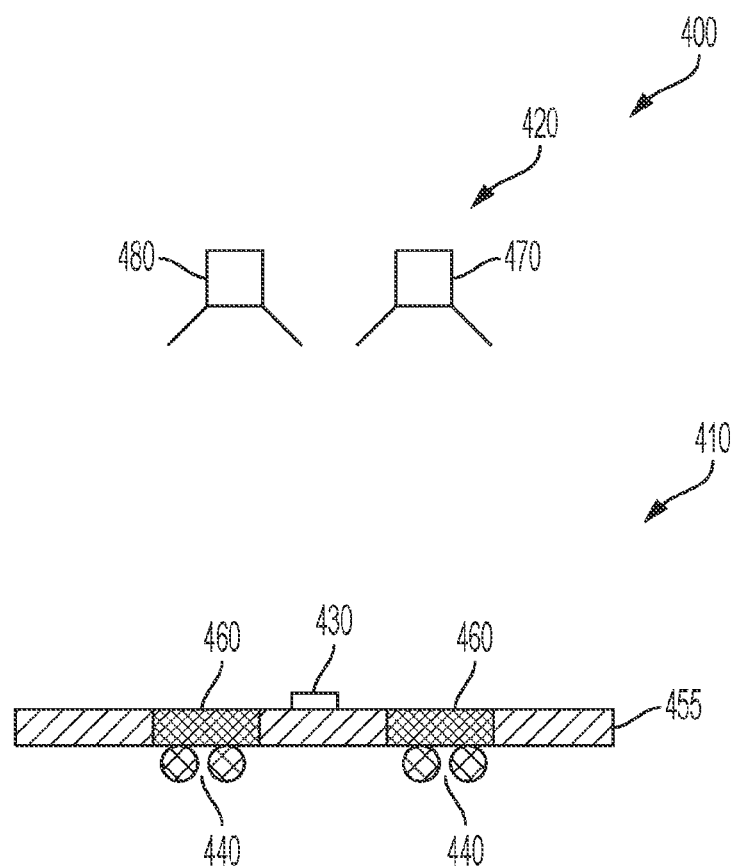
FIG. 11 illustrates an improved beacon unit for the UAV assembly of FIGS. 1 to 8.

FIG. 11 depicts an improved UAV assembly with an improved beacon unit.

FIG. 11 shows an improved beacon unit 400 for the UAV assembly of FIGS. 1 to 8.

The beacon unit 400 includes a light module 410 with a camera module 420 for guiding a UAV to a platform of a UAV protection storage device.

The light module 410 includes an infrared (IR) light source 430 with visible light sources 440 and a cover plate 455. The infrared light source 430, the visible light sources 440, and the cover plate 455 are mounted on a top surface of the platform. The cover plate 455 includes a plurality of openings 460 and it is placed above the infrared light source 430 and the visible light sources 440.

The camera module 420 includes an infrared camera 470 and a visible light camera 480. The infrared camera 470 and the visible light camera 480 are attached to the UAV.

In a general sense, the infrared camera 470 and the visible light camera 480 can be provided in the form of a single integrated camera.

Figure 13:
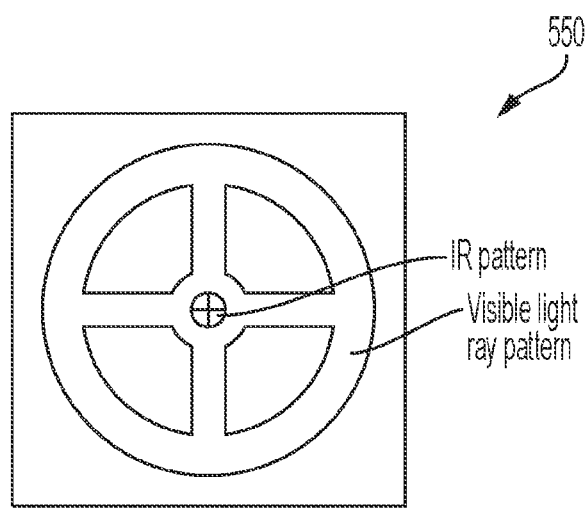
FIG. 13 illustrates a light pattern of the beacon unit of FIG. 11.

FIG. 13 shows a light pattern 550 of the beacon unit 400. The light pattern 550 includes an infrared pattern and a visible light ray pattern.

In use, the infrared light source 430 emits infrared light rays, which pass through the openings 460 of the cover plate 455 to form the infrared pattern, which is depicted in FIG. 13.

The infrared camera 470 senses the infrared pattern for guiding the UAV towards the landing platform.

Similarly, the visible light sources 440 emit visible light rays, which pass through the openings 460 of the cover plate 455 to form the visible light ray pattern, which is depicted in FIG. 13.

The visible light camera 480 senses the visible light pattern for guiding the UAV towards the landing platform.

Figure 12:
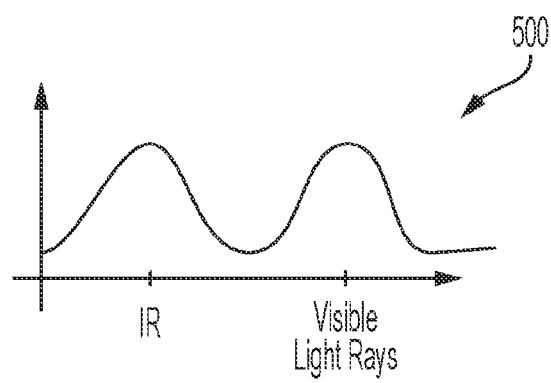
FIG. 12 illustrates a graph of light intensity and wavelength of light rays of the beacon unit of FIG. 11.

The visible light rays and the infrared light rays have different wavelengths, by way of an example of a graph 500 of FIG. 12. The graph 500 shows a relationship of light intensity and wavelength of light rays of the beacon unit of FIG. 11.

The different types of light rays are used in different situations.

In the event of rain, which can block the infrared light rays and cause difficulty in detecting the infrared light rays, the visible light rays are used for guiding the UAV.

In the event of strong sunshine, which causes difficulty in detection of the visible lights, the infrared light rays are used for guiding the UAV.

In a further embodiment, the visible light rays are replaced by laser light rays. The laser light rays are emitted coherently, thereby allowing them to be easily focused. The wavelength of the laser light rays can be adapted or selected such the laser light rays can penetrate certain objects, such as haze or rain.

Figure 14:
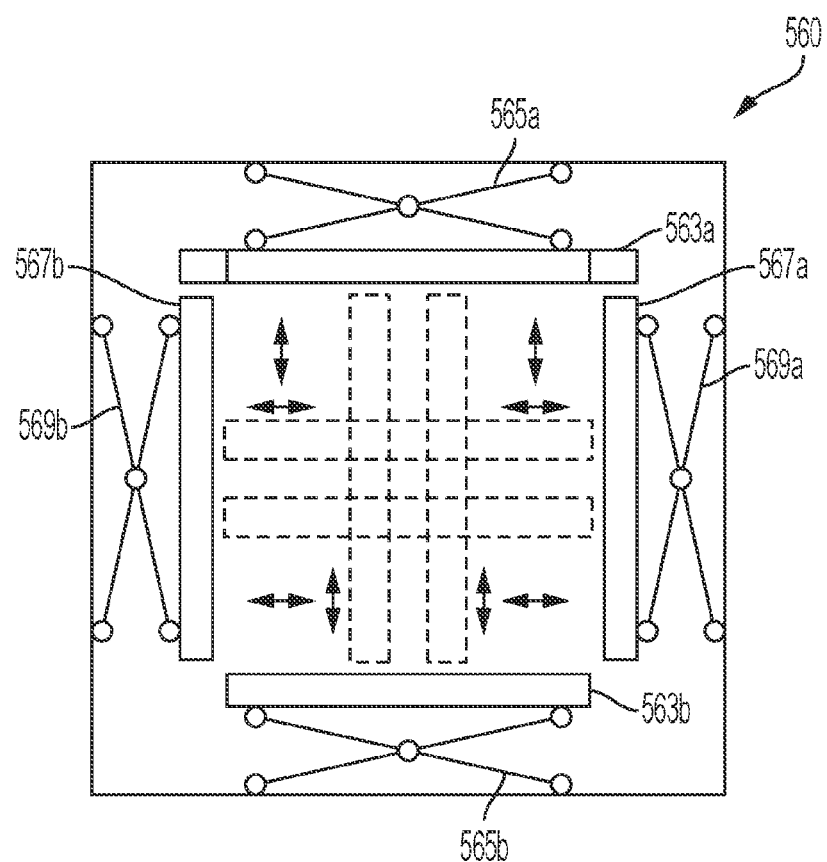
FIG. 14 illustrates a UAV alignment unit for a UAV landing platform of a UAV protection storage device of the UAV assembly of FIGS. 1 to 8.

FIG. 14 depicts an improved UAV assembly with a UAV alignment unit.

FIG. 14 shows a UAV alignment unit 560 for a UAV landing platform of a UAV protection storage device of the UAV assembly of FIGS. 1 to 8.

The alignment unit 560 includes a first set of alignment plates 563a and 563b with corresponding sliding mechanisms 565a and 565b and a second set of alignment plates 567a and 567b with corresponding sliding mechanisms 569a and 569b. The first set is placed essentially at a right angle to the second set.

Referring to the first set, one side of each sliding mechanism 565a and 565b is attached to an outer part of the UAV landing platform. The placement is done such that the sliding mechanisms 565a and 565b are facing each other and are placed away from each other. Another side of the sliding mechanism 565a and 565b is mechanically connected to the corresponding alignment plates 563a and 563b. The two alignment plates 563a and 563b are placed essentially parallel to each other and they are also placed above the UAV landing platform.

Similarly, referring to the second set, one side of each sliding mechanism 569a and 569b is attached to an outer part of the UAV landing platform. The placement is done such that the sliding mechanisms 569a and 569b are facing each other and are placed away from each other. Another side of the sliding mechanism 569a and 569b is mechanically connected to the corresponding alignment plates 567a and 567b. The two alignment plates 567a and 567b are placed essentially parallel to each other and they are also placed above the UAV landing platform.

In use, the alignment unit 560 provides a resting position and an alignment position.

In the resting position, the sliding mechanisms 565a, 565b, 569a, and 569b move the associated alignment plates 563a, 563b, 567a, and 567b towards outer parts of the UAV landing platform and away from an inner area of the UAV landing platform.

The inner area of the UAV landing platform serves a landing pad for the UAV. The landing pad is intended for support the weight of the UAV.

If the UAV is not placed on the landing pad, covers of the UAV protection storage device may not close properly in that parts of the UAV can block the closing of the covers. In practice, the UAV may land slightly away from the landing pad due to wind or other factors. The alignment unit 560 advantageously acts to correct the position of the UAV.

In the alignment position, the sliding mechanisms 565a, 565b, 569a, and 569b move the associated alignment plates 563a, 563b, 567a, and 567b towards the inner area of the UAV landing platform. This allows the alignment plates 563a, 563b, 567a, and 567b to push a UAV, which has landed on the UAV landing platform, towards the landing pad. The UAV may not be placed precisely on the landing pad. The alignment plates 563a, 563b, 567a, and 567b then act to push the UAV to the landing pad.

Figure 15:
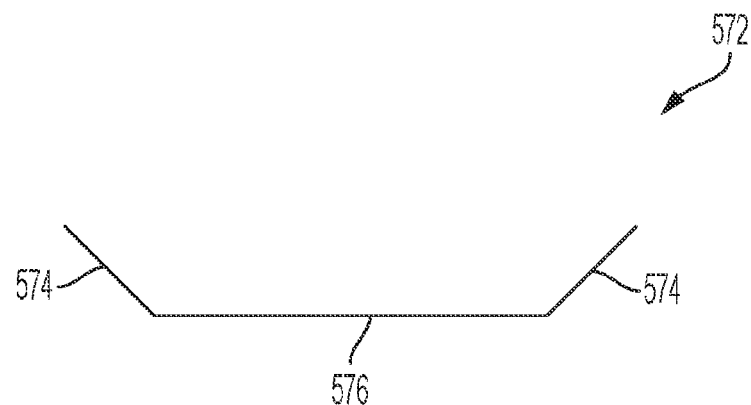
FIG. 15 illustrates another UAV alignment unit for a UAV landing platform of a UAV protection storage device of the UAV assembly of FIGS. 1 to 8.

FIG. 15 depicts another improved UAV assembly with a further UAV alignment unit.

FIG. 15 shows another UAV alignment unit 572 for a UAV landing platform of a UAV protection storage device of the UAV assembly of FIGS. 1 to 8. The UAV alignment unit 572 provides a means of guiding the UAV towards a UAV landing pad.

The UAV alignment unit 572 is placed above the UAV landing platform. The UAV alignment unit 572 includes a set of inclined outer walls 574, which surrounds a landing pad 576.

Lower parts of the inclined outer walls 574 are attached to the landing pad 576. The landing pad 576 can be provided as a part of the UAV landing platform.

In use, the land pad 576 serves as a receiving area for a UAV.

The inclined outer walls 574 act to push and guide the UAV toward the land pad 576. During landing, the UAV moves downward toward the land pad 576. If the UAV is not positioned directly above the land pad 576, parts of the UAV can touch the inclined outer walls 574, wherein the inclined outer walls 574 then guide the UAV toward the land pad 576.

Figure 16:
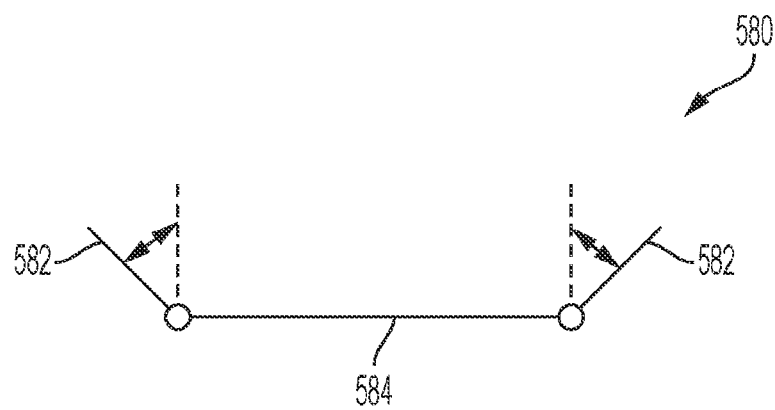
FIG. 16 illustrates a further UAV alignment unit for a UAV landing platform of a UAV protection storage device of the UAV assembly of FIGS. 1 to 8.

FIG. 16 depicts a further improved UAV assembly with a further UAV alignment unit.

FIG. 16 shows a further UAV alignment unit 580 for a UAV platform of a UAV protection storage device of the UAV assembly of FIGS. 1 to 8. The UAV alignment unit 580 provides another means of guiding the UAV towards a UAV landing pad.

The UAV alignment unit 580 is placed above the UAV landing platform. The UAV alignment unit 580 includes a set of moveable outer walls 582, which surrounds a landing pad 584. Lower parts of the outer walls 582 are attached to the landing pad 584. Each outer wall 582 can pivot or rotate about an area, which is placed essentially on the landing pad 584.

The landing pad 584 can be provided as a part of the UAV landing platform.

In use, landing pad 584 serves as a receiving area for a UAV.

The outer walls 582 pivot outwards for receiving the UAV. The outer walls 582 can also pivot inwards for pushing the received UAV toward the landing pad 584.

Figure 17:
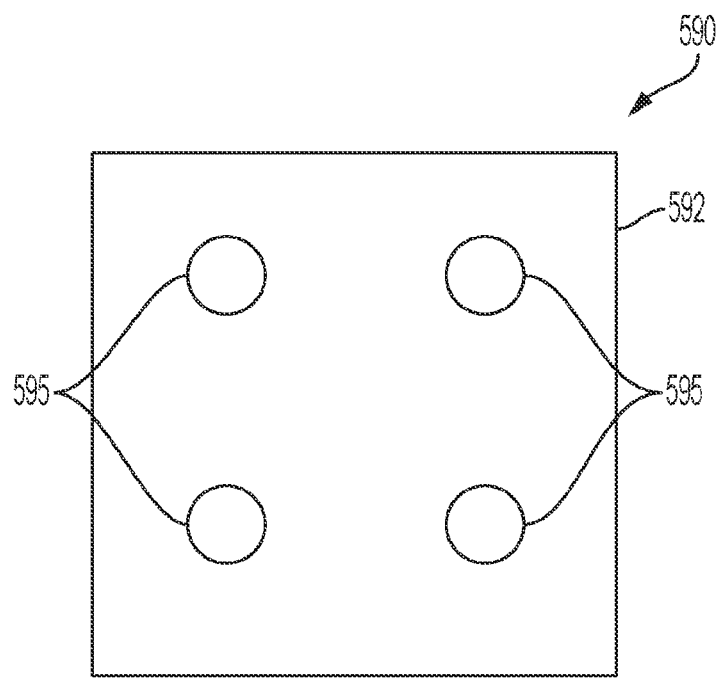
FIG. 17 illustrates a UAV position detector unit for a UAV landing platform of a UAV protection storage device of the UAV assembly of FIGS. 1 to 8.

FIG. 17 depicts an improved UAV assembly with a UAV position detector unit.

FIG. 17 shows a UAV position detector unit 590 for a UAV landing platform 592 of a UAV protection storage device of the UAV assembly of FIGS. 1 to 8.

The UAV position detector unit 590 includes a set of weight sensors 595, which are placed below different outer parts of the UAV landing platform 592.

In use, the UAV landing platform 592 acts to receive a UAV, wherein the UAV exerts its weight on parts of the landing platform 592.

The weight sensors 595 act to measure the weight being exerted on the different corresponding outer parts of the landing platform 592.

The different readings of the weight sensors 595 act to determine the position of the UAV, especially when the UAV is not positioned at its desired area. If the UAV position is at the desired position, it can block the closing of covers of the UAV protection storage device.

Figure 18:
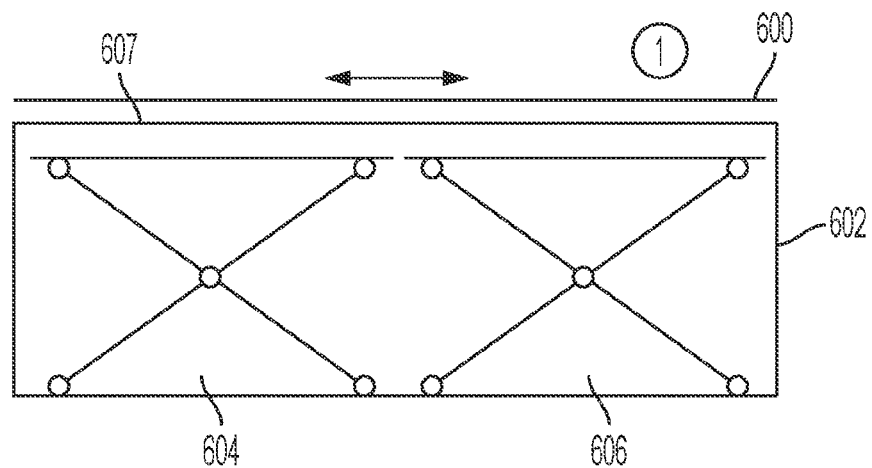
FIG. 18 illustrates a cover for a UAV protection storage device of the UAV assembly of FIGS. 1 to 8, the cover is placed in a closed position.

FIGS. 17 and 18 depict an improved UAV assembly with a first UAV storage box cover.

Figure 19:
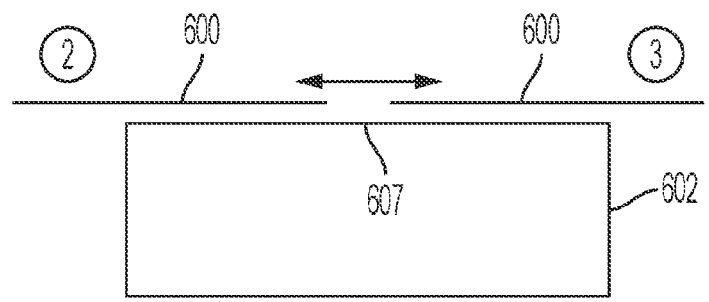
FIG. 19 illustrates the cover of FIG. 18 being placed in different open positions.

FIGS. 18 and 19 show a horizontally moveable cover 600 for an enclosure box 602 of a UAV protection storage device of the UAV assembly of FIGS. 1 to 8. The moving cover 600 is placed above the enclosure box 602.

The enclosure box 602 is adapted for housing a first UAV 604 and a second UAV 606. The first UAV 604 the second UAV 606 are placed horizontally and are placed next to each other. The enclosure box 602 has an opening 607, which is placed at a top part of the enclosure box 602. The opening 607 is configured for allowing the first UAV 604 and the second UAV 606 to enter and to leave the enclosure box 602.

In a closed position, which is shown in FIG. 18, the moving cover 600 is moved horizontally, such that it covers and encloses the opening 607. The moving cover 600, in this position, protects the first UAV 604 and the second UAV 606 from the environment, such as dust, sand, rain, and snow.

In a first open position, which is shown in FIG. 19, the moving cover 600 is moved horizontally in one direction, such that it covers the first UAV 604, while allowing the second UAV 606 to leave the enclosure box 602.

In a second open position, which is shown in FIG. 19, the moving cover 600 is moved horizontally in the other direction, such that it covers the second UAV 606, while allowing the first UAV 604 to leave the enclosure box 602.

Figure 20:
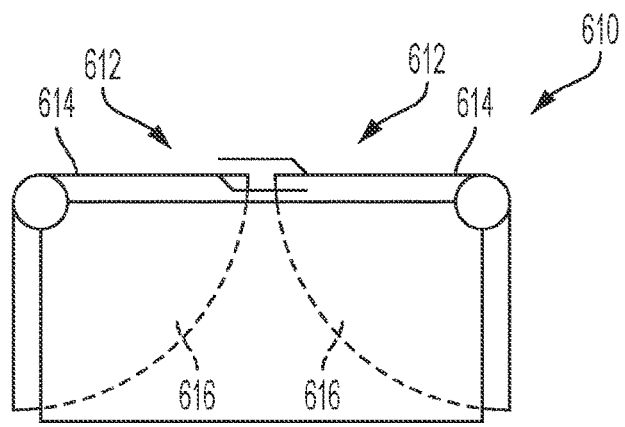
FIG. 20 illustrates another cover for a UAV protection storage device of the UAV assembly of FIGS. 1 to 8, the cover is placed in a closed position.
Figure 21:
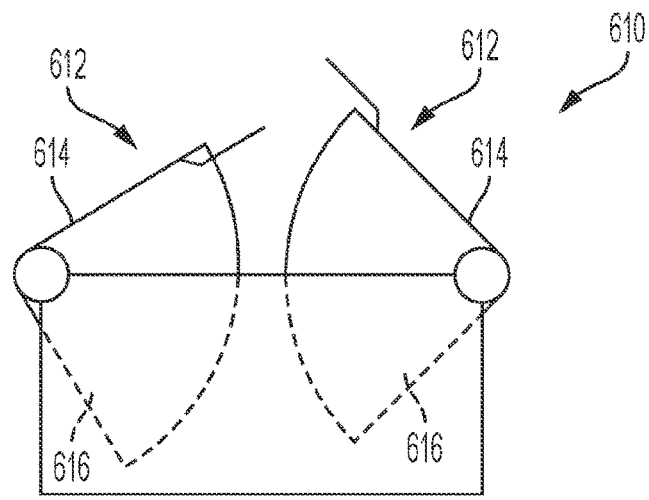
FIG. 21 illustrates the cover of FIG. 20 being rotated to a partial open position.
Figure 22:
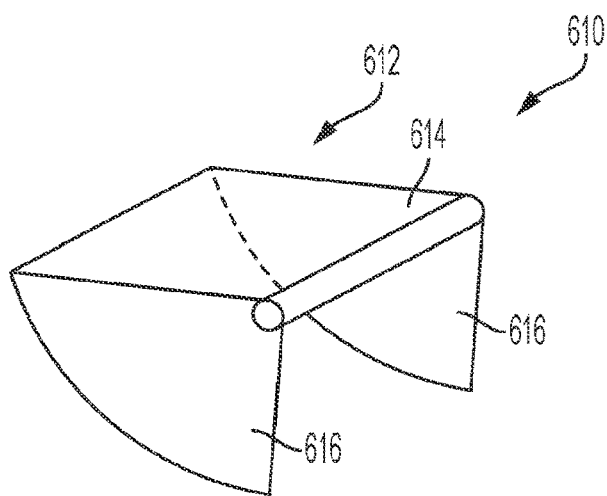
FIG. 22 illustrates a perspective view of the cover of FIG. 20.

FIGS. 20, 21, and 22 depict another improved UAV assembly with a second UAV storage box cover.

FIGS. 20, 21, and 22 show another cover 610 for a UAV protection storage device of the UAV assembly of FIGS. 1 to 8.

The UAV protection storage device includes an enclosure box with an opening, which is placed at a top part of the enclosure box. The opening is configured for allowing a UAV to enter and to leave the enclosure box.

The cover 610 includes two rotatable lids 612.

Each lid 612 has a covering part 614 and two side parts 616.

In detail, the side parts 616 are placed opposite to each other. Each side part 616 has a sector of a circle. The sector refers to an area of the circle that lies between two straight lines drawn from the center of the circle to the edge of the circle.

The covering part 614 has a shape of a rectangle with four sides. The covering part 614 has two parallel connection end parts and a rotating end part with an overlapping end part. The connection end parts, the rotating end part, and the overlapping end part are placed at outer portions of the covering part 614.

The rotating end part is placed opposite to the overlapping end part while both the rotating end part and the overlapping end part are placed at a right angle to the two connection end parts.

The parallel connection end parts of the covering part 614 are fixedly connected to the corresponding straight edges of the side parts 616 such the covering part 614 is placed at a right angle to the side parts 616. The covering part 614 and the side parts 616 form a "U" shape.

The rotating end part of the covering part 614 is rotatably connected to the opening of the enclosure box.

In use, the cover 610 provides a closed position and an open position.

In the closed position, the lids 612 are rotated such that their two covering parts 614 covers the opening of the enclosure box. The overlapping end parts of the two covering parts 614 are placed opposite to each other.

In this position, the side parts 616 and the two covering parts 614 act to block effectively any snow, rain, or dust from entering the enclosure box.

In the open position, the lids 612 are rotated such that any UAV can enter or leave the enclosure box.

Figure 23:
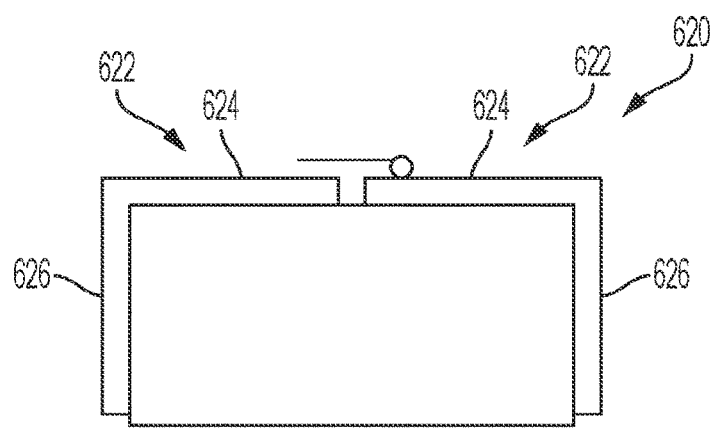
FIG. 23 illustrates a further cover for a UAV protection storage device of the UAV assembly of FIGS. 1 to 8, the cover is placed in a closed position.
Figure 24:
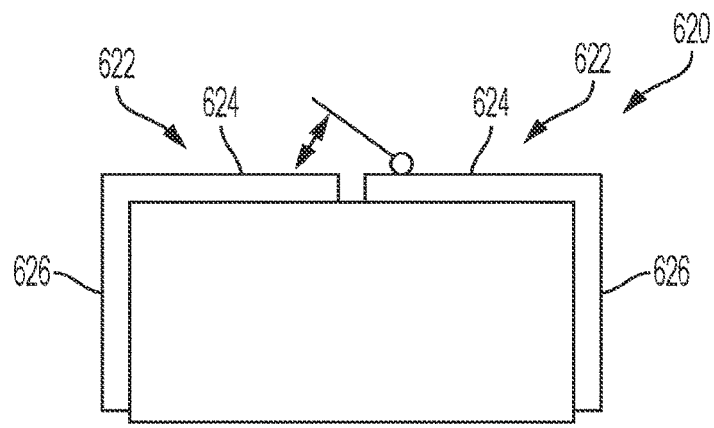
FIG. 24 illustrates the cover of FIG. 23 being placed in an initial open position.
Figure 25:
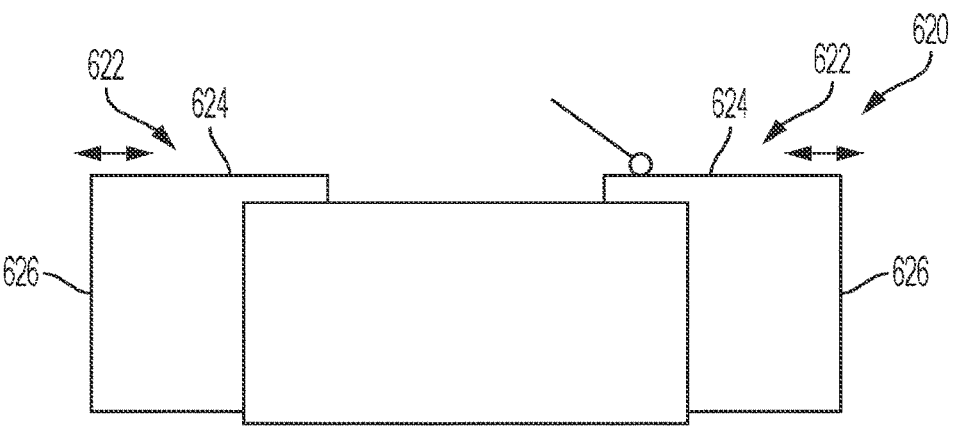
FIG. 25 illustrates the cover of FIG. 23 being placed in a final open position.

FIGS. 23, 24, and 25 depict a further improved UAV assembly with a third UAV storage box cover.

FIGS. 23, 24, and 25 shows a further cover 620 for a UAV protection storage device of the UAV assembly of FIGS. 1 to 8.

The cover 620 includes two horizontally movable lids 622.

Each lid 622 includes a horizontal part 624 and a vertical part 626, which is connected to the horizontal part 624 such the horizontal part 624 and the vertical part 626 form an "L" shape.

One lid 622 includes a rotatable end part 626, which is placed at an end part of the horizontal part 624 of the lid 622.

In the use, the cover 620 provides a closed position and an open position.

In the closed position, the lids 622 are moved horizontally such that their horizontal parts 624 cover a UAV opening of a UAV enclosure box of the UAV protection storage device.

Furthermore, the rotatable end part is rotated for covering any gap between the end parts of the horizontal parts 624.

In effect, this protects any UAV in the enclosure box from the environment, such as sand, dust, rain, or snow.

In the open position, the lids 622 are moved horizontally such that their horizontal parts 624 do not cover the UAV opening of a UAV enclosure box of the UAV protection storage device. In other words, this allows a UAV to enter or leave the enclosure box.

Figure 26:
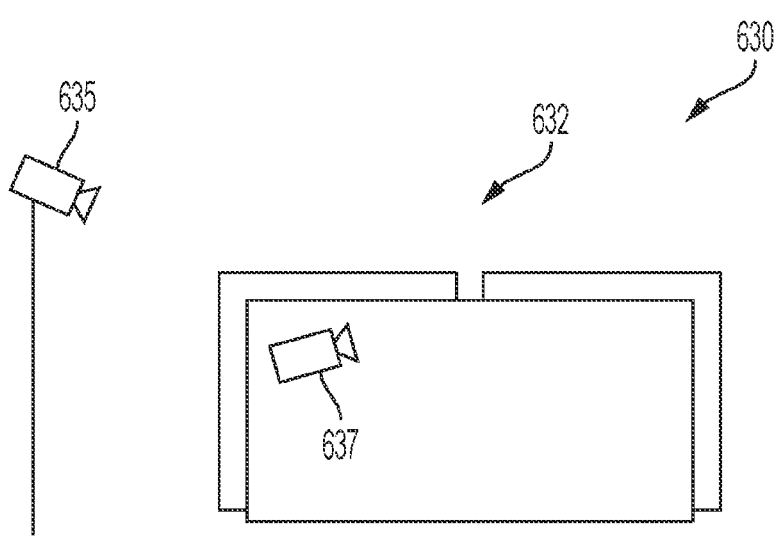
FIG. 26 illustrates a set of cameras for a UAV protection storage device of the UAV assembly of FIGS. 1 to 8.

FIG. 26 depicts an improved UAV assembly with surveillance cameras.

FIG. 26 shows a set of surveillance cameras 630 for a UAV protection storage device 632 of the UAV assembly of FIGS. 1 to 8. The UAV protection storage device 632 includes a UAV enclosure box.

The cameras 630 include an external camera 635 and an internal camera 637. The internal camera 637 is placed in the enclosure box and is directed at internal parts of the enclosure box. The external camera 635 is placed outside of the enclosure box and it is directed at the enclosure box.

In use, the enclosure box allows a UAV to enter the inside of the enclosure box and to leave the enclosure box.

The internal camera 637 is intended for observing the inside of the enclosure box, especially for any unwanted substance, such as dust, sand, rain, or snow, which has entered the box.

When UAV enter or leave the enclosure box, these unwanted substances may enter the enclosure box. An operator can observe images from the internal camera 637 and respond accordingly.

The external camera 635 is intended for observing the outside of the enclosure box. When the enclosure box is closed, some unwanted substance, such as dust, sand, rain, or snow, may collected on a top part of the enclosure box. As an example, a few inches of snow may be collected on the enclosure box. These unwanted substances can affect the operation of the enclosure box. Similarly, an operator can observe images from the external camera 635 and respond accordingly.

FIG. 26 depicts an improved UAV assembly with weed killer sprayers.

Figure 27:
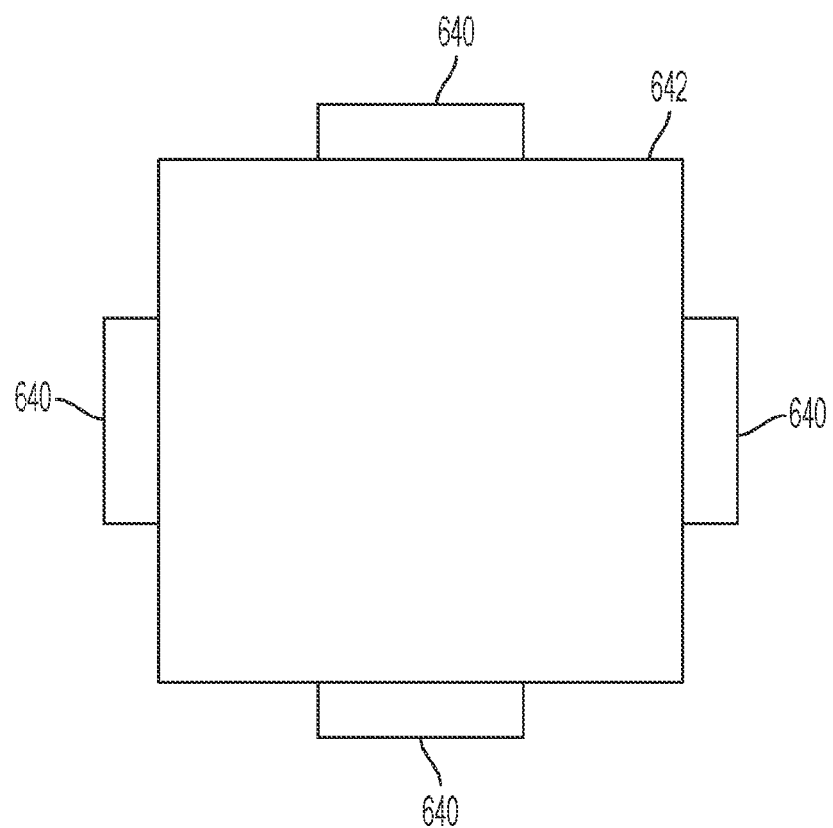
FIG. 27 illustrates a set of weed killer sprayer for a UAV protection storage device of the UAV assembly of FIGS. 1 to 8.

FIG. 27 shows a set of weed killer sprayers 640 for a UAV protection storage device 642 of the UAV assembly of FIGS. 1 to 8.

The weed killer sprayers 640 are areas surrounding the UAV protection storage device 642.

In use, the UAV protection storage device 642 allows for deploying of a UAV, especially in remote places without human intervention over a relatively long period.

In some remotes places, especially the topics, plants and bushes can grow around the UAV protection storage device 642 and even affect the operation of the UAV protection storage device 642.

The sprayers 640 are intended for preventing these plants and bushes from growing around the UAV protection storage device 642. The sprayers 640 are used for spraying weed killers or other suitable chemicals, in an automatic manner, for preventing this growth.

Figure 28:
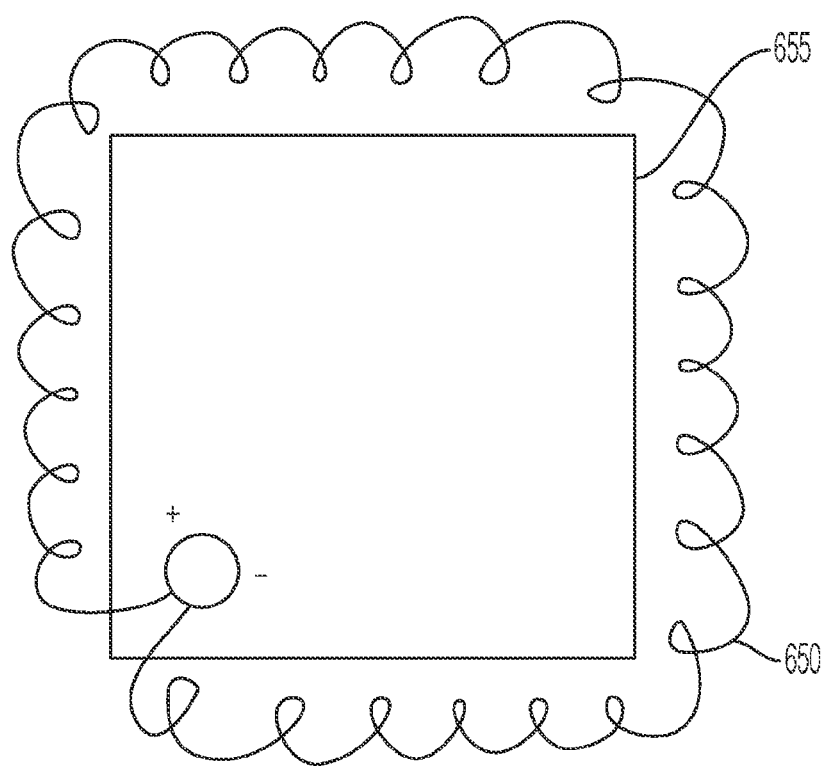
FIG. 28 illustrates an electric fence surrounding a UAV protection storage device of the UAV assembly of FIGS. 1 to 8.

FIG. 28 depicts an improved UAV assembly with an animal electric fence.

FIG. 28 shows an electric fence 650 surrounding a UAV protection storage device 655 of the UAV assembly of FIGS. 1 to 8.

The electric fence 650 provides electric shocks to deter animals or people from touching the UAV protection storage device 655.

This especially useful when deploying the UAV protection storage device 655 in places, where animals roam and are likely to come near the UAV protection storage device 655.

Figure 29:
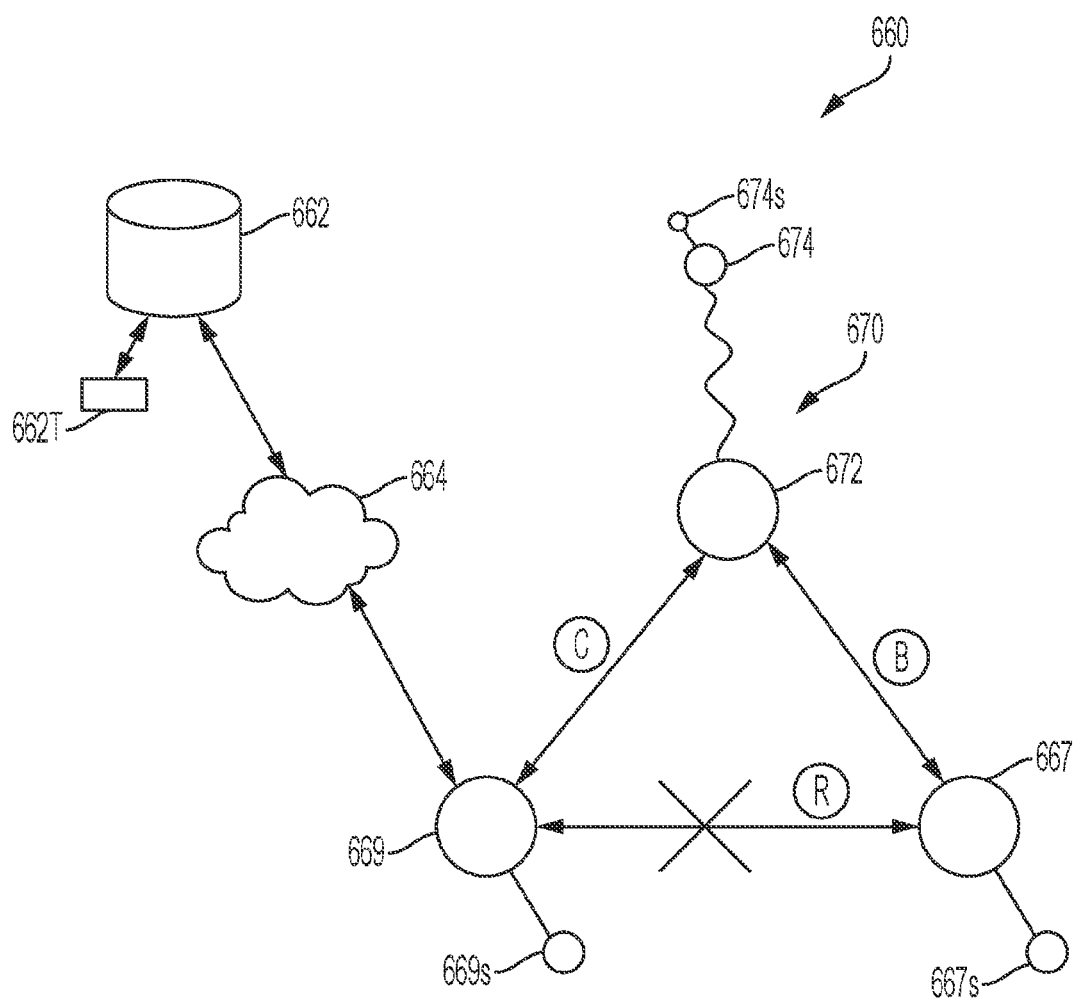
FIG. 29 illustrates a network of sensors, which includes a sensor of a UAV of the UAV assembly of FIGS. 1 to 8.

FIG. 29 depicts a network of sensors, which includes a UAV sensor of a UAV of the UAV assembly of FIGS. 1 to 8.

FIG. 29 shows a network 660 of sensors. The network 660 includes a plurality of sensors and a computer server 662 being communicatively connected with the sensors by a cloud connection 664.

The computer server 662 includes a display terminal 662T with a keyboard. The cloud connection 664 includes an Internet connection, which allows accessing data and software programs, which are stored at a remote location.

The multiple sensors include a sensor 667S of a wearable device 667, a sensor 669S of a fixed Internet device 669, and a UAV sensor 670S of a UAV of a UAV assembly 670.

The UAV sensor 670S is communicatively connected to the wearable device 667 and to the fixed Internet device 669. The fixed Internet device 669 is communicatively connected to the computer server 662.

The UAV assembly 670 includes a UAV protection storage device 672 being communicatively connected to a UAV 674, which includes the UAV sensor 670S.

In use, the wearable device 667, the fixed Internet device 669, and the UAV assembly 670 cooperate to send sensor data to the computer server 662.

This cooperation is adapted such that the network 660 allows data from the sensor 667S to be sent by different data routes to the computer server 662. This data can sent be from the sensor 667S, to the wearable device 667, to the UAV protection storage device 672, to the fixed Internet device 669, and to the computer server 662. Alternatively, the data can also be sent from the sensor 667S, to the wearable device 667, to the fixed Internet device 669, and to the computer server 662.

Similarly, data from the sensor 674S can be sent by different data routes to the computer server 662. The data can be sent from the sensor 674S, to the UAV 674, to the UAV protection storage device 672, to the fixed Internet device 669, and to the computer server 662. Alternatively, the sensor data can be sent from the sensor 674s, to the UAV 674, to the UAV protection storage device 672, to the wearable device 667, to the fixed Internet device 669, and to the computer server 662.

In effect, the different possible data routes allow the network 660 to be robust in that if one data route, such as route A, which is shown in FIG. 29, is broken, the data can still be transmitted by other routes, such route B or C, which is shown in FIG. 29.

The computer server 662 can also be configured to activate the UAV assembly 670 to launch the UAV 674 to collect additional data, when data from the wearable device 667 and/or the fixed Internet device 669 indicate the need for the additional data.

As an example, the computer server 662 detects a fire in a particular area, according to the data from the wearable device 667 and fixed Internet device 669. The computer server 662 can then activate the UAV assembly 670 to launch the UAV 674 to obtain surveillance images of this area to confirm the presence of fire and obtain additional information for responding appropriately and speedily to the fire.

Put differently, the UAV 674 is used to obtain UAV sensor data. The sensor data is then sent to the computer server 662, which acts a sensor data center, The UAV assembly 670 also serves a redundancy supporting real world data collection device for enhancing overall data collection.

The UAV 674 is used to increase redundancy of Internet connections for increased transmission capability should single data lines be unstable or lost.

Figure 30:
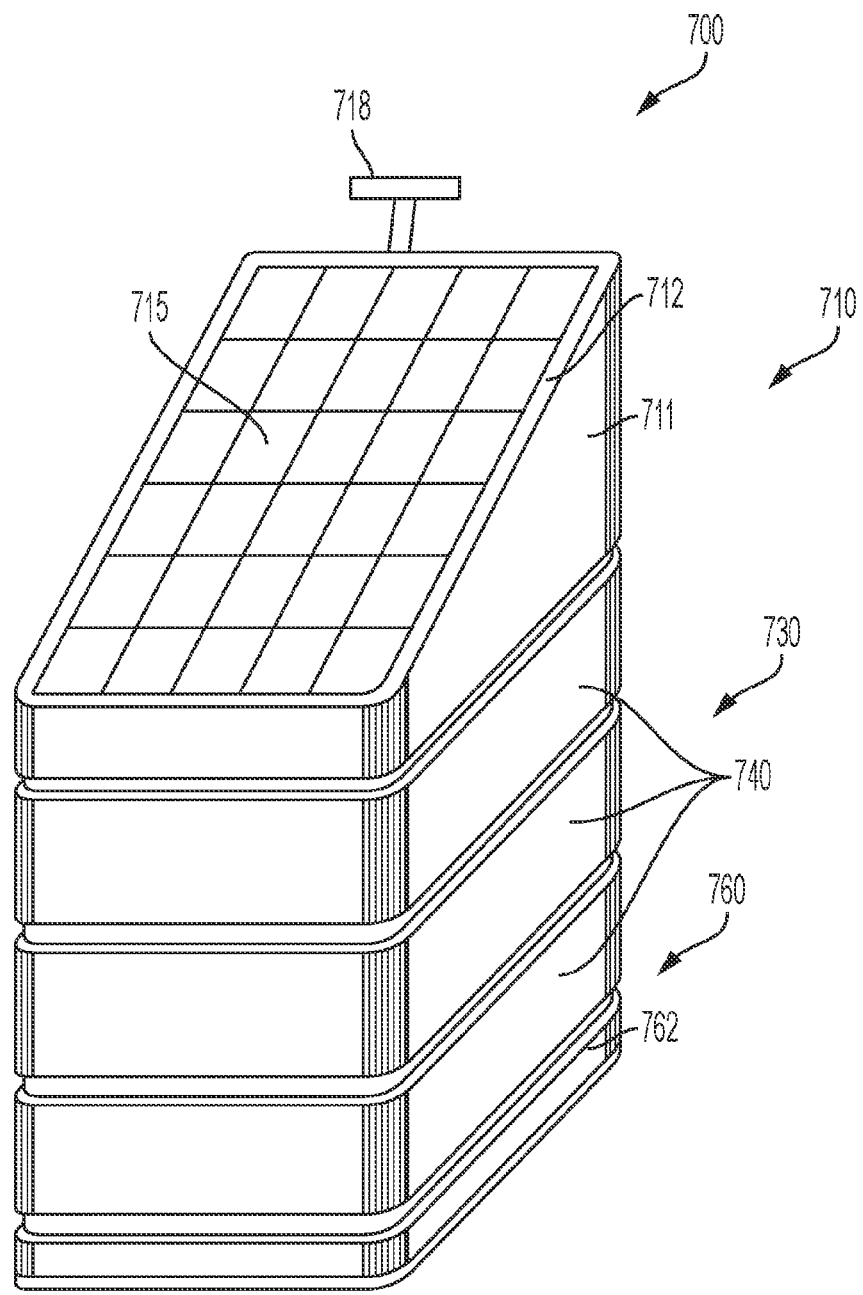
FIG. 30 illustrates a perspective view of a UAV storage box.

FIG. 30 shows an Unmanned Aerial Vehicles (UAV) storage box 700. The UAV storage box 700 includes a communication module 710, a plurality of UAV hangar modules 730, and a power storage module 760.

Figure 31:
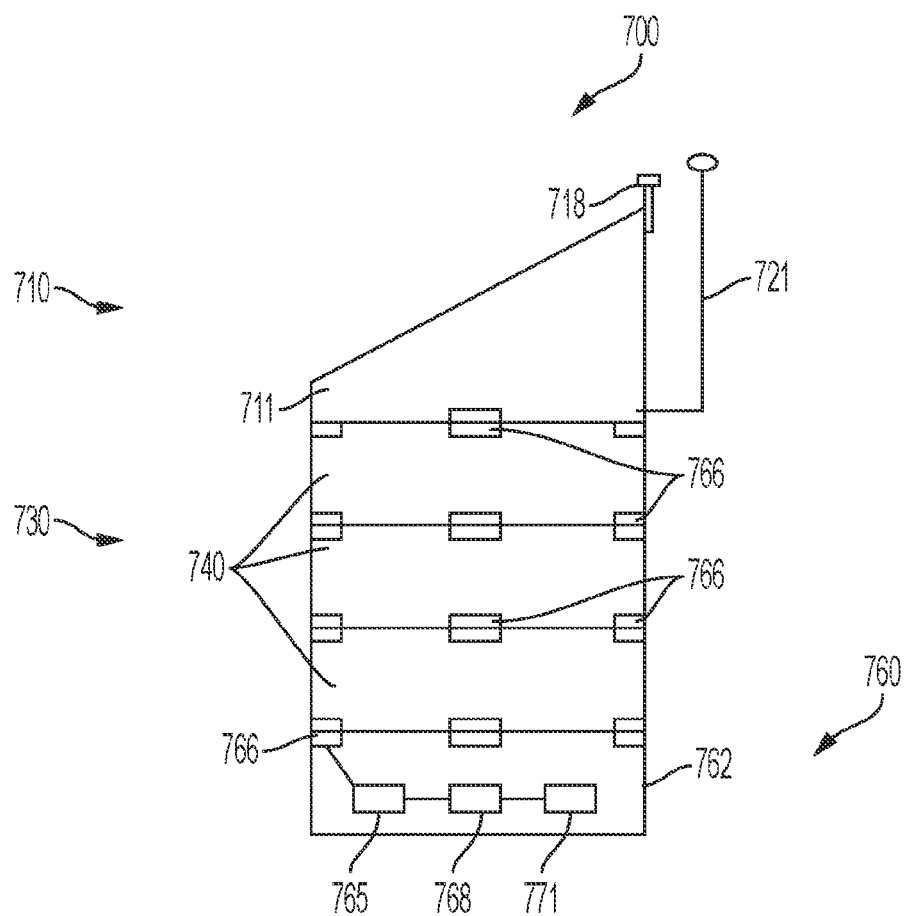
FIG. 31 illustrates a side view of the UAV storage box of FIG. 30.

As better seen in FIG. 31, these modules 710, 730, and 760 are arranged in a vertical stack. The communication module 710 is placed above the UAV hangar modules 730 while the UAV hangar modules 730 are placed above the power storage module 760. The communication module 710, the UAV hangar modules 730, and the power storage module 760 are also connected by multiple data or power connectors 766.

Figure 32:
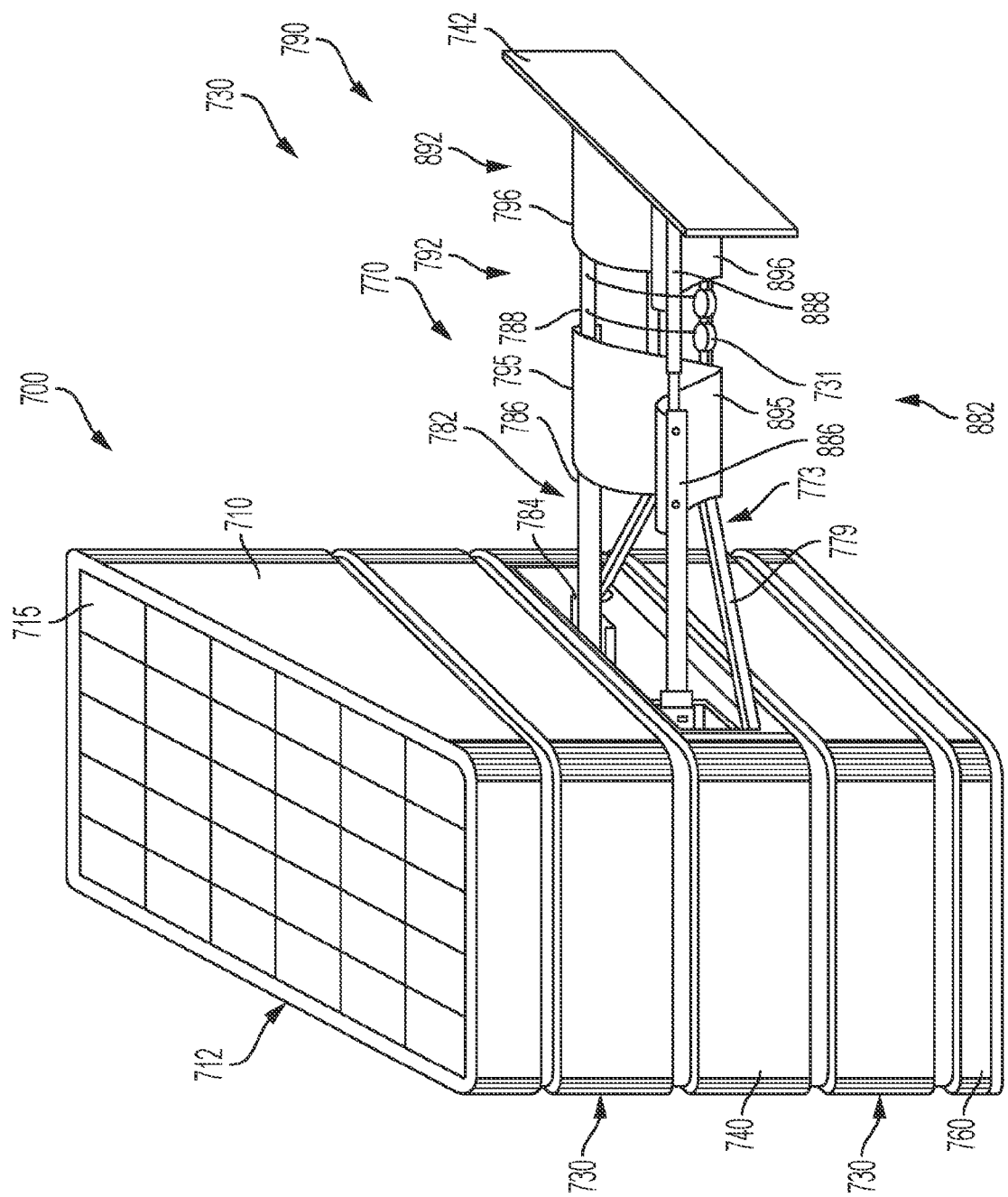
FIG. 32 illustrates a perspective view of a UAV hangar module of the UAV storage box of FIG. 30.

FIG. 32 depicts one UAV hangar module 730. The UAV hangar module 730 includes a UAV container 740, a movable UAV landing platform 790, and a UAV landing platform extension mechanism 770.

The UAV container 740 is connected to the UAV platform extension mechanism 770, which is connected to the UAV landing platform 790.

The hangar module 730 is adapted such that it provides a storage state and a UAV landing or takeoff state. In the storage state, the UAV platform extension mechanism 770 and the UAV landing platform 790 are positioned inside the UAV container 740. In the landing state, the UAV platform extension mechanism 770 moves the UAV landing platform 790 outside the UAV container 740.

The UAV container 740 includes three fixed vertical side panels 741 and one movable vertical side panel 742.

Figure 33:
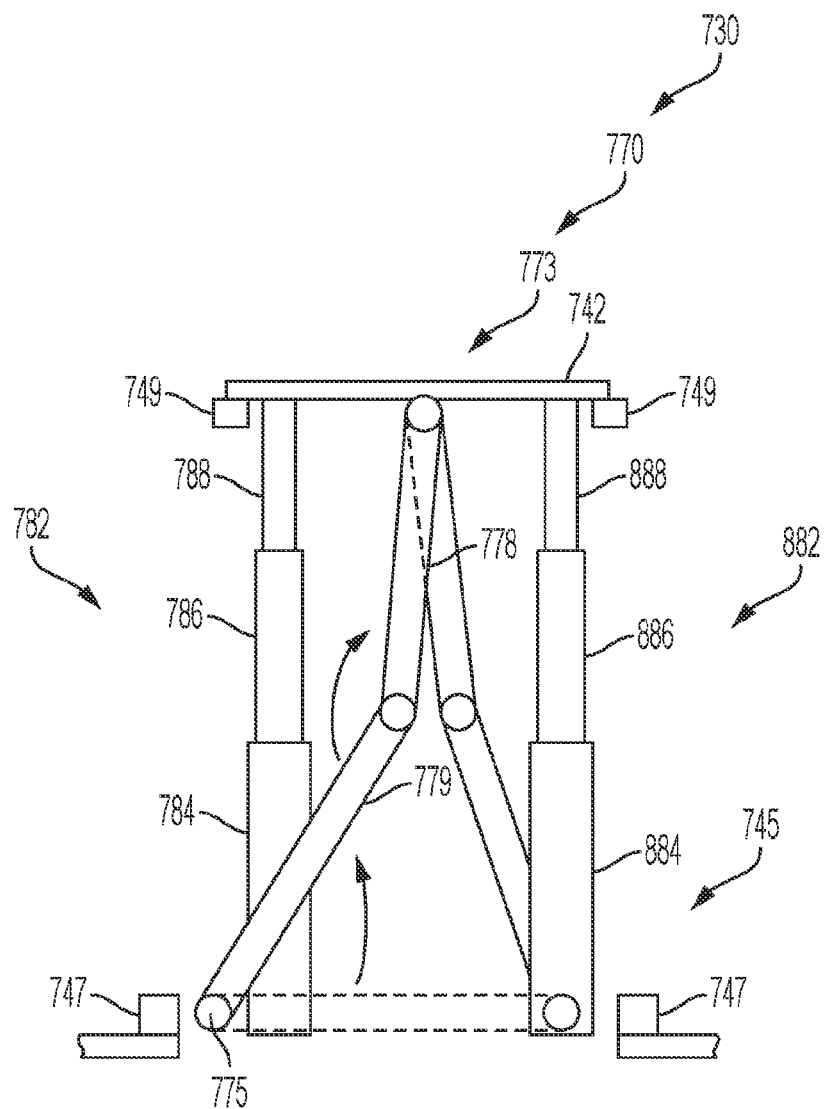
FIG. 33 illustrates a UAV landing platform extension mechanism of the UAV hangar module of FIG. 32.

As shown in FIG. 33, the container 740 also includes a magnetic lock 745. The magnetic lock 745 includes a magnet 747 and an armature plate 749. The armature plate 749 is fixed on the movable side panel 742 while the magnet 747 is fixed to one fixed side panel 741.

Figure 34:
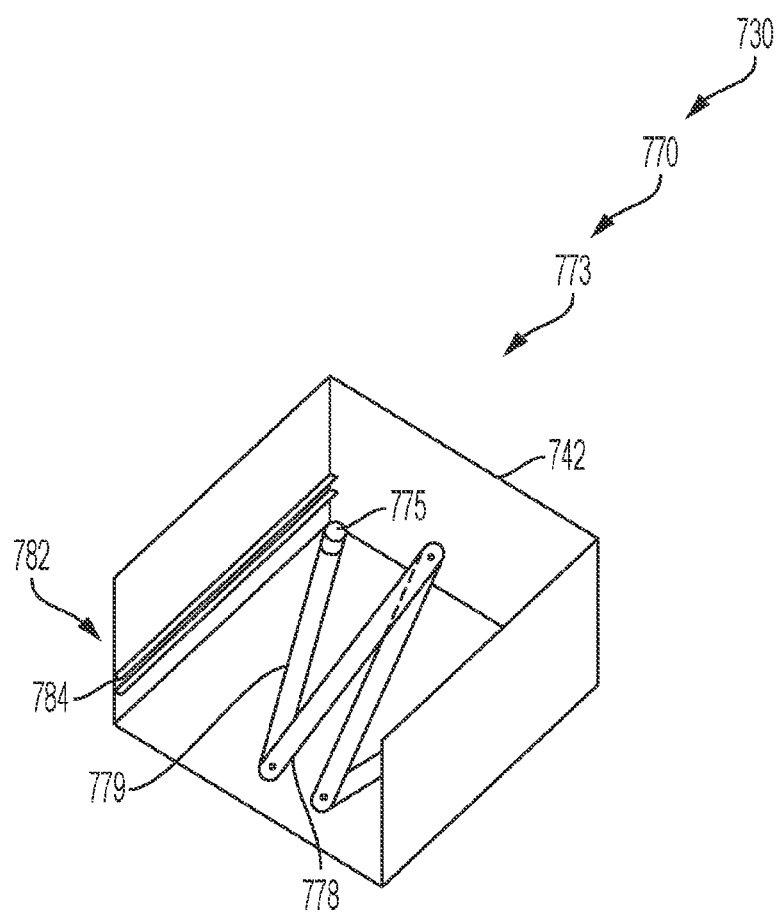
FIG. 34 illustrates a perspective view of the UAV landing platform extension mechanism of FIG. 33, the UAV landing platform extension mechanism is placed in a retraction state.
Figure 35:
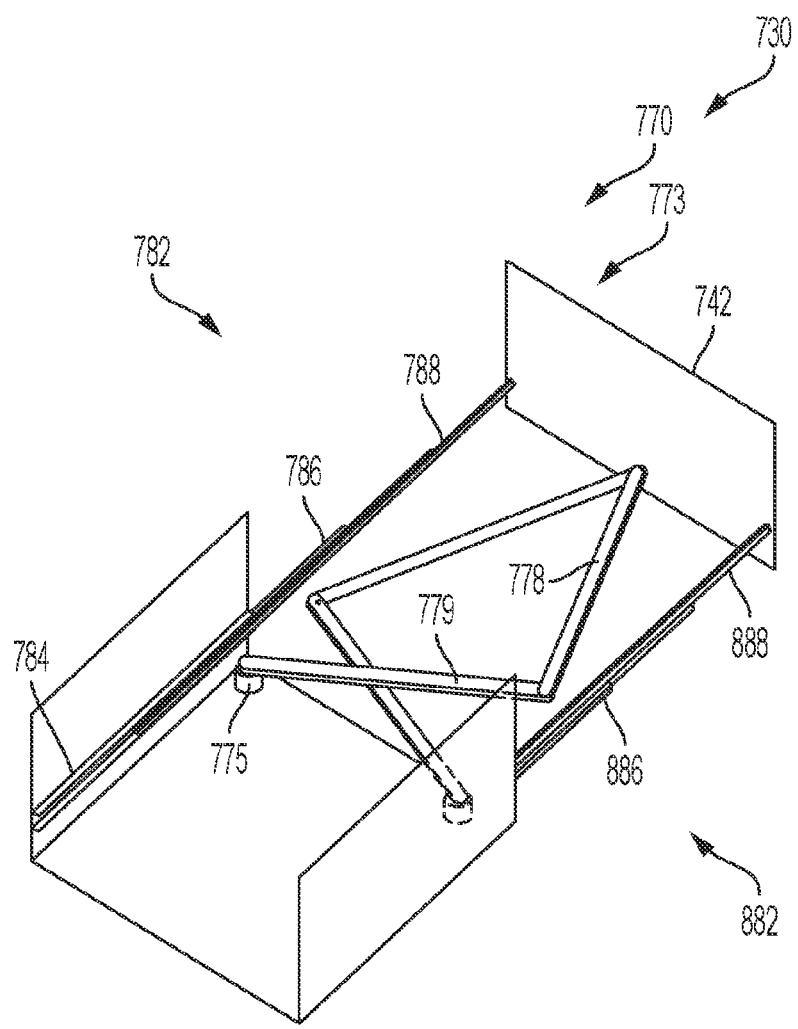
FIG. 35 illustrates a perspective view of the UAV landing platform extension mechanism of FIG. 33, the UAV landing platform extension mechanism is placed in an extension state.
Figure 36:
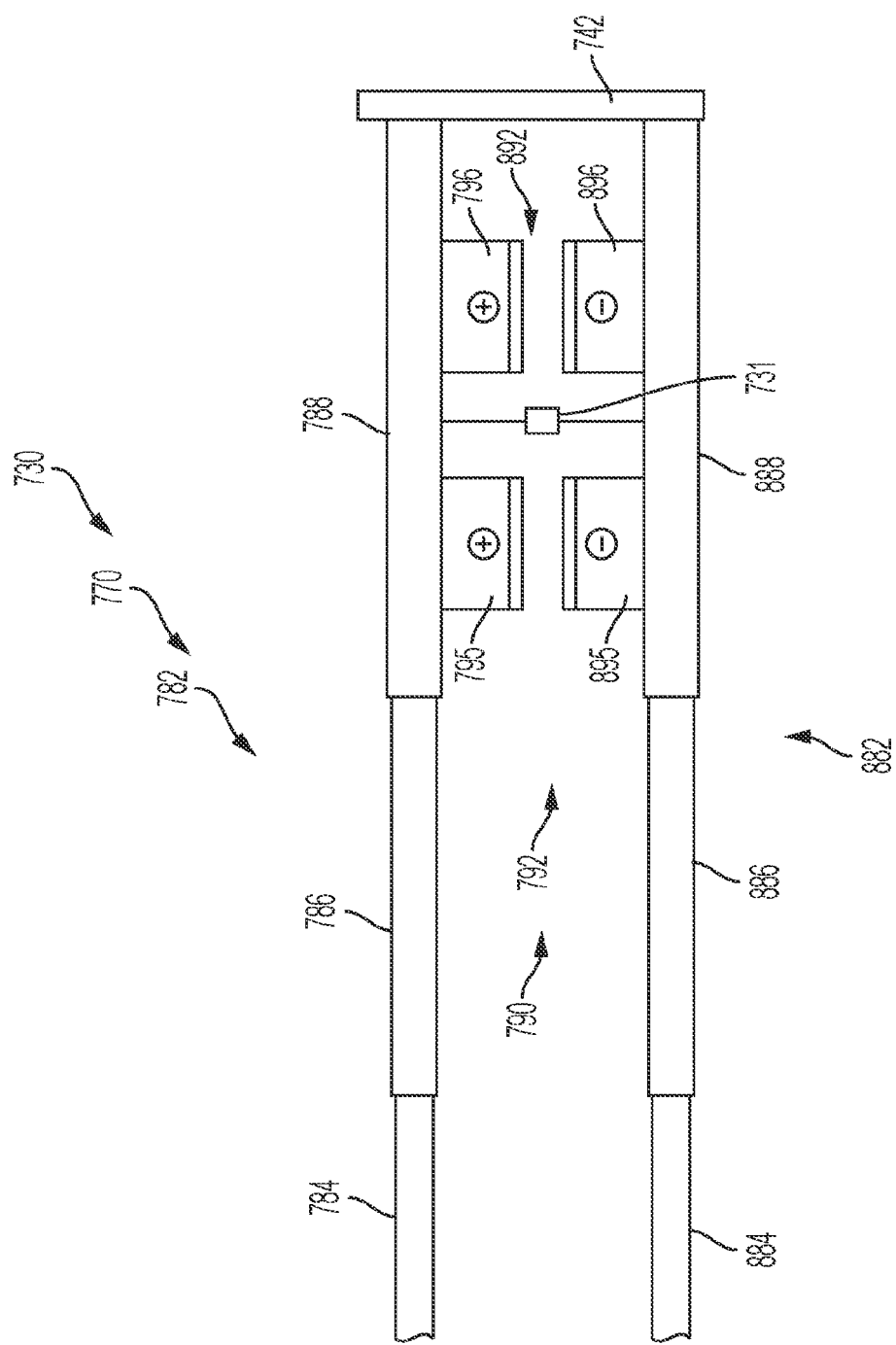
FIG. 36 illustrates a plan view of a movable UAV landing platform when the UAV landing platform extension mechanism of FIG. 33 is placed in the extension state.
Figure 37:
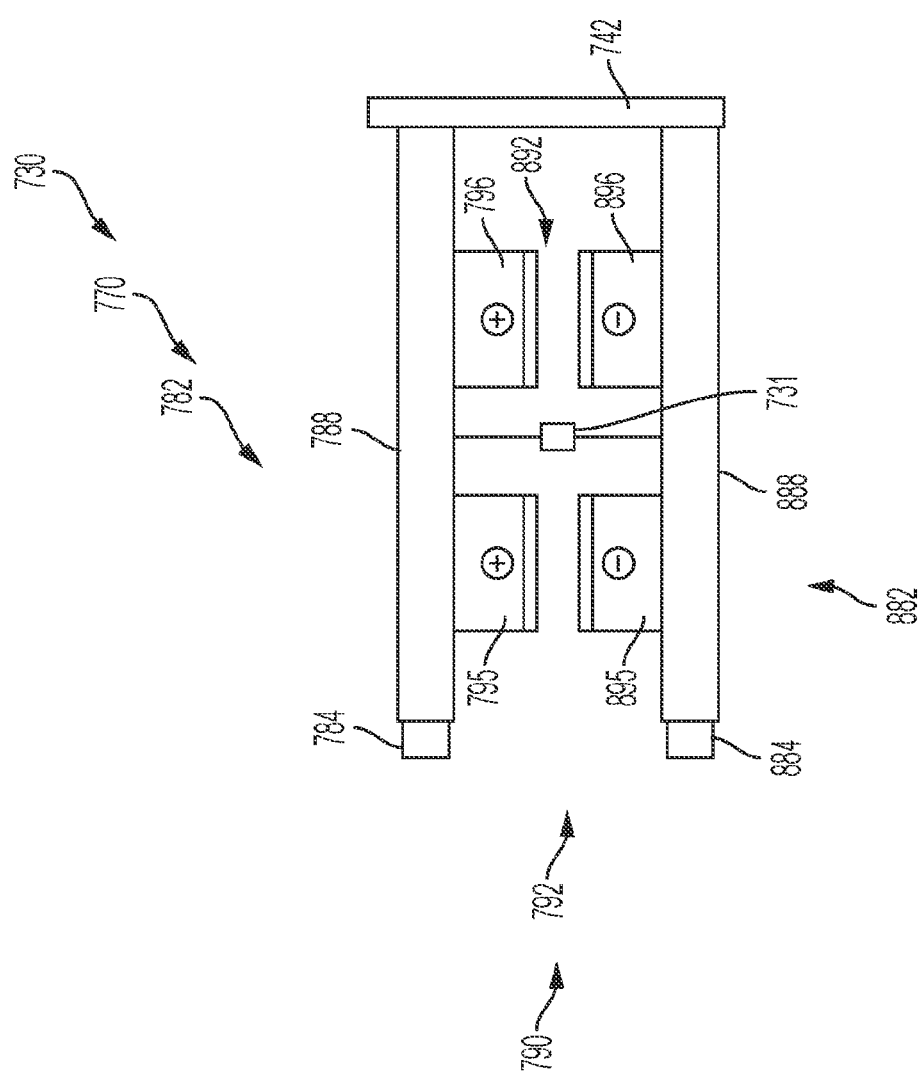
FIG. 37 illustrates a plan view of the movable UAV landing platform when the UAV landing platform extension mechanism of FIG. 33 is placed in the retraction state.
Figure 38:
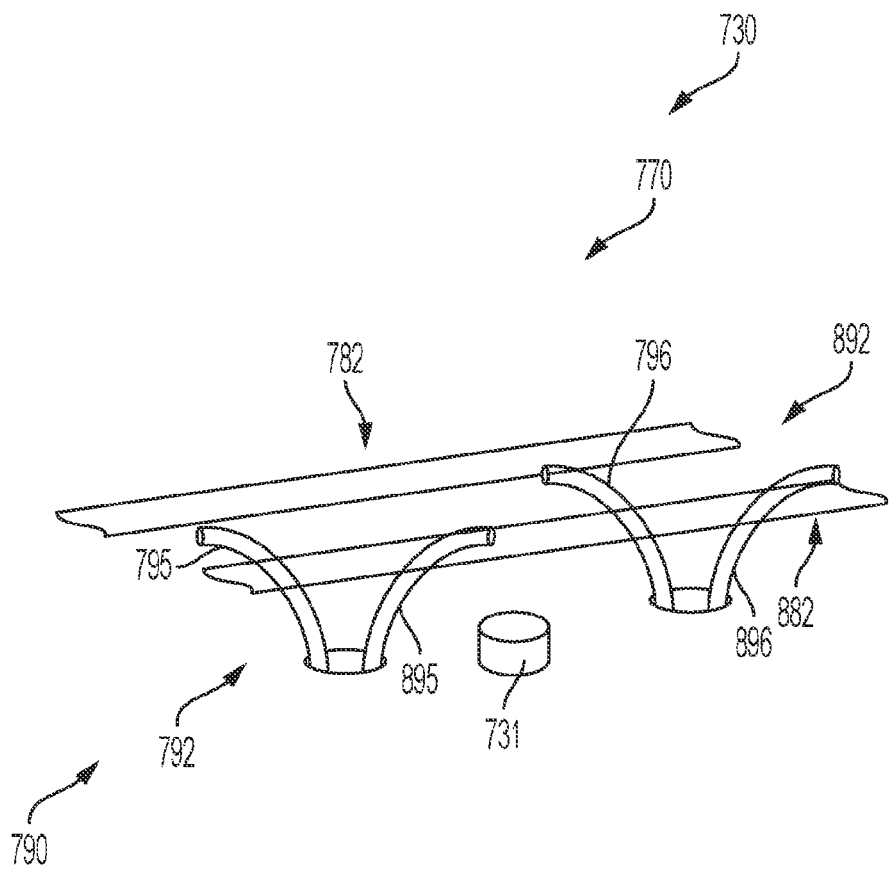
FIG. 38 illustrates a perspective view of the UAV-landing platform extension mechanism with the movable UAV landing platform of the UAV hangar module of FIG. 32.
Figure 39:
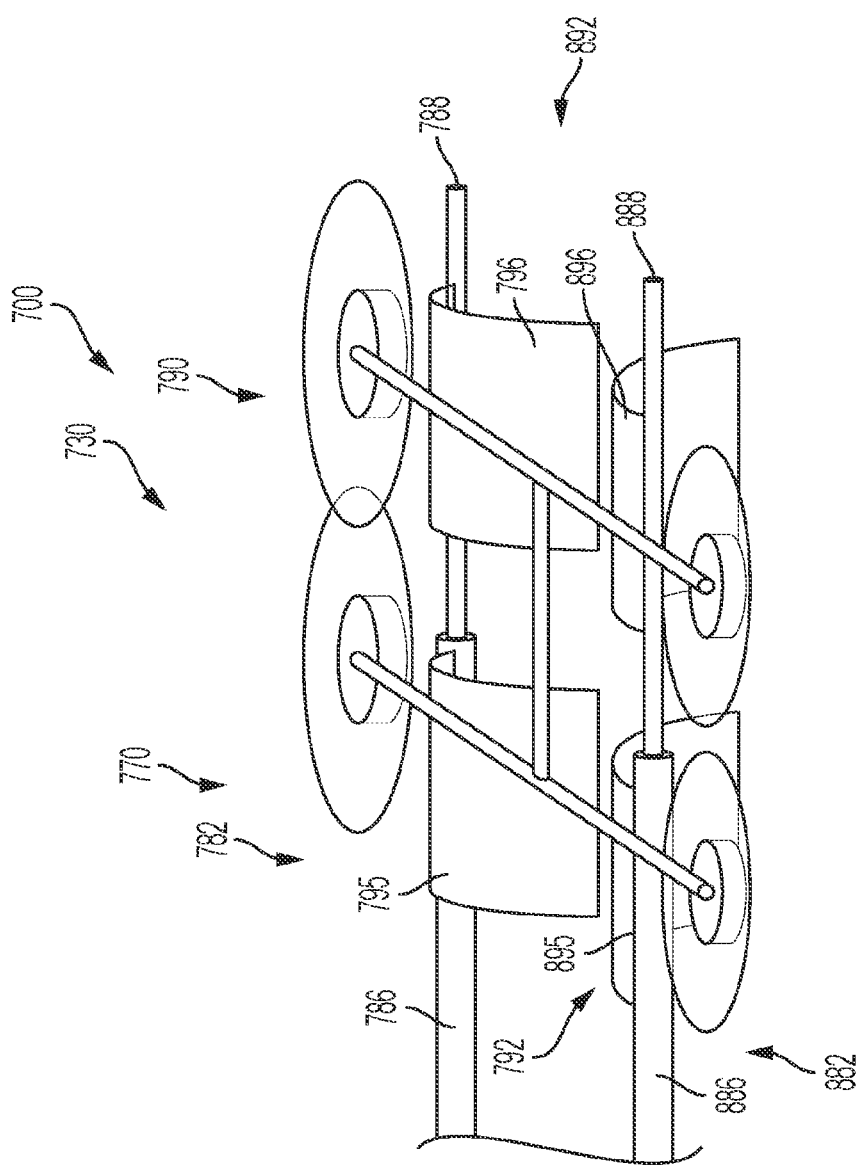
FIG. 39 illustrates a perspective view of the UAV landing platform of the UAV hangar module of FIG. 32 with a landing UAV.
Figure 40:
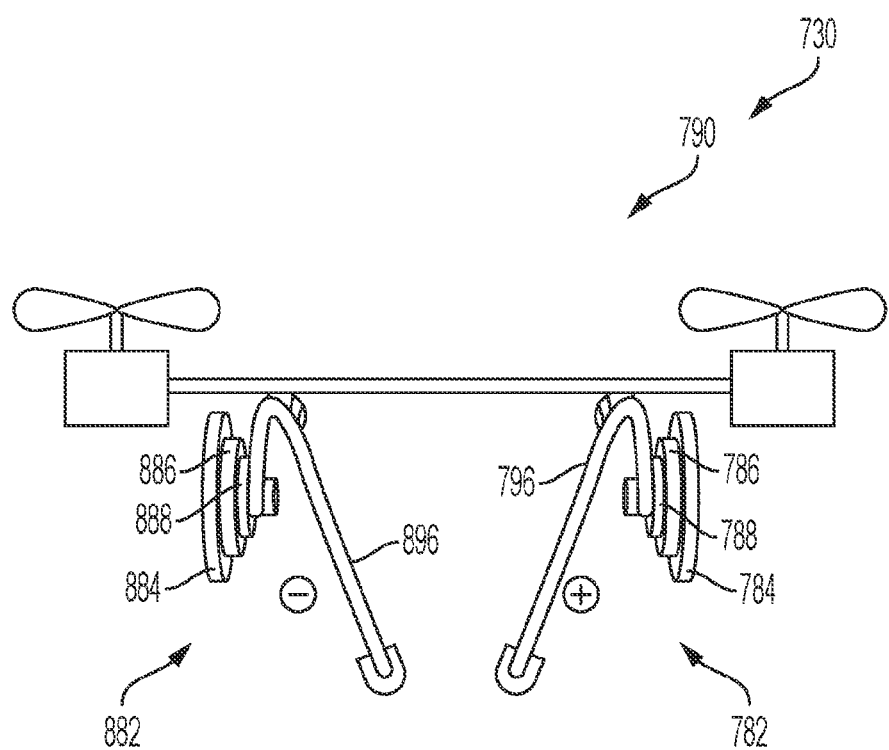
FIG. 40 illustrates a side view of the UAV landing platform with the landing UAV of FIG. 39.

As better seen in FIGS. 33, 34, and 35, the UAV platform extension mechanism 770 includes a first telescopic slide rail 782 with a second telescopic slide rail 882, and a slide rail actuator module 772.

The first telescopic slide rail 782 is connected to one fixed side panel 741 while the second telescopic slide rail 882 is connected to another fixed side panel 741, which placed opposite to the first side panel 741. This is done such that the first telescopic slide rail 782 and the second telescopic slide rail 882 are placed opposite and parallel to each other, and are also placed at the same level.

In detail, the first telescopic slide rail 782 includes a fixed first rail member 784, a displaceable second rail member 786, and a displaceable third rail member 788.

The first rail member 784 is mounted horizontally to one fixed side panel of the container 740. The second rail member 786 is slidably connected to the first rail member 784 such that the second rail member 786 is movable horizontally. Similarly, the third rail member 788 is slidably connected to the second rail member 786 such that third rail member 788 is movable horizontally. An outer end of the third rail member 788 is attached to a part of the inner side of the movable side panel 742.

Likewise, the second telescopic slide rail 882 includes a fixed first rail member 884, a displaceable second rail member 886, and a displaceable third rail member 888. The second telescopic slide rail 882 and the first telescopic slide rail 782 are arranged similarly.

The slide rail actuator module 772 includes a main horizontally movable slide rail actuator 773 and a backup horizontally slide rail actuator 775, which is arranged similarly to the main slide rail actuator 773.

The main slide rail actuator 773 includes a first elongated arm 778, a second elongated arm 779, and a rotary actuator 775. A distal end of the first arm 778 is pivotably connected to a part of the inner side of the movable side panel 742 while a proximal end of the first arm 778 is pivotably connected to a distal end of the second arm 779. A proximal end of the second arm 779 is connected to the rotary actuator 775, which is fixed on a part of the container 740.

As better seen in FIGS. 36, 37, 38, and 39, the movable UAV landing platform 790 includes a first landing unit 792, a second landing unit 892, and a beacon unit 731. The beacon unit 731 is placed between the first landing unit 792 and the second landing unit 892 and is also placed in proximity of the first landing unit 792 and the second landing unit 892.

The first landing unit 792 and the second landing unit 892 are located at a distance above the ground, which is greater than a predetermined UAV landing height.

The first landing unit 792 includes two opposing UAV landing surfaces, namely a first UAV landing surface 795 and a second UAV landing surface 895. The first landing surface 795 is connected to a part of the third rail member 788 of the first telescopic slide rail 782 while the second landing surface 895 is connected to a part of the third rail member 888 of the second telescopic slide rail 882.

The opposing UAV landing surfaces 795 and 895 are inclined such that these surfaces 795 and 895 do not touch each other. In other words, a gap or space is present between the surfaces 795 and 895. The surfaces 795 and 895 are also adapted for receiving and guiding a landing UAV to a predetermined position.

A UAV power supply charging element is placed on each of the surfaces 795 and 895.

Likewise, the second landing unit 892 includes two opposing landing surfaces 796 and 896. The second landing unit 892 and the first landing unit 792 are arranged similarly.

The beacon unit 731 includes one or more infrared (IR) light sources.

Figure 41:
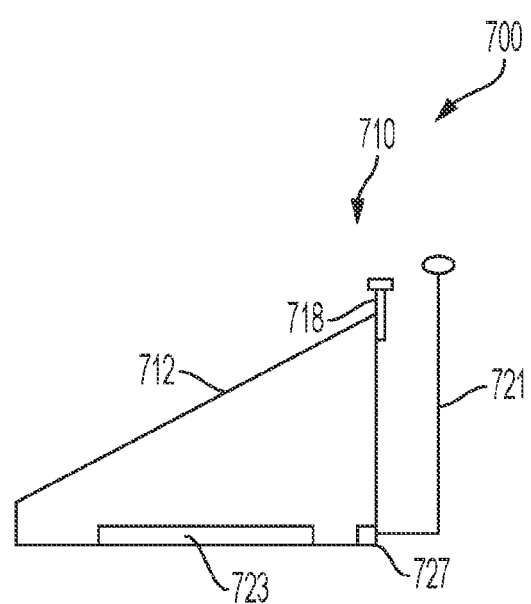
FIG. 41 illustrates a side view of a communication module of the UAV storage box of FIG. 30.
Figure 42:
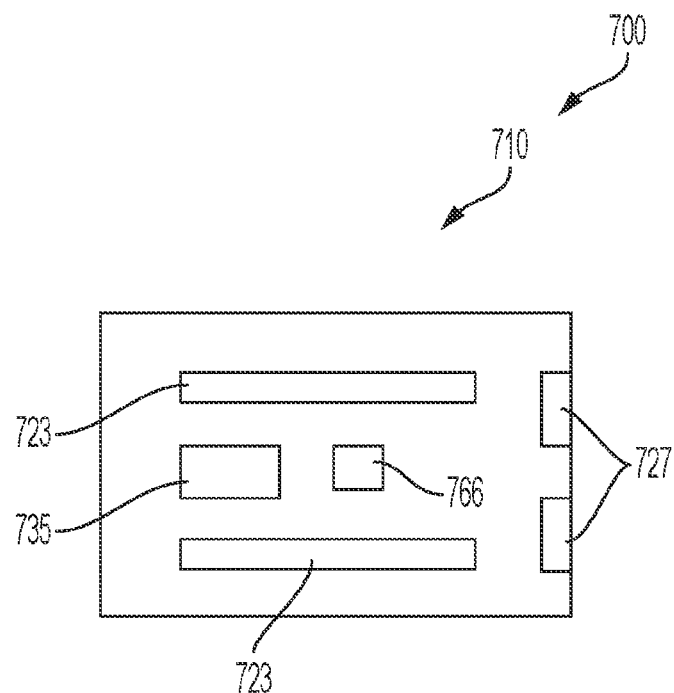
FIG. 42 illustrates a plan view of the communication module of FIG. 41.

As better seen in FIGS. 41 and 42, the communication module 710 includes a container 711 with an inclined lid 712, a solar panel 715, a weather sensor 718, an antenna 721, a controller unit 723, a modem unit 727, and a battery pack 735. The solar panel 715, the weather sensor 718, and the antenna 721 are placed outside the container 711 while the controller unit 723, the modem unit 727, and the battery pack 735 are placed inside the container 711.

In detail, the solar panel 715 is placed above and next to the lid 712 and is electrically connected to the battery pack 735. The antenna 721 is electrically connected to the modem unit 727, which is electrically connected to the controller unit 723. The weather senor 718 is also electrically connected to the controller unit 723. The controller unit 723 is also electrically connected to the beacon unit 731 of each UAV hangar module 730.

As better seen in FIG. 31, the power storage module 760 includes a power storage container 762, a battery unit 765, a fuel cell unit 768, and a fuel tank 771. The battery unit 765, the fuel cell unit 768, and the fuel tank 771 are placed inside the power storage container 762.

The fuel tank 771 is connected to the fuel cell unit 768, which is electrically connected to the battery unit 765. The battery unit 765 is also electrically connected to parts of the communication module 710, and to parts of the UAV hangar module 730 via data or power connectors 766.

In use, the controller unit 723 serves to manage or direct parts of the UAV hanger module 730 and parts of the communication module 710.

Each UAV hangar module 730 provides a platform for an UVA to land. The UAV hangar module 730 can then store and protect the UAV as well as electrically charge a battery of the UAV. The UAV hangar module 730 also allows the UAV to take off.

The UAV container 740 provides a container open state. In the container open state, the movable side panel 742 is placed apart from the three fixed panels 741.

In detail, the controller unit 723 activates the slide rail actuator 773 to extend the telescopic slide rails 782 and 882.

In the extension state, the rotary actuator 775 is activated to rotate the second arm 779, which moves the first arm 778 such that the first arm 778 moves the movable side panel 742 away from the fixed vertical side panels 741. Put differently, the container 740 is placed in an open state.

This rotation extends the first telescopic slide rail 782, wherein the third rail member 788 and the second rail member 786 are slid away from the first rail member 784. Similarly, this rotation extends the second telescopic slide rail 882, wherein the third rail member 888 and the second rail member 886 are slid away from the first rail member 884.

The telescopic slide rails 782 and 882 are extended such that the UAV landing platform 790 is away from the UAV container 740 to a landing position for receiving a UAV. In other words, the UAV landing platform 790 is exposed for receiving the UAV.

The beacon unit 731 acts to guide the UAV to the landing surfaces 785 and 795.

The landing portions of the landing surfaces 785 and 795 of the landing platform 790 act as areas for receiving the UAV, wherein the inclinations of these landing surfaces 785 and 795 are intended for contacting the landing UAV and for guiding the landing UAV to a predetermined landing position.

The landing surfaces 785 and 795 are arranged such that the landing surfaces 785 and 795 are positioned away from propellers of the UAV such that the landing surfaces 785 and 795 do not block downward air thrust from the propellers.

In general, the parts of the UAV hangar module 730 are also arranged to provide gaps or openings for allowing the downward air thrust to pass through these openings of the hangar module parts without the parts essentially blocking the downward air thrust. In other words, the UAV hangar module 730 does not obstruct the downward air thrust.

The first landing unit 792 and the second landing unit 892 are also placed above the predetermined UAV landing height such that the UAV is sufficiently far away from the ground, wherein the ground does not essentially affect or interfere with the downward airflow, which is generated by the UAV.

In short, the ground does not cause a density of the air, which is placed between the rotors of the landing UAV and the ground, to increase and to reduce the downward airflow.

After the UAV has landed, the UAV is moved into the UAC container 740.

In detail, the controller unit 723 activates the slide rail actuator 773 to retract the first telescopic slide rails 782 and 882.

In the retraction state, the rotary actuator 775 is activated to rotate the second arm 779, which moves the first arm 778 such that the first arm 778 moves the movable side panel 742 towards the fixed vertical side panels 741. Put differently, the container 740 is placed in a closed state.

This rotation also retracts the first telescopic slide rail 782, wherein the third rail member 788 and the second rail member 786 are slid toward the first rail member 784. Similarly, this rotation retracts the second telescopic slide rail 882, wherein the third rail member 888 and the second rail member 886 are slid toward the first rail member 884.

The telescopic slide rails 782 and 882 are retracted such that the UAV landing platform 790 with the UVA is placed inside the UAV container 740.

The magnet 747 is later locked onto the armature plate 749 to fix the movable side panel 742 to the fixed side panels 741.

The modem unit 727 is used for converting received data from the controller unit 723 to radio signals for transmitting to the antenna 712. The antenna 721 then transmits the radio signals. The antenna 721 can also receive radio signals from other sources. The modem unit 727 then converts the received radio signals from the antenna 721 to digital data for transmitting to the controller unit 723.

Referring to the communication module 710, the solar panel 715 acts to convert light energy from the sun into electrical energy for storing in the battery pack 735. The stored electrical energy in the battery packed 735 can later be used for powering parts of the communication module 710 and parts of the UAV hangar modules 730.

The fuel tank 771 is used for storing fuel such as hydrogen. The fuel cell unit 768 then converts the fuel to electrical energy for storing in the battery unit 765.

The controller unit 723 directs the battery unit 765 to provide electrical energy to the UAV power supply charging elements of the landing surfaces 785 and 795 for charging the battery of the UAV.

The data or power connectors 766 are intended for carrying data between the controller unit 723 and parts of the UAV hanger modules 730. The data or power connectors 766 also serve to carry electrical power from the battery unit 765 to parts of the UAV hanger module 730 and parts of the communication module 710.

The weather sensor 718 is intended for detecting weather data, such as presence of rain or snow and for transmitting the weather information to the controller unit 723 for decision-making.

Figure 43:
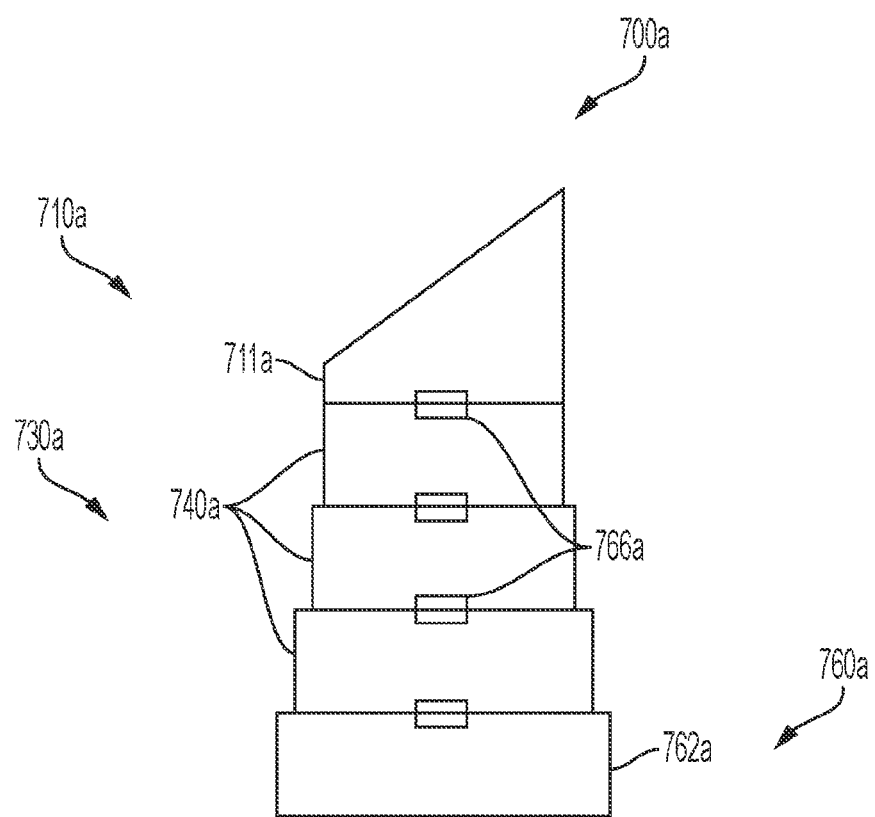
FIG. 43 illustrates another UAV storage box.

FIG. 43 shows another embodiment of UAV storage box 700*a*. The UAV storage box 700*a* includes a communication module 710*a*, a plurality of UAV hangar modules 730*a*, and a power storage module 760*a*.

Each of these modules 710*a*, 730*a* and 760*a* includes a container 711*a*, 740*a*, and 762*a*. The containers 711*a*, 740*a*, and 762*a* have different sizes and are arranged in a vertical stack. These modules are also connected by multiple data or power connectors 766*a*.

Figure 44:
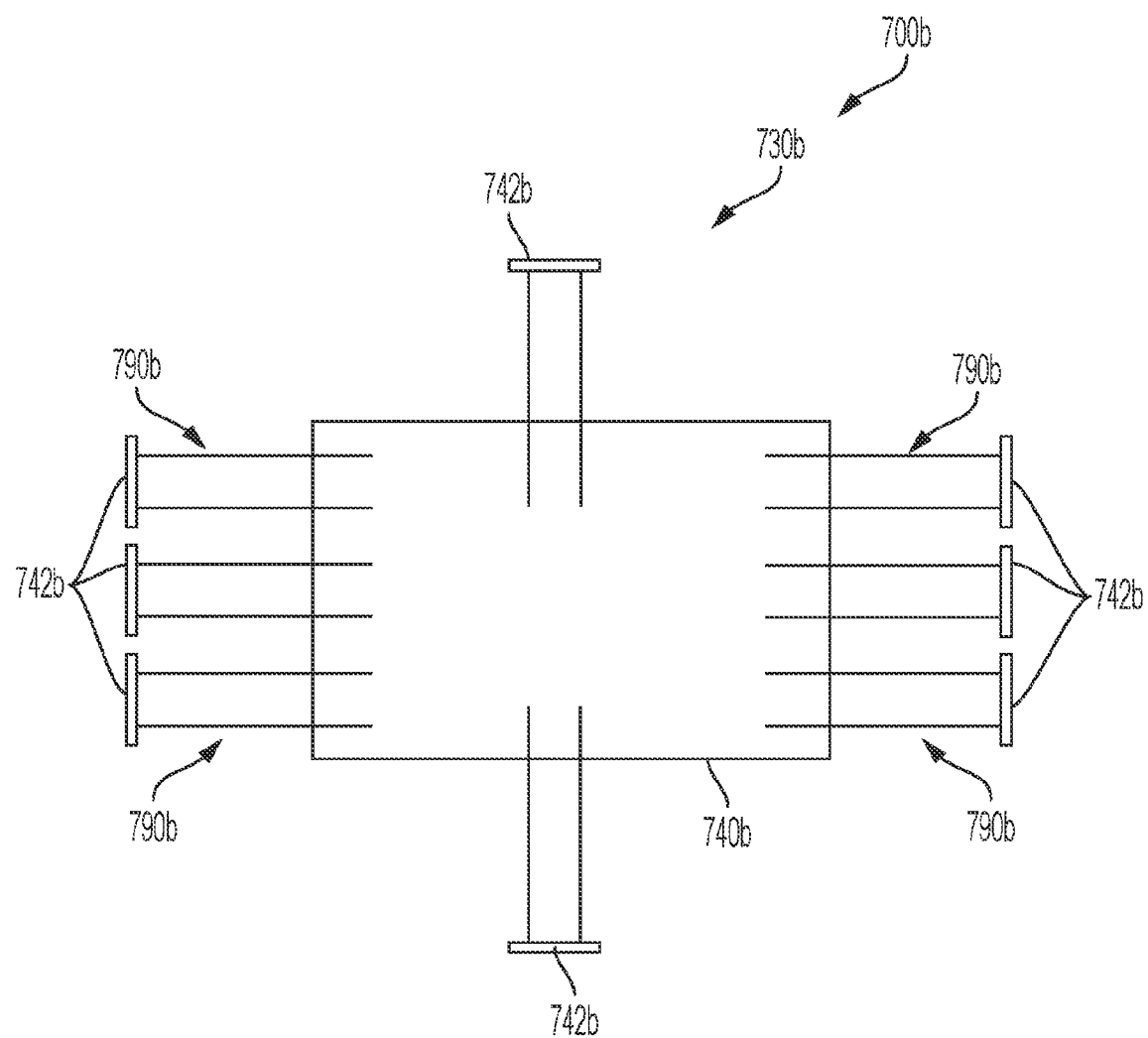
FIG. 44 illustrates a further UAV hangar module with multiple movable UAV landing platforms.

Different implementations of the UAV storage box 700 are possible. As seen in FIG. 44, a further UAV hangar module 730*b* includes a container 740*b* with multiple movable landing platforms 790b for receiving several UAVs and for storing the received UAVs. The UAV platform extension mechanism 770 can be implemented with other mechanisms.

The UAV storage box 700 provides several benefits.

The UAV hangar module 730 improves UAV landing stability of the UAV hangar module 730. In other words, the UAV hangar module 730 allows the UAV to land, wherein the downward thrust of the UAV does not affect the landing of the UAV.

The UAV hangar module 730 can be added to and be removed from the UAV storage box 700 according to operational requirement. A UAV hangar module 730 can be removed away from the UAV storage box 700 to another site for repair or maintenance without affecting operation of the rest of the UAV storage box 700.

Figure 45:
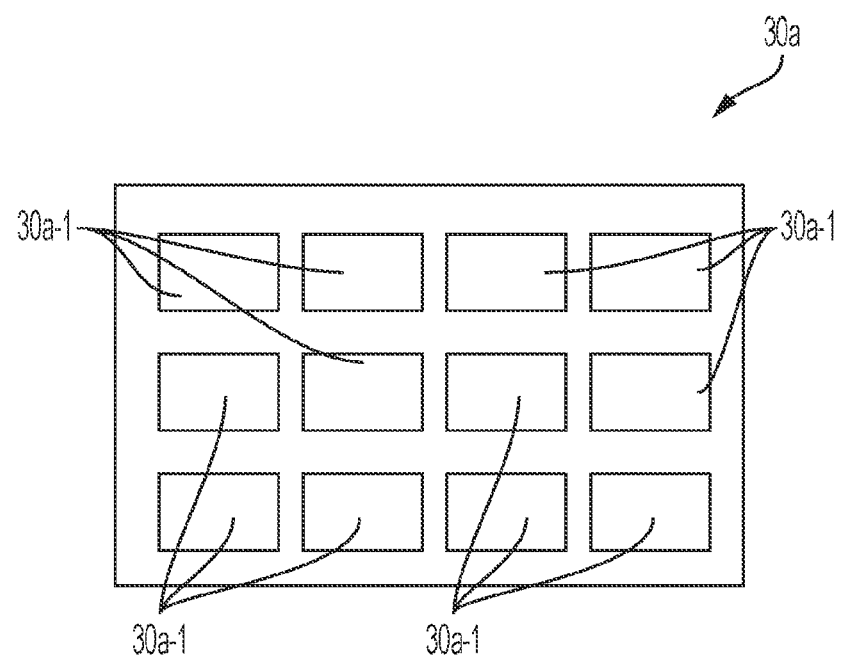
FIG. 45 illustrates a further UAV landing platform of a UAV protection storage device of the UAV assembly of FIGS. 1 to 8.

FIG. 45 shows a further UAV landing platform 30a for a UAV protection storage device of the UAV assembly of one of FIGS. 1 to 8.

The movable landing platform 30a includes a plurality of openings or slots 30a-1. In one implementation, the slots 30a-1 are provided by a wire mesh.

In use, the UAV protection storage device is used for receiving and storing a vertical take-off and landing Unmanned Air Vehicle (UAV) with propellers or rotors.

The energized UAV rotors generates a downward thrust for moving the UAV.

The landing platform 30a can be positioned in an elevated position and in a storing position. The elevated position is also called a landing position.

In the elevated position, the slots 30a-1 of the landing platform 30a allow an airflow of a downward thrust of a UAV, which is landing or taking off, to pass through the landing platform 30a without essentially affecting or interfering with the airflow.

The UAV landing platform 30a is also positioned higher than a predetermined in-ground-effect height. A UAV, which is landing, moves, in a downward manner, towards the UAV landing platform 30a. This land UAV is then positioned above the predetermined in-ground-effect height.

The height of the landing platform 30a allows the landing UAV to be separated from the protection storage device such that the protection storage device or the ground does not affect the airflow of the downward thrust of the UAV. In other words, the protection storage device or the ground does not cause a density of air, which is placed between the UAV rotors and the protection storage device or between the UAV rotors and the ground, to increase in density. The increase of density can affect the airflow of the downward thrust of the UAV. This, in turn, affects the landing or the takeoff of the UAV.

In short, this landing platform 30a acts to eliminate or reduce the ground effect.

Figure 46:
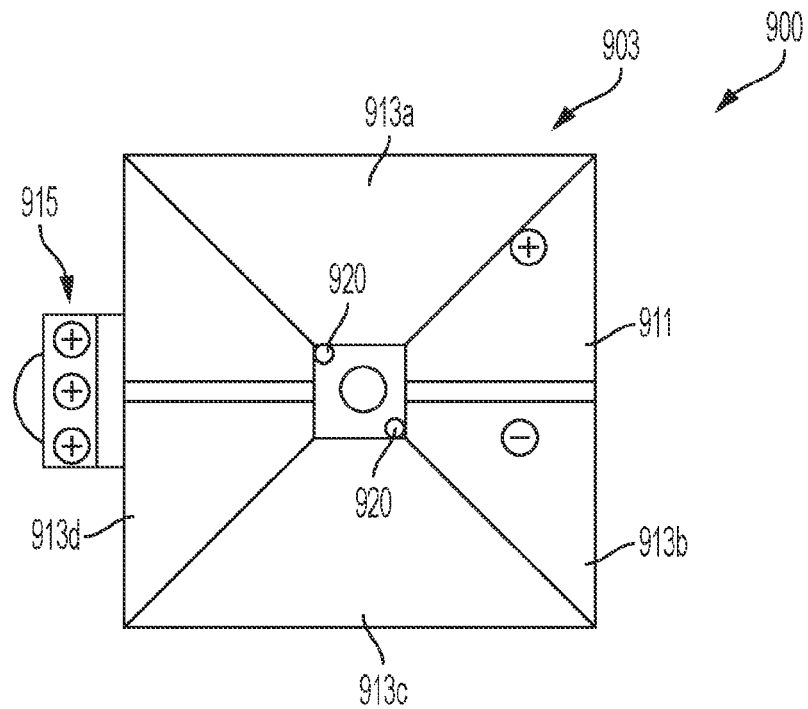
FIG. 46 illustrates a top view of a UAV landing and docking system with a UAV electrical power charging system for the UAV assembly of FIGS. 1 to 8.
Figure 47:
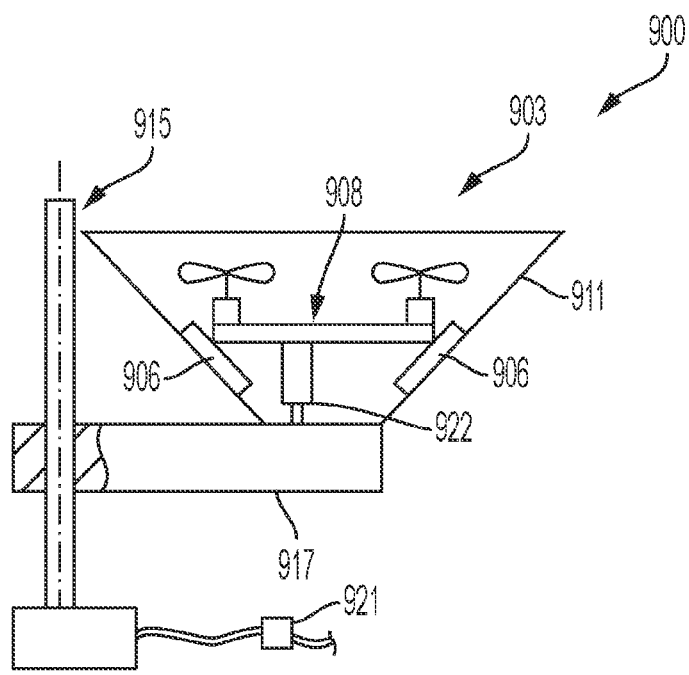
FIG. 47 illustrates a side view of the UAV landing and docking system of FIG. 46.

FIGS. 46 and 47 show a UAV landing and docking system 900 with a UAV electrical power charging system for the UAV assembly of FIGS. 1 to 8.

The landing and docking system 900 includes two gendered pieces, namely a UAV landing platform 903 and corresponding legs of a UAV 908. The landing platform 903 and the UAV legs includes corresponding portions, which are adapted to mate or contact with each other.

The UAV landing platform 903 includes a movable basket receptacle 911, which includes four trapezium plates 913a, 913b, 913c, and 913d, and a supporting stand 915 with a vertically moving arm 917. One end of the arm 917 is fixed to the receptacle 911.

Each trapezium plate 913a, 913b, 913c, and 913d has two parallel edges and two non-parallel edges, wherein one parallel edge is shorter that the other parallel edge. The four trapezium plates 913a, 913b, 913c, and 913d are joined to form a shape of an inverted pyramid frustum.

In detail, a non-parallel edge of each trapezium plate 913a, 913b, 913c, and 913d is joined to an adjacent non-parallel edge of another trapezium plate 913a, 913b, 913c, and 913d. Shorter edges of four trapezium plates 913a, 913b, 913c, and 913d form a first rectangle while longer edges of the four trapezium plates 913a, 913b, 913c, and 913d form a second rectangle. The second rectangle is larger than the first rectangle.

The receptacle 911 is also oriented such that the second rectangle is placed above the first rectangle. The trapezium plates 913a, 913b, 913c, and 913d are inclined at a predetermined angle to a horizontal plane.

In short, the receptacle 911 is shaped like an inverted pyramid with its peak shaved off so that the pyramid has a flat bottom.

Referring to the UAV 908, it includes two legs 906, which are attached to a lower part of a body of the UAV 908. The UAV legs 906 are adapted to correspond with the trapezium plates 913a, 913b, 913c, and 913d of the receptacle 911.

Referring to the electrical power charging system, it includes two electrical power connectors 920 and corresponding two electrical power pins 922. The electrical power connectors 920 are placed at respective corners of the lower first rectangle of the receptacle 911.

The electrical power connectors 920 are connected to an electrical power supply via a polarity control circuit 921.

When the UAV 908 is moving towards the landing platform 903, the legs 906 of the UAV 908 can contact with the plates 913a, 913b, 913c, and 913d of the receptacle 911.

The inclinations of the plates 913a, 913b, 913c, and 913d act to guide the legs 906 of the UAV 908 towards the smaller lower first rectangle, which acts as a predetermined landing platform. In other words, the receptacle 911 acts to center or guide the UAV 908 to the predetermined landing position. Put differently, the UAV 908 attempts to land within the receptacle 911. The legs 906 of the UAV 908 are then guided or are funneled by gravity to the flat bottom portion of the receptacle 911.

Once at the bottom of the receptacle 911, the electrical power pins 922 connects with the electrical power connectors 920.

The connection enables transfer of electrical energy, via the electrical power pins 922 and via the electrical power connectors 920, to a battery of the UAV 908.

Due to geometry of the receptacle 911, the landing UAV 908 can have only two landing positions.

The polarity control circuit 921 acts to switch electrical polarity electrical current delivered to the UAV 908 such the battery of the UAV 908 is connected correctly to the power supply.

In a general sense, the receptacle can have other shapes, instead of the inverted pyramid frustum.

This landing and docking system and UAV electrical power charging system provides several benefits.

The landing and docking system acts to reduce or eliminate instances of failed landing attempts due to ground effect.

The ground effect is generated by a downward airflow of rotors of the UAV 908, wherein this airflow produces a cushion like effect, which reduces accuracy & repeatability of landing of the UAV 908.

The receptacle 911 allows the UAV 908 to land with a safe vertical descent velocity. In other words, the UAV 908 does not suffer hard landing, which can damage the UAV 908.

Human intervention is not needed to align the UAV 908 to the landing and docking system. Put differently, the UAV 908 does skid, wherein human intervention is required to reposition the UAV.

A human operator is not needed to manually plug in or connect the UAV 908 for electrically charging the UAV 908 and for data transfer.

The UAV 908 is always connected correctly to direction of an electrical current flowing from the receptacle 911 to the UAV 908.

In a further embodiment, the trapezium plates 913a, 913b, 913c, and 913d include openings. The openings allow airflow of downward thrust of propellers or the UAV 908 to pass through the receptacle 911 for further reducing or avoiding ground effect.

Figure 48:
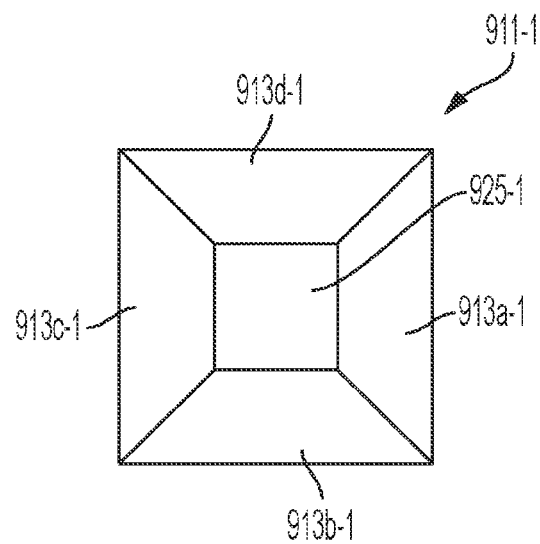
FIG. 48 illustrates a further receptacle of the UAV landing and docking system of FIG. 46.
Figure 49:
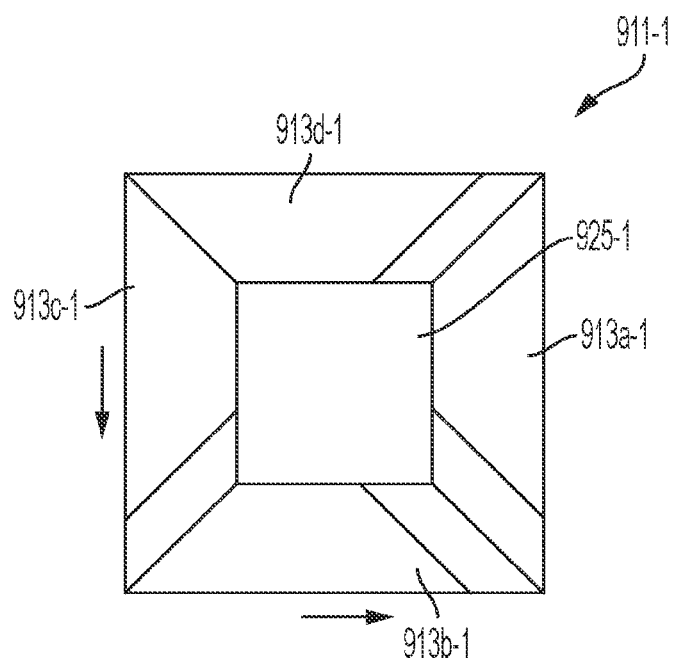
FIG. 49 illustrates an expanded state of the receptacle of FIG. 48.

FIGS. 48 and 49 show a further receptacle 911-1 of the UAV landing and docking system of FIG. 46.

The receptacle 911-1 includes extendable trapezium plates 913a-1, 913b-1, 913c-1, and 913d-1.

The trapezium plates 913a-1, 913b-1, 913c-1, and 913d-1 allow changing length and breadth of the receptacle 911-1, as shown in FIG. 49.

This enables the size of a UAV landing platform 925-1 of the receptacle 911-1 to be changed, according to a size of a landing UAV, when needed.

Figure 50:
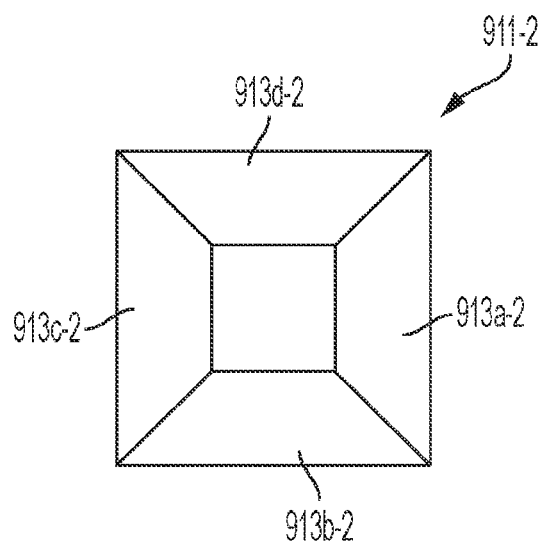
FIG. 50 illustrates another receptacle of the UAV landing and docking system of FIG. 46.
Figure 51:
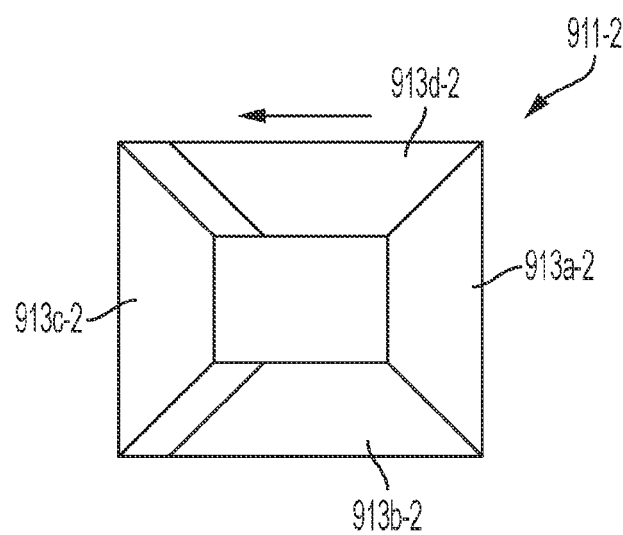
FIG. 51 illustrates a first expanded state of the receptacle of FIG. 50.
Figure 52:
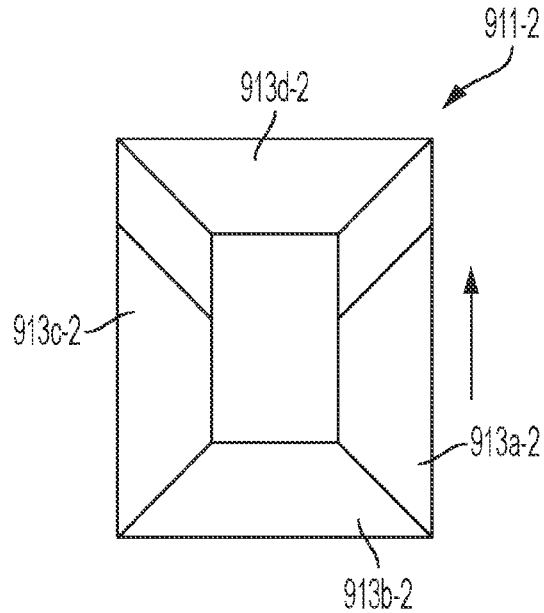
FIG. 52 illustrates a second expanded state of the receptacle of FIG. 50.

FIGS. 50, 51, and 52 shows another receptacle 911-2 of the UAV landing and docking system of FIG. 46.

The receptacle 911-2 includes extendable trapezium plates 913a-2, 913b-2, 913c-2, and 913d-2.

The trapezium plates 913a-2, 913b-2, 913c-2, and 913d-2 allow changing length or breadth of the receptacle 911-1, as shown in FIGS. 51 and 52.

Figure 53:
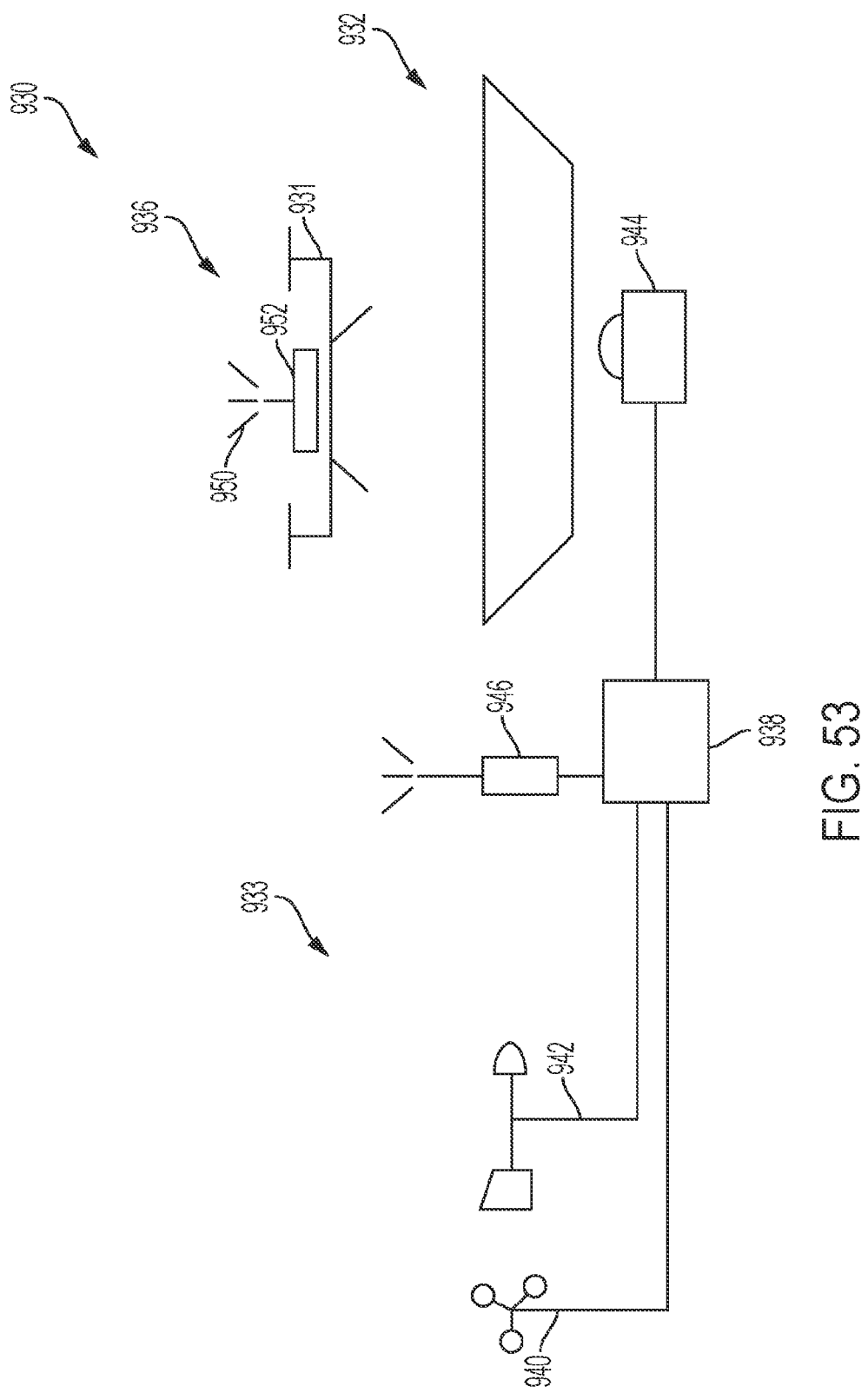
FIG. 53 illustrates an improved landing system for the UAV assembly of FIGS. 1 to 8.
Figure 54:
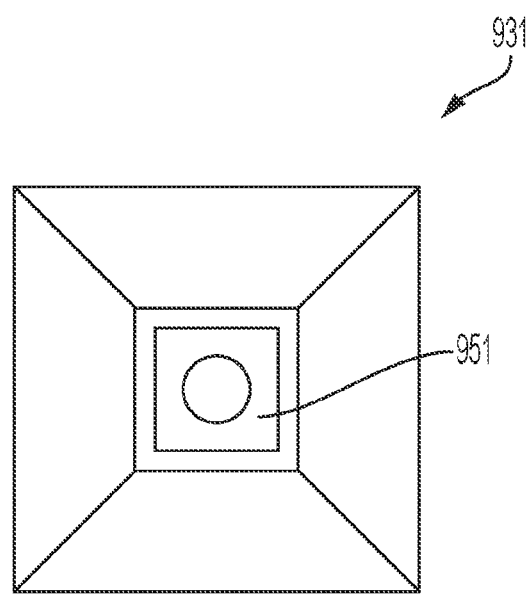
FIG. 54 illustrates a bottom view of an UAV, which includes the landing system of FIG. 53.

FIGS. 53 and 54 show an improved landing system 930 for the UAV assembly of FIGS. 1 to 8. The UAV assembly includes a UAV protection storage device 932 and a UAV 931.

The landing system 930 includes a ground flight transmitter 933 and a UAV flight receiver 936. The ground flight transmitter 933 is wirelessly and is communicatively connected with the UAV flight receiver 936. The ground flight transmitter 933 is provided as a part of the protection storage device 932 while the flight receiver 936 is provided as a part the UAV 931.

The ground flight transmitter 933 includes a low-latency flight controller 938, a wind speed sensor 940, a wind direction sensor 942, a high-speed camera 944, and a wireless flight instruction transmitter 946. The flight controller 938 is electrically connected to the wind speed sensor 940, to the wind direction sensor 942, to the camera 944, and to the wireless flight instruction transmitter 946. The camera 944 is placed below a receptacle of the 932

The UAV flight receiver 936 includes a wireless UAV flight instruction receiver 950, a UAV beacon unit 951, and a UAV controller 952. The UAV beacon unit 951 is placed a bottom part of the UAV 931. The wireless flight instruction receiver 950 is wirelessly connected with the flight instruction transmitter 946 and is electrically connected with the UAV controller 952.

In use, the UAV beacon unit 951 generates light signals for easy detection of the UAV 931.

The camera 944 captures images of light signals of the UAV beacon unit 951 sends the image data to the flight controller 938.

The wind speed sensor 940 detects speed of wind at its location and sends wind speed data to the flight controller 938.

The wind direction sensor 942 detects direction of the wind and sends wind direction data to the flight controller 938.

The flight controller 938 then determines location of the UAV according to the received image data.

The flight controller 938 also then determines UAV flight instructions for allow the UAV 931 to land on a part of the protection storage box 932, in a safe and accurate manner. The flight instructions are determined according to the received wind speed data, to the received wind direction data, and to the determined UAV location data.

The flight controller 938 later sends the determined UAV flight instructions to the flight instruction transmitter 946 for sending out.

The UAV flight instruction receiver 950 afterward receives the transmitted UAV flight instructions and then sends it the UAV controller 952.

The UAV controller 952 then changes speed and direction of the UAV 931 according to the flight instruction.

This landing system 930 provides several advantages.

The landing system 930 uses wind speed and wind direction data to make UAV flight instructions, which is important, especially in windy conditions.

The landing system 930 allows reduction of UAV payload, since the UAV 931 does not need to carry a camera for detecting landing platform. Instead, the landing platform has a camera for detecting the UAV 931, in order to provide flight instructions for the UAV 931 to land on the landing platform.

The reduction of payload can result in improved UAV performance and flight time.

The embodiments can also be described with the following lists of features or elements being organized into several item lists. The respective combinations of features, which are disclosed in the item lists, are regarded as independent subject matter, respectively, that can also be combined with other features of the application.

[Item list 1, Basket receptacle]

1. A protection storage unit for enclosing an Unmanned Aerial Vehicle (UAV), the storage unit comprising
   a container for enclosing the UAV,
   a moveable UAV landing platform, and
   a UAV receptacle being positioned above the UAV landing platform, the UAV receptacle comprising at least one inclined surface for guiding a landing UAV to a predetermined UAV landing position on the UAV landing platform.
2. The storage unit according to item 2, wherein the UAV receptacle comprises a shape of inverted pyramid frustum.
3. The storage unit according to item 1 or 2, wherein the UAV landing platform comprises a pair of UAV electrical power connector for connecting with a battery of the landing UAV.
4. The storage unit according to one of the items 1 to 3, wherein
   the UAV receptacle comprises an extendable surface for adapting a dimension of the UAV receptacle according to a corresponding dimension of the landing UAV.
5. The storage unit according to one of the abovementioned items, wherein
   the UAV landing platform providing a landing position and a storing position, in the landing position, the UAV landing platform is positioned for the UAV to land and to take-off, the UAV landing platform essentially does not block a downward thrust of the UAV, wherein the UAV landing platform is positioned a predetermined height, which prevents the ground from affecting the downward thrust of the UAV, and in the storing position, the UAV landing platform are positioned inside the container.

6. The storage unit according to one of the abovementioned items further comprising
   a UAV alignment unit being adapted for pushing the UAV, which is positioned on the UAV landing platform, to a predetermined landing area of the moveable UAV landing platform.

7. The storage unit according to one of the abovementioned items further comprising
   a UAV guidance beacon unit being provided for guiding the UAV to the UAV landing platform, the UAV guidance beacon comprising
   a visible light ray source and
   an infrared light ray source.

8. The storage unit according to one of the abovementioned items further comprising
   a camera for receiving a beacon unit light signal from the UAV and
   a UAV guidance controller for generating a UAV flight instruction for landing the UAV on the UAV landing platform according to light signal data from the camera and for sending out the UAV flight instruction to the UAV.

9. The storage unit according to one of the abovementioned items further comprising
   a storage unit electrical power source,
   a tethering assembly that comprises
      a spool with a spool rotational sensor for providing a rotational data of the spool,
      a spool motor for selectively rotating the spool,
      an electrical utility cable for winding and unwinding around the spool, the electrical utility cable comprising a power supply electrical wire for transferring electrical energy from the storage unit electrical power source to an electrical power source of the UAV, and
      a cable force sensor being attached to the UAV, the cable force sensor, the cable force sensor providing a measurement of a force being exerted by the electrical utility cable onto the UAV, and
   a spool controller being adapted for energizing the spool motor for rotating the spool according to the force measurement and to the spool rotational data.

10. The storage unit according to one of the abovementioned items further comprising
    an external monitoring camera being directed for taking external images of the storage unit with
    an internal monitoring camera being directed for taking internal images of the storage unit.

11. The storage unit according to one of the abovementioned items further comprising
    a set of weed killer sprayers being positioned in the vicinity of the container for preventing growth of bushes around the container.

12. The storage unit according to one of the abovementioned items further comprising
    an electric fence being provided around the storage unit and being adapted for preventing animals from accessing (or reaching) the storage unit.

13. The storage unit according to one of the abovementioned items, wherein
    the container comprises a first sliding cover and a second sliding cover for allowing the UAV to ingress into the container and to egress from the container and for enclosing the UAV.

[Item List 2, Ground Effect]

1. A protection storage unit for enclosing an Unmanned Air Vehicle (UAV), the storage unit comprising
   a container for enclosing the UAV, and
   a moveable UAV landing platform, the UAV landing platform providing a landing position and a storing position,
   wherein,
   in the landing position, the UAV landing platform is positioned for the UAV to land and to take-off, the UAV landing platform essentially does not block a downward thrust of the UAV, wherein the UAV landing platform is positioned a predetermined height, which prevents the ground from affecting the downward thrust of the UAV, and
   in the storing position, the UAV landing platform are positioned inside the container.

2. The storage unit according to item 1, wherein
   the UAV landing platform further comprises at least a pair of landing surfaces.

3. The storage unit according to item 2, wherein
   the landing surfaces comprises portions for contacting the landing UAV and for guiding the landing UAV to a predetermined landing position.

4. The storage unit according to item 2 or 3, wherein
   the landing surfaces further comprises an electrical charging element for charging a battery of the UAV (when the UAV is positioned inside the container).

5. The storage unit according to one of items 1 to 4 further comprising
   an extension and retraction mechanism for moving the UAV landing platform.

6. The storage unit according to one of items 1 to 5 further comprising
   a further container that stores a communication module.

7. The storage unit according to item 6, wherein
   the container that stores the communication module is placed above the container that stores the UAV.

8. The storage unit according to one of items 1 to 6 further comprising
   another container that stores an electrical energy storage module.

9. The storage unit according to item 8, wherein
   the container that stores the electrical energy storage module is placed below the container that stores the UAV.

10. The storage unit according to one of the abovementioned items further comprising
    a UAV receptacle being positioned above the UAV landing platform, the UAV receptacle comprising at least one inclined surface for guiding a landing UAV to a predetermined UAV landing position on the UAV landing platform.

11. The storage unit according to one of the abovementioned items further comprising
    a UAV alignment unit being adapted for pushing the UAV, which is positioned on the UAV landing platform, to a predetermined landing area of the moveable UAV landing platform.

12. The storage unit according to one of the abovementioned items further comprising
    a UAV guidance beacon unit (being provided for guiding the UAV to the UAV landing platform), the UAV guidance beacon comprising
        a visible light ray source and
        an infrared light ray source.
13. The storage unit according to one of the abovementioned items further comprising
    a camera for receiving a beacon unit light signal from the UAV, and
    a UAV guidance controller for generating a UAV flight instruction for landing the UAV on the UAV landing platform according to light signal data from the camera and for sending out the UAV flight instruction to the UAV.
14. The storage unit according to one of the abovementioned items further comprising
    a storage unit electrical power source,
    a tethering assembly that comprises
        a spool with a spool rotational sensor for providing a rotational data of the spool,
        a spool motor for selectively rotating the spool,
        an electrical utility cable for winding and unwinding around the spool, the electrical utility cable comprising a power supply electrical wire for transferring electrical energy from the storage unit electrical power source to an electrical power source of the UAV, and
        a cable force sensor being attached to the UAV, the cable force sensor, the cable force sensor providing a measurement of a force being exerted by the electrical utility cable onto the UAV, and
    a spool controller being adapted for
        energizing the spool motor for rotating the spool according to the force measurement and to the spool rotational data.
15. The storage unit according to one of the abovementioned items further comprising
    an external monitoring camera being directed for taking external images of the storage unit with
    an internal monitoring camera being directed for taking internal images of the storage unit.
16. The storage unit according to one of the abovementioned items further comprising
    a set of weed killer sprayers being positioned in the vicinity of the container for preventing growth of bushes around the container.
17. The storage unit according to one of the abovementioned items further comprising
    an electric fence being provided around the storage unit and being adapted for preventing animals from accessing the storage unit.
18. The storage unit according to one of the abovementioned items, wherein
    the container comprises a first sliding cover and with a second sliding cover for enclosing the UAV.

[Item List 3, UAV Alignment Unit]
1. A (protection) storage unit for enclosing an Unmanned Aerial Vehicle (UAV), the storage unit comprising
    a container for enclosing the UAV,
    a moveable UAV landing platform, and
    a UAV alignment unit being adapted for pushing the UAV, which is positioned on the UAV landing platform, to a predetermined landing area of the moveable UAV landing platform.
2. The storage unit according to item 1, wherein
    the UAV alignment unit comprises a positional detector for determining a position of the UAV, which has landed on the UAV landing platform.
3. The storage unit according to item 2, wherein
    the positional detector comprising a weight sensor.
4. The storage unit according to one of items 1 to 3, wherein
    the UAV alignment unit comprises at least one of a group consisting of at least one plate for pushing the UAV, at least two fixed inclined walls for guiding the UAV, and at least two moveable inclined walls for guiding the UAV to the predetermined landing area.
5. The storage unit according to one of above-mentioned items further comprising
    a UAV receptacle being positioned above the UAV landing platform, the UAV receptacle comprising at least one inclined surface for guiding a landing UAV to a predetermined UAV landing position on the UAV landing platform.
6. The storage unit according to one of above-mentioned items, wherein
    the UAV landing platform provides a landing position and a storing position, wherein,
        in the landing position, the UAV landing platform is positioned for the UAV to land and to take-off, the UAV landing platform essentially does not block a downward thrust of the UAV, wherein the UAV landing platform is positioned a predetermined height, which prevents the ground from affecting the downward thrust of the UAV, and
        in the storing position, the UAV landing platform are positioned inside the container.
7. The storage unit according to one of above-mentioned items further comprising
    a UAV guidance beacon unit (being provided for guiding the UAV to the UAV landing platform), the UAV guidance beacon comprising
        a visible light ray source and
        an infrared light ray source.
8. The storage unit according to one of above-mentioned items further comprising
    a camera for receiving a beacon unit light signal from the UAV, and
    a UAV guidance controller for generating a UAV flight instruction for landing the UAV on the UAV landing platform according to light signal data from the camera and for sending out the UAV flight instruction to the UAV.
9. The storage unit according to one of above-mentioned items further comprising
    a storage unit electrical power source,
    a tethering assembly that comprises
        a spool with a spool rotational sensor for providing a rotational data of the spool,
        a spool motor for selectively rotating the spool,
        an electrical utility cable for winding and unwinding around the spool, the electrical utility cable comprising a power supply electrical wire for transferring electrical energy from the storage unit electrical power source to an electrical power source of the UAV, and
        a cable force sensor (being attached to the UAV, the cable force sensor) providing a measurement of a force being exerted by the electrical utility cable onto the UAV, and a spool controller being adapted for energizing the spool motor for rotating the spool according to the force measurement and to the spool rotational data.
10. The storage unit according to one of above-mentioned items further comprising
an external monitoring camera being directed for taking external images of the storage unit with an internal monitoring camera being directed for taking internal images of the storage unit.
11. The storage unit according to one of above-mentioned items further comprising
a set of weed killer sprayers being positioned in the vicinity of the container for preventing growth of bushes around the container.
12. The storage unit according to one of above-mentioned items further comprising
an electric fence being provided around the storage unit and being adapted for preventing animals from accessing (or reaching) the storage unit.
13. The storage unit according to one of above-mentioned items, wherein
the container comprises a first sliding cover and with a second sliding cover for enclosing the UAV.

[Item List 4, Beam Unit]
1. A protection storage unit for an Unmanned Aerial Vehicle (UAV), the storage unit comprising
a container for enclosing the UAV,
a moveable UAV landing platform, and
a UAV guidance beacon unit being provided for guiding the UAV to the UAV landing platform, the UAV guidance beacon comprising
a visible light ray source and
an infrared light ray source.
2. The storage unit according to item 1, wherein the beacon unit further comprises
a visible light cover plate, which comprises at least one opaque areas for blocking the visible light rays of the visible light ray source and at least one transparent area, such that the visible light rays travel through the visible light cover plate to form a first predetermined guidance pattern.
3. The storage unit according to item 1 or 2, wherein
the beacon unit further comprises
an infrared cover plate, which comprises at least one opaque area and at least one transparent area for blocking parts of the infrared light rays of the infrared light ray source, such that the infrared light rays travel through the infrared light cover plate to form a second predetermined guidance pattern.
4. The storage unit according to one of the items 1 to 3, wherein
the visible light ray source is adapted to generate at least one laser light ray with a visible light wavelength.
5. The storage unit according to one of the items 1 to 4, wherein
the infrared light ray source is adapted to generate at least one laser light ray with an infrared light wavelength.
6. The storage unit according to one of items 1 to 5, wherein
the UAV landing platform provides a landing position and a storing position, wherein,
in the landing position, the UAV landing platform is positioned for the UAV to land and to take-off, and
in the storing position, the UAV landing platform is positioned inside the container.]
7. The protection storage unit according to one of the above-mentioned items further comprising
a UAV receptacle being positioned above the UAV landing platform, the UAV receptacle comprising at least one inclined surface for guiding a landing UAV to a predetermined UAV landing position on the UAV landing platform.
8. The protection storage unit according to one of the above-mentioned items, wherein
in the landing position, the UAV landing platform is positioned for the UAV to land and to take-off, the UAV landing platform essentially does not block a downward thrust of the UAV, wherein the UAV landing platform is positioned a predetermined height, which prevents the ground from affecting the downward thrust of the UAV, and
in the storing position, the UAV landing platform are positioned inside the container.
9. The protection storage unit according to one of the above-mentioned items further comprising
a UAV alignment unit being adapted for pushing the UAV, which is positioned on the UAV landing platform, to a predetermined landing area of the moveable UAV landing platform.
10. The protection storage unit according to one of the above-mentioned items further comprising
a camera for receiving a beacon unit light signal from the UAV, and
a UAV guidance controller for generating a UAV flight instruction for landing the UAV on the UAV landing platform according to light signal data from the camera and for sending out the UAV flight instruction to the UAV.
11. The protection storage unit according to one of the above-mentioned items further comprising
a storage unit electrical power source,
a tethering assembly that comprises
a spool with a spool rotational sensor for providing a rotational data of the spool,
a spool motor for selectively rotating the spool,
an electrical utility cable for winding and unwinding around the spool, the electrical utility cable comprising a power supply electrical wire for transferring electrical energy from the storage unit electrical power source to an electrical power source of the UAV, and
a cable force sensor being attached to the UAV, the cable force sensor, the cable force sensor providing a measurement of a force being exerted by the electrical utility cable onto the UAV, and
a spool controller being adapted for energizing the spool motor for rotating the spool according to the force measurement and to the spool rotational data.
12. The protection storage unit according to one of the above-mentioned items further comprising
an external monitoring camera being directed for taking external images of the storage unit with
an internal monitoring camera being directed for taking internal images of the storage unit.
13. The protection storage unit according to one of the above-mentioned items further comprising
a set of weed killer sprayers (being positioned in the vicinity of the container) for preventing growth of bushes around the container.
14. The protection storage unit according to one of the above-mentioned items further comprising
an electric fence being provided around the storage unit and being adapted for preventing animals from accessing the storage unit.

15. The protection storage unit according to one of the above-mentioned items, wherein
the container comprises a first sliding cover and with a second sliding cover for allowing the UAV to ingress into the container and to egress from the container and for enclosing the UAV.

[Item List 5, Camera on Landing Platform and Beacon Unit on UAV]

1. A (protection) storage unit for an Unmanned Aerial Vehicle (UAV), the storage unit comprising
a container for enclosing the UAV,
a UAV guidance camera for receiving a beacon unit light signal from the UAV.
a moveable UAV landing platform, and
a UAV guidance controller for generating a UAV flight instruction for landing the UAV on the UAV landing platform according to light signal data from the UAV guidance camera and for sending out the UAV flight instruction to the UAV.
2. The storage unit according to item 1 further comprising a wind speed detector, wherein
the UAV guidance controller is further adapted for generating the UAV flight instruction according to wind speed data from the wind speed detector.
3. The storage unit according to item 1 or 2 further comprising
a wind direction detector, wherein
the UAV guidance controller is further adapted for generating the UAV flight instruction according to wind direction data from the wind direction detector.
4. The storage unit according to one of items 1 to 3 further comprising
a wireless transmitter for sending out the UAV flight instruction (to the UAV).
5. The storage unit according to one of above-mentioned items further comprising
a UAV receptacle being positioned above the UAV landing platform, the UAV receptacle comprising at least one inclined surface for guiding a landing UAV to a predetermined UAV landing position on the UAV landing platform.
6. The storage unit according to one of above-mentioned items, wherein
in the landing position, the UAV landing platform is positioned for the UAV to land and to take-off, the UAV landing platform essentially does not block a downward thrust of the UAV, wherein the UAV landing platform is positioned a predetermined height, which prevents the ground from affecting the downward thrust of the UAV, and
in the storing position, the UAV landing platform are positioned inside the container.
7. The storage unit according to one of above-mentioned items further comprising
a UAV alignment unit being adapted for pushing the UAV, which is positioned on the UAV landing platform, to a predetermined landing area of the moveable UAV landing platform.
8. The storage unit according to one of above-mentioned items further comprising
a UAV guidance beacon unit being provided for guiding the UAV to the UAV landing platform, the UAV guidance beacon comprising
a visible light ray source and
an infrared light ray source.
9. The storage unit according to one of above-mentioned items further comprising a storage unit electrical power source,
a tethering assembly that comprises
a spool with a spool rotational sensor for providing a rotational data of the spool,
a spool motor for selectively rotating the spool,
an electrical utility cable for winding and unwinding around the spool, the electrical utility cable comprising a power supply electrical wire for transferring electrical energy from the storage unit electrical power source to an electrical power source of the UAV, and
a cable force sensor being attached to the UAV, the cable force sensor, the cable force sensor providing a measurement of a force being exerted by the electrical utility cable onto the UAV, and
a spool controller being adapted for energizing the spool motor for rotating the spool according to the force measurement and to the spool rotational data.
10. The storage unit according to one of above-mentioned items further comprising
an external monitoring camera being directed for taking external images of the storage unit with
an internal monitoring camera being directed for taking internal images of the storage unit.
11. The storage unit according to one of above-mentioned items further comprising
a set of weed killer sprayers being positioned in the vicinity of the container for preventing growth of bushes around the container.
12. The storage unit according to one of above-mentioned items further comprising
an electric fence being provided around the storage unit and being adapted for preventing animals from accessing the storage unit.
13. The storage unit according to one of above-mentioned items, wherein
the container comprises a first sliding cover and with a second sliding cover for enclosing the UAV.

[Item List 6, Tethering]

1. A protection storage unit for an Unmanned Aerial Vehicle (UAV), the storage unit comprising
a container for enclosing the UAV,
a storage unit electrical power source,
a tethering assembly that comprises
a spool with a spool rotational sensor for providing a rotational data of the spool,
a spool motor for selectively rotating the spool,
an electrical utility cable for winding and unwinding around the spool, the electrical utility cable comprising a power supply electrical wire for transferring electrical energy from the storage unit electrical power source to an electrical power source of the UAV, and
a cable force sensor being attached to the UAV, the cable force sensor, the cable force sensor providing a measurement of a force being exerted by the electrical utility cable onto the UAV, and
a spool controller being adapted for energizing the spool motor for rotating the spool according to the force measurement and to the spool rotational data.
2. The storage unit according to item 1, wherein
the container comprises a moveable cover for allowing the UAV to ingress into the container and to egress from the container.
3. The storage unit according to item 2, wherein
the moveable cover is adapted for rotating about a hinge.

4. The storage unit according to one of items 1 to 3, wherein the electrical utility cable further comprises a sensor electrical wire for transferring the force measurement from the cable force sensor to the spool controller.
5. The storage unit according to one of items 1 to 4, wherein the electrical utility cable further comprises a metal shield for enclosing the power supply electrical wire.
6. The storage unit according to one of items 1 to 5, wherein the cable force sensor comprises a wireless transmitter for sending the force measurement wirelessly to the spool controller.
7. The storage unit according to one of items 1 to 6, wherein the storage unit electrical power source comprises a power inlet for receiving electrical energy from a land vehicle electrical power supply.
8. The storage unit according to one of items 1 to 7, wherein the tethering assembly further comprises a bracket for supporting the spool and a part of the electrical utility cable that is wound around the spool.
9. The storage unit according to item 8, wherein
   the tethering assembly further comprises
   at least one bracket force sensor for connecting the bracket to a support area, the bracket force sensor providing a measurement of a force being exerted by the bracket onto the support area, and wherein
   the spool controller is adapted for energizing the spool motor for rotating the spool according to said measurement from the bracket force sensor.
10. The storage unit according to one of the above-mentioned items further comprising
    a UAV receptacle being positioned above the UAV landing platform, the UAV receptacle comprising at least one inclined surface for guiding a landing UAV to a predetermined UAV landing position on the UAV landing platform.
11. The storage unit according to one of the above-mentioned items, wherein
    in the landing position, the UAV landing platform is positioned for the UAV to land and to take-off, the UAV landing platform essentially does not block a downward thrust of the UAV, wherein the UAV landing platform is positioned a predetermined height, which prevents the ground from affecting the downward thrust of the UAV, and
    in the storing position, the UAV landing platform are positioned inside the container.
12. The storage unit according to one of the above-mentioned items further comprising
    a UAV alignment unit being adapted for pushing the UAV, which is positioned on the UAV landing platform, to a predetermined landing area of the moveable UAV landing platform.
13. The storage unit according to one of the above-mentioned items further comprising
    a UAV guidance beacon unit being provided for guiding the UAV to the UAV landing platform, the UAV guidance beacon comprising
    a visible light ray source and
    an infrared light ray source.
14. The storage unit according to one of the above-mentioned items further comprising
    a camera for receiving a beacon unit light signal from the UAV, and
    a UAV guidance controller for generating a UAV flight instruction for landing the UAV on the UAV landing platform according to light signal data from the camera and for sending out the UAV flight instruction to the UAV.
15. The storage unit according to one of the above-mentioned items further comprising
    an external monitoring camera being directed for taking external images of the storage unit with
    an internal monitoring camera being directed for taking internal images of the storage unit.
16. The storage unit according to one of the above-mentioned items further comprising
    a set of weed killer sprayers being positioned in the vicinity of the container for preventing growth of bushes around the container.
17. The storage unit according to one of the above-mentioned items further comprising
    an electric fence being provided around the storage unit and being adapted for preventing animals from accessing the storage unit.
18. The storage unit according to one of the above-mentioned items, wherein
    the container comprises a first sliding cover and with a second sliding cover for enclosing the UAV.

[Item List 7, Camera]
1. A protection storage unit for enclosing an Unmanned Aerial Vehicle (UAV), the storage unit comprising
   a container for enclosing the UAV, and
   an external monitoring camera being directed for taking external images of the storage unit with
   an internal monitoring camera being directed for taking internal images of the storage unit.
2. The protection storage unit according to item 1 further comprising
   a UAV receptacle being positioned above the UAV landing platform, the UAV receptacle comprising at least one inclined surface for guiding a landing UAV to a predetermined UAV landing position on the UAV landing platform.
3. The protection storage unit according to item 1 or 2, wherein
   in the landing position, the UAV landing platform is positioned for the UAV to land and to take-off, the UAV landing platform essentially does not block a downward thrust of the UAV, wherein the UAV landing platform is positioned a predetermined height, which prevents the ground from affecting the downward thrust of the UAV, and
   in the storing position, the UAV landing platform are positioned inside the container.
4. The protection storage unit according to one of the above-mentioned items further comprising
   a UAV alignment unit being adapted for pushing the UAV, which is positioned on the UAV landing platform, to a predetermined landing area of the moveable UAV landing platform.
5. The protection storage unit according to one of the above-mentioned items further comprising
   a UAV guidance beacon unit being provided for guiding the UAV to the UAV landing platform, the UAV guidance beacon comprising
   a visible light ray source and
   an infrared light ray source.
6. The protection storage unit according to one of the above-mentioned items further comprising
   a camera for receiving a beacon unit light signal from the UAV, and a UAV guidance controller for generating a UAV flight instruction for landing the UAV on the UAV landing platform according to light signal data from the camera and for sending out the UAV flight instruction to the UAV.
7. The protection storage unit according to one of the above-mentioned items further comprising
a storage unit electrical power source,
a tethering assembly that comprises
a spool with a spool rotational sensor for providing a rotational data of the spool,
a spool motor for selectively rotating the spool,
an electrical utility cable for winding and unwinding around the spool, the electrical utility cable comprising a power supply electrical wire for transferring electrical energy from the storage unit electrical power source to an electrical power source of the UAV, and
a cable force sensor being attached to the UAV, the cable force sensor, the cable force sensor providing a measurement of a force being exerted by the electrical utility cable onto the UAV, and
a spool controller being adapted for
energizing the spool motor for rotating the spool according to the force measurement and to the spool rotational data.
8. The protection storage unit according to one of the above-mentioned items further comprising
a set of weed killer sprayers being positioned in the vicinity of the container for preventing growth of bushes around the container.
9. The protection storage unit according to one of the above-mentioned items further comprising
an electric fence being provided around the storage unit and being adapted for preventing animals from accessing the storage unit.
10. The protection storage unit according to one of the above-mentioned items, wherein
the container comprises a first sliding cover and with a second sliding cover for enclosing the UAV.

[Item List 8, Weed Killer]
1. A protection storage unit for enclosing an Unmanned Aerial Vehicle (UAV), the storage unit comprising
a container for enclosing the UAV, and
a set of weed killer sprayers (being positioned in the vicinity of the container) for preventing growth of bushes around the container.
2. The protection storage unit according to item 1 further comprising
a UAV receptacle being positioned above the UAV landing platform, the UAV receptacle comprising at least one inclined surface for guiding a landing UAV to a predetermined UAV landing position on the UAV landing platform.
3. The protection storage unit according to item 1 or 2, wherein
in the landing position, the UAV landing platform is positioned for the UAV to land and to take-off, the UAV landing platform essentially does not block a downward thrust of the UAV, wherein the UAV landing platform is positioned a predetermined height, which prevents the ground from affecting the downward thrust of the UAV, and
in the storing position, the UAV landing platform are positioned inside the container.
4. The protection storage unit according to one of the above-mentioned items further comprising a UAV alignment unit being adapted for pushing the UAV, which is positioned on the UAV landing platform, to a predetermined landing area of the moveable UAV landing platform.
5. The protection storage unit according to one of the above-mentioned items further comprising
a UAV guidance beacon unit (being provided for guiding the UAV to the UAV landing platform), the UAV guidance beacon comprising
a visible light ray source and
an infrared light ray source.
6. The protection storage unit according to one of the above-mentioned items further comprising
a camera for receiving a beacon unit light signal from the UAV, and
a UAV guidance controller for generating a UAV flight instruction for landing the UAV on the UAV landing platform according to light signal data from the camera and for sending out the UAV flight instruction to the UAV.
7. The protection storage unit according to one of the above-mentioned items further comprising
a storage unit electrical power source,
a tethering assembly that comprises
a spool with a spool rotational sensor for providing a rotational data of the spool,
a spool motor for selectively rotating the spool,
an electrical utility cable for winding and unwinding around the spool, the electrical utility cable comprising a power supply electrical wire for transferring electrical energy from the storage unit electrical power source to an electrical power source of the UAV, and
a cable force sensor being attached to the UAV, the cable force sensor, the cable force sensor providing a measurement of a force being exerted by the electrical utility cable onto the UAV, and
a spool controller being adapted for energizing the spool motor for rotating the spool according to the force measurement and to the spool rotational data.
8. The protection storage unit according to one of the above-mentioned items further comprising
an external monitoring camera being directed for taking external images of the storage unit with
an internal monitoring camera being directed for taking internal images of the storage unit.
9. The protection storage unit according to one of the above-mentioned items further comprising
an electric fence being provided around the storage unit and being adapted for preventing animals from accessing the storage unit.
10. The protection storage unit according to one of the above-mentioned items, wherein
the container comprises a first sliding cover and with a second sliding cover for enclosing the UAV.

[Item List 9, Electric Fence]
1. A protection storage unit for enclosing an Unmanned Aerial Vehicle (UAV), the storage unit comprising
a container for enclosing the UAV, and
an electric fence being provided around the storage unit and being adapted for preventing animals from accessing the storage unit.
2. The protection storage unit according to item 1 further comprising
a UAV receptacle being positioned above the UAV landing platform, the UAV receptacle comprising at least one inclined surface for guiding a landing UAV to a predetermined UAV landing position on the UAV landing platform.
3. The protection storage unit according to item 1 or 2, wherein
in the landing position, the UAV landing platform is positioned for the UAV to land and to take-off, the UAV landing platform essentially does not block a downward thrust of the UAV, wherein the UAV landing platform is positioned a predetermined height, which prevents the ground from affecting the downward thrust of the UAV, and
in the storing position, the UAV landing platform are positioned inside the container.
4. The protection storage unit according to one of the above-mentioned items further comprising
a UAV alignment unit being adapted for pushing the UAV, which is positioned on the UAV landing platform, to a predetermined landing area of the moveable UAV landing platform.
5. The protection storage unit according to one of the above-mentioned items further comprising
a UAV guidance beacon unit (being provided for guiding the UAV to the UAV landing platform), the UAV guidance beacon comprising
a visible light ray source and
an infrared light ray source.
6. The protection storage unit according to one of the above-mentioned items further comprising
a camera for receiving a beacon unit light signal from the UAV, and
a UAV guidance controller for generating a UAV flight instruction for landing the UAV on the UAV landing platform according to light signal data from the camera and for sending out the UAV flight instruction to the UAV.
7. The protection storage unit according to one of the above-mentioned items further comprising
a storage unit electrical power source,
a tethering assembly that comprises
a spool with a spool rotational sensor for providing a rotational data of the spool,
a spool motor for selectively rotating the spool,
an electrical utility cable for winding and unwinding around the spool, the electrical utility cable comprising a power supply electrical wire for transferring electrical energy from the storage unit electrical power source to an electrical power source of the UAV, and
a cable force sensor being attached to the UAV, the cable force sensor, the cable force sensor providing a measurement of a force being exerted by the electrical utility cable onto the UAV, and
a spool controller being adapted for energizing the spool motor for rotating the spool according to the force measurement and to the spool rotational data.
8. The protection storage unit according to one of the above-mentioned items further comprising
an external monitoring camera being directed for taking external images of the storage unit with
an internal monitoring camera being directed for taking internal images of the storage unit.
9. The protection storage unit according to one of the above-mentioned items further comprising
a set of weed killer sprayers (being positioned in the vicinity of the container) for preventing growth of bushes around the container.
10. The protection storage unit according to one of the above-mentioned items, wherein
the container comprises a first sliding cover and with a second sliding cover for enclosing the UAV.

[Item List 10, Drone Box]
1. A protection storage unit for an Unmanned Aerial Vehicle (UAV), the storage unit comprising
a container with a first sliding cover and with a second sliding cover for enclosing the UAV.
2. The protection storage unit according to item 1 further comprising
a rain sensor.
3. The protection storage unit according to item 1 or 2 further comprising
a lift assembly with a UAV platform for carrying the UAV.
4. The protection storage unit according to item 3 further comprising
a beacon unit being provided on the UAV platform for guiding the UAV to the UAV platform.
5. The protection storage unit according to item 3 or 4 further comprising
a wireless charging unit being provided on the UAV platform for providing electrical energy to the UAV.
6. The protection storage unit according to one of above-mentioned items further comprising
a tempering vibration sensor.
7. The protection storage unit according to one of above-mentioned items further comprising
a Global Positioning Unit (GPS) unit for determining positional data of the storage unit.
8. The protection storage unit according to one of above-mentioned items further comprising
a controller (central control unit) for controlling (parts of) the storage unit).
9. The protection storage unit according to one of above-mentioned items further comprising
an electrical energy storage for (storing and) providing electrical energy to (parts of) the storage unit (and/or the UAV).
10. The protection storage unit according to one of the above-mentioned items further comprising
a communication unit for exchanging data (with the UAV or with an external unit).
11. The protection storage unit according to one of the above-mentioned items further comprising
a UAV receptacle being positioned above the UAV landing platform, the UAV receptacle comprising at least one inclined surface for guiding a landing UAV to a predetermined UAV landing position on the UAV landing platform.
12. The protection storage unit according to one of the above-mentioned items, wherein
in the landing position, the UAV landing platform is positioned for the UAV to land and to take-off, the UAV landing platform essentially does not block a downward thrust of the UAV, wherein the UAV landing platform is positioned a predetermined height, which prevents the ground from affecting the downward thrust of the UAV, and
in the storing position, the UAV landing platform are positioned inside the container.
13. The protection storage unit according to one of the above-mentioned items further comprising
a UAV alignment unit being adapted for pushing the UAV, which is positioned on the UAV landing platform, to a predetermined landing area of the moveable UAV landing platform.

14. The protection storage unit according to one of the above-mentioned items further comprising
    a UAV guidance beacon unit (being provided for guiding the UAV to the UAV landing platform), the UAV guidance beacon comprising
        a visible light ray source and
        an infrared light ray source.
15. The protection storage unit according to one of the above-mentioned items further comprising
    a camera for receiving a beacon unit light signal from the UAV, and
    a UAV guidance controller for generating a UAV flight instruction for landing the UAV on the UAV landing platform according to light signal data from the camera and for sending out the UAV flight instruction to the UAV.
16. The protection storage unit according to one of the above-mentioned items further comprising
    a storage unit electrical power source,
    a tethering assembly that comprises
        a spool with a spool rotational sensor for providing a rotational data of the spool,
        a spool motor for selectively rotating the spool,
        an electrical utility cable for winding and unwinding around the spool, the electrical utility cable comprising a power supply electrical wire for transferring electrical energy from the storage unit electrical power source to an electrical power source of the UAV, and
        a cable force sensor being attached to the UAV, the cable force sensor, the cable force sensor providing a measurement of a force being exerted by the electrical utility cable onto the UAV, and
    a spool controller being adapted for energizing the spool motor for rotating the spool according to the force measurement and to the spool rotational data.
17. The protection storage unit according to one of the above-mentioned items further comprising
    an external monitoring camera being directed for taking external images of the storage unit with
    an internal monitoring camera being directed for taking internal images of the storage unit.
18. The protection storage unit according to one of the above-mentioned items further comprising
    a set of weed killer sprayers being positioned in the vicinity of the container for preventing growth of bushes around the container.
19. The protection storage unit according to one of the above-mentioned items further comprising
    an electric fence being provided around the storage unit and being adapted for preventing animals from accessing the storage unit.

[Item List 11, UAV Module]
1. An Unmanned Aerial Vehicle (UAV) module comprising
    a UAV that comprises at least one propeller for moving the UAV, and an electrical power source for energizing the propeller and
    a storage unit according to one of the above-mentioned items for enclosing the UAV.

[Item List 12, Network of Objects]
1. A network of objects,
    each object comprising a sensor and a communication device, the communication device is provided for receiving data from at least one other object and/or from its sensor, and
    sending the data to another object,
    wherein at least one object is provided by an Unmanned Aerial Vehicle (UAV).

Although the above description contains much specificity, this should not be construed as limiting the scope of the embodiments but merely providing illustration of the foreseeable embodiments. The above stated advantages of the embodiments should not be construed especially as limiting the scope of the embodiments but merely to explain possible achievements if the described embodiments are put into practice. Thus, the scope of the embodiments should be determined by the claims and their equivalents, rather than by the examples given.

REFERENCE NUMBERS 1, 1', 1" UAV protection storage device
2, 2', 2" Unmanned Aerial Vehicle
4, 4', 4" UAV battery
5 solar cell circuit
6, 6', 6" fuel cell
6 electrical resistor
8, 8' diode
10, 10' enclosure box
11, 11', 11" first sliding cover
12, 12', 12" second sliding cover
14, 14', 14" weather sensor
15, 15, 15" external movement sensor
16, 16', 16" first solar cell unit
17, 17', 17" second solar cell unit
20, 20' scissor lift assembly
30, 30" UAV platform
30a landing platform
30a-1 slot
31, 31" beacon unit
32, 32" wireless charging unit
34 solar cell circuit
40, 40', 40" vibration sensor and mercury switch assembly
50, 50', 50" central control unit
60, 60', 60" electrical energy storage
62 single-pole, single-throw switch
63 double-pole, single-throw switch
70, 70', 70" communication unit
71, 71', 71" GPS tracker unit
72a parcel
72b parcel
72c parcel
72d parcel
72e parcel
80" cable spool
81" shielded electrical supply line
113 movable middle cover
118 enclosure lower compartment
119 enclosure upper compartment
120a first scissor lift assembly
120b second scissor lift assembly
121 enclosure compartment divider
122a first opening
122b second opening
123 lower first conveyor
124 lower second conveyor
125 upper first conveyor
126 upper second conveyor
127 inter-conveyor parcel manipulator
128a first conveyor-to-UAV parcel manipulator
128b second conveyor-to-UAV parcel manipulator
130 UAV platform
131 beacon unit 132 wireless charging unit
133 aperture
200 UAV assembly
201 UAV protection storage device
202 UAV
204 battery
215 tethering assembly
222 rotor motor
230 UAV force sensor
240 storage device cable spool assembly
250 central control unit
260 electrical energy storage
270 wind sensor
280 cable
300 cable spool
305 spool motor
310 spool rotational sensor
320 spool bracket
325 spool force sensor
330 mounting plate
350 force sensor
360 strain gauge
370 metal plate
380 force attachment area
400 beacon unit
410 light module
420 camera module
430 infrared light source
440 visible light source
455 cover plate
460 opening
470 infrared camera
480 visible light camera
500 graph
550 light pattern
560 UAV alignment unit
563a alignment plate
563b alignment plate
565a sliding mechanism
565b sliding mechanism
567a alignment plate
567b alignment plate
569a sliding mechanism
569b sliding mechanism
572 UAV alignment unit
574 inclined outer wall
576 landing pad
580 UAV alignment unit
582 moveable outer wall
584 landing pad
590 UAV position detector unit
592 landing platform
595 weight sensor
600 cover
602 enclosure box
604 first UAV 594
606 second UAV 596
607 opening
610 cover
612 rotatable lid
614 covering part
616 side part
620 cover
622 movable lid
624 horizontal part
626 vertical part
630 surveillance cameras
632 UAV protection storage device
635 external camera
637 internal camera
640 weed killer sprayer
642 UAV protection storage device
650 electric fence
655 UAV protection storage device
660 network
662 computer server
662 terminal
664 cloud connection
667 wearable device
667S sensor
669 fixed Internet device
669S sensor
670 UAV assembly
672 UAV protection storage device
674 UAV
674S sensor
700 UAV storage box
700a UAV storage box
710 communication module
710a communication module
711 container
712 inclined lid
715 solar panel
718 weather sensor
721 antenna
723 controller unit
727 modem unit
730 UAV hangar modules
730a UAV hangar modules
730b UAV hangar modules
731 beacon unit
735 battery pack
740 container
740a container
740b container
741 fixed side panel
742 movable side panel
742b movable side panel
745 magnetic lock
747 magnets
749 armature plate
760 power storage module
760a power storage module
762 power storage container
762a power storage container
765 battery unit
766 data or power connectors
766a data or power connectors
768 fuel cell unit
770 extension and retraction mechanism
771 fuel tank
773 movable slide rail actuator
775 rotary actuator
778 first elongated arm
779 second elongated arm
782 first telescopic slide rail
784 rail member
786 rail member
788 rail member
790 UAV landing platform
790b UAV landing platform
792 first landing unit
795 landing surface
796 landing surface 882 second telescopic slide rail
892 second landing unit
895 landing surface
896 landing surface
900 landing and docking system
903 UAV landing platform
908 UAV
911 receptacle
911-1 receptacle
911-2 receptacle
913*a* trapezium plate
913*a*-1 trapezium plate
913*a*-2 trapezium plate
913*b* trapezium plate
913*b*-1 trapezium plate
913*b*-2 trapezium plate
913*c* trapezium plate
913*c*-1 trapezium plate
913*c*-2 trapezium plate
913*d* trapezium plate
913*d*-1 trapezium plate
913*d*-2 trapezium plate
915 supporting stand
917 arm
906 leg
920 electrical power connector
921 polarity control circuit
922 electrical power pin
925-1 UAV landing platform
930 landing system
931 UAV
932 UAV protection storage device
933 ground flight transmitter
936 UAV flight receiver
938 flight controller
940 wind speed sensor
942 wind direction sensor
944 camera
946 flight instruction transmitter
950 wireless UAV flight instruction receiver
951 beacon unit
952 UAV controller

The invention claimed is:

1. A storage unit for an Unmanned Aerial Vehicle (UAV), the storage unit comprising:
    a container for enclosing the UAV;
    a UAV landing platform; and
    a UAV receptacle being positioned above the UAV landing platform, the UAV receptacle comprising at least one inclined surface for guiding a landing UAV to a predetermined UAV landing position on the UAV landing platform, wherein the UAV receptacle comprises an extendable surface for adapting a dimension of the UAV receptacle according to a corresponding dimension of the landing UAV, the extendable surface configurable in a first configuration, wherein the UAV landing platform defines a first dimension, and a second configuration, wherein the UAV landing platform defines a second dimension that is greater than the first dimension.

2. The storage unit according to claim 1, wherein the UAV receptacle comprises a shape of an inverted pyramid frustum.

3. The storage unit according to claim 1, wherein the UAV landing platform comprises a pair of UAV electrical power connectors.

\* \* \* \* \*